US012388620B2

(12) United States Patent
Barnes et al.

(10) Patent No.: US 12,388,620 B2
(45) Date of Patent: Aug. 12, 2025

(54) SYSTEMS, METHODS, AND DEVICES FOR GENERATING DIGITAL AND CRYPTOGRAPHIC ASSETS BY MAPPING BODIES FOR N-DIMENSIONAL MONITORING USING MOBILE IMAGE DEVICES

(71) Applicant: Galileo Group, Inc., Tampa, FL (US)

(72) Inventors: Donald Michael Barnes, Tampa, FL (US); Thorsten Mewes, Tampa, FL (US); James Michael Grichnik, Tampa, FL (US)

(73) Assignee: Galileo Group, Inc., Tampa, FL (US)

(*) Notice: Subject to any disclaimer, the term of this patent is extended or adjusted under 35 U.S.C. 154(b) by 196 days.

(21) Appl. No.: 18/082,165

(22) Filed: Dec. 15, 2022

(65) Prior Publication Data
US 2023/0216658 A1   Jul. 6, 2023

Related U.S. Application Data

(60) Provisional application No. 63/290,041, filed on Dec. 15, 2021.

(51) Int. Cl.
H04L 9/06 (2006.01)
G06T 3/14 (2024.01)
(Continued)

(52) U.S. Cl.
CPC .............. H04L 9/0618 (2013.01); G06T 3/14 (2024.01); G06T 11/00 (2013.01); G06T 17/20 (2013.01);
(Continued)

(58) Field of Classification Search
CPC ....... H04L 9/0618; H04L 9/3213; H04L 9/50; H04L 2209/56; H04L 2209/88;
(Continued)

(56) References Cited

U.S. PATENT DOCUMENTS 6,021,344 A   2/2000 Lui et al.
6,427,022 B1  7/2002 Craine et al.
(Continued)

OTHER PUBLICATIONS

Aaron et al., (Large Pose 3D Face Reconstruction from a Single Image via Direct Volumetric CNN Regression, 2017 IEEE International Conference on Computer Vision, PP1031-1039) (Year: 2017).*

(Continued)

Primary Examiner — Amara Abdi
(74) Attorney, Agent, or Firm — MORGAN, LEWIS & BOCKIUS LLP

(57) ABSTRACT

Provided are systems, methods, and devices for generating digital and/or cryptographic assets. An initial state of an environment is acquired using sensors that includes a state of each sensor, a region of interest including a 3D body, and a state of light sources. The asset is associated with the 3D body. A plurality of boundary conditions associated with a workflow for capturing the asset is determined. A visualization of a set of boundary conditions is displayed on a display that includes a plurality of visual cues including first and second visual cues. Each respective visual cue provides a visual indication of a state of a corresponding boundary condition in the set of boundary conditions. At least one visual cue is updated when each boundary condition in the set of boundary conditions is satisfied. When satisfied, the workflow at the computer-enabled imaging device is executed, thereby capturing the asset.

66 Claims, 29 Drawing Sheets

(51) Int. Cl.
  *G06T 11/00* (2006.01)
  *G06T 17/20* (2006.01)
  *H04L 9/00* (2022.01)
  *H04L 9/32* (2006.01)
  *H04N 23/56* (2023.01)
  *H04N 23/60* (2023.01)
  *H04N 23/611* (2023.01)
  *H04N 23/63* (2023.01)
  *H04N 23/66* (2023.01)

(52) U.S. Cl.
  CPC ............ *H04L 9/3213* (2013.01); *H04L 9/50* (2022.05); *H04N 23/56* (2023.01); *H04N 23/611* (2023.01); *H04N 23/635* (2023.01); *H04N 23/64* (2023.01); *H04N 23/66* (2023.01)

(58) Field of Classification Search
  CPC ......... H04L 63/10; H04L 63/123; G06T 3/14; G06T 11/00; G06T 17/20; G06T 11/60; G06T 2200/04; G06T 2200/24; G06T 1/0007; H04N 23/56; H04N 23/611; H04N 23/635; H04N 23/64; H04N 23/66; G06Q 2220/00; G06Q 10/10; G06Q 30/0643; G06V 10/25; G06V 10/82; G06V 10/95; G06V 20/64
  See application file for complete search history.

(56) References Cited

U.S. PATENT DOCUMENTS

| | | |
|---|---|---|
| 6,608,628 B1 | 8/2003 | Ross et al. |
| 6,671,737 B1 | 12/2003 | Snowdon et al. |
| 7,213,766 B2 | 5/2007 | Ryan et al. |
| 7,233,693 B2 | 6/2007 | Momma |
| 8,543,519 B2 | 9/2013 | Guyon et al. |
| 8,743,219 B1 | 6/2014 | Bledsoe |
| 8,903,568 B1 | 12/2014 | Wang et al. |
| 9,019,383 B2 | 4/2015 | Jung et al. |
| 9,280,038 B1 | 3/2016 | Pan et al. |
| 9,380,275 B2 | 6/2016 | Davidson et al. |
| 9,599,993 B2 | 3/2017 | Kumar et al. |
| 9,606,535 B2 | 3/2017 | Humenay |
| 9,663,244 B2 | 5/2017 | Zhao et al. |
| 9,678,506 B2 | 6/2017 | Bachrach et al. |
| 9,688,399 B1 | 6/2017 | Dobbins |
| 9,690,289 B2 | 6/2017 | Yang et al. |
| 9,738,380 B2 | 8/2017 | Claridge et al. |
| 9,798,322 B2 | 10/2017 | Bachrach et al. |
| 9,942,511 B2 | 4/2018 | Jung et al. |
| 10,003,762 B2 * | 6/2018 | Jung ..................... H04N 23/90 |
| 10,510,172 B2 * | 12/2019 | Gibb ..................... G06T 11/60 |
| 2007/0052856 A1 | 3/2007 | Jung et al. |
| 2008/0007734 A1 | 1/2008 | Park et al. |
| 2009/0318815 A1 | 12/2009 | Barnes et al. |
| 2012/0212487 A1 | 8/2012 | Basler et al. |
| 2012/0233000 A1 | 9/2012 | Fisher et al. |
| 2012/0307056 A1 | 12/2012 | Zuzak et al. |
| 2012/0307081 A1 | 12/2012 | Dewald et al. |
| 2013/0100128 A1 | 4/2013 | Steedly et al. |
| 2013/0101223 A1 | 4/2013 | Kawanishi et al. |
| 2013/0136341 A1 | 5/2013 | Yamamoto |
| 2013/0222369 A1 | 8/2013 | Huston et al. |
| 2013/0293686 A1 * | 11/2013 | Blow ..................... G06T 7/55 |
| | | 348/E13.074 |
| 2014/0012459 A1 | 1/2014 | Kramer et al. |
| 2014/0139639 A1 | 5/2014 | Wagner et al. |
| 2014/0257595 A1 | 9/2014 | Tillmann |
| 2014/0267723 A1 | 9/2014 | Davidson et al. |
| 2014/0307110 A1 | 10/2014 | Liu |
| 2014/0313303 A1 | 10/2014 | Davis et al. |
| 2014/0340520 A1 | 11/2014 | Hay |
| 2015/0087927 A1 | 3/2015 | Manzke et al. |
| 2015/0094089 A1 | 4/2015 | Moeglein et al. |
| 2015/0134143 A1 | 5/2015 | Willenborg |
| 2016/0139595 A1 | 5/2016 | Yang et al. |
| 2017/0365075 A1 | 12/2017 | Meganck et al. |
| 2018/0095464 A1 | 4/2018 | Takayama et al. |
| 2022/0076006 A1 * | 3/2022 | Gao ..................... G06V 10/60 |
| 2022/0292772 A1 * | 9/2022 | Wang ..................... G06N 3/045 |

OTHER PUBLICATIONS

Jackson et al., 2017, "Large Pose 3D Face Reconstruction from a Single Image via Direct Volumetric CNN Regression", arXiv:1703.07834.

* cited by examiner

4000

(4002) A method for capturing a digital asset. At a computer-enabled imaging device that includes one or more processors, a display, a controller. At least one program is non-transiently stored in the controller, or a memory accessible by the controller. The memory includes at least one programs configured to be executed by the one or more processors.

(4004) The one or more sensors comprises a gyroscope, an accelerometer, or both.

(4006) The one or more sensors comprises an objective lens and a two-dimensional pixelated detector in communication with the objective lens.

(4008) The one or more sensors comprises a light detection and ranging (LIDAR) sensor.

(4010) The computer-enabled imaging device comprises a power supply powering the computer-enabled imaging device and the one or more light sources.

(4012) The computer-enabled imaging device is controlled through an interface on a second computer-enabled device.

Figure 4A

(4014) Acquiring, in electronic form, using at least the one or more sensors, an initial state of an environment, wherein the environment comprises a state of each sensor in the one or more sensors, a region of interest (ROI) comprising a first 3D body, and a state of one or more light sources, wherein the digital asset is associated with the first 3D body.

(4016) The initial state of the environment comprises one or more spatial dimensions characteristics of the environment.

(4018) The one or more spatial dimensions characteristics comprises a spatial distance between the first 3D body and a sensor in the one or more sensors, a length of the first 3D body, a characteristic length of the first 3D body, a height of the first 3D body, a width of the first 3D body, a lighting characteristic, an orientation of the computer-enabled imaging device, or a combination thereof.

(4020) The initial state of the environment comprises a first characteristic of an ambient lighting.

(4022) The initial state is associated with a point in spacetime.

(4024) The one or more light sources comprises a light emitting diode (LED).

(4026) The LED is an additive white LED.

(4028) The LED is an additive wavelength range specific LED.

(4030) The one or more light sources comprises a polarized light source.

(4032) The polarized light source is an additive polarized light source.

(4034) The one or more light sources comprises a laser light source.

(4036) The laser light source is a pulsed laser.

Figure 4B (4014 continued)

(4038) A respective light source in the one or more light sources is configured to emit light that is substantially limited to a spectral range.

(4040) The spectral range is in between 250 nanometers (nm) and 1500 nm.

(4042) The spectral range is in between 250 nm to 400 nm.

(4044) The spectral range is in between 400 nm to 700 nm.

(4046) The spectral range is in between 500 nm and 600 nm.

(4048) The first 3D body is a portion of a first human subject.

(4050) The first human subject is an operator of the computer-enabled imaging device.

(4052) A second human subject different from the first human subject is an operator of the computer-enabled imaging device.

(4054) The first 3D body comprise a plurality of sub-bodies, and wherein the digital asset is a digital representation of at least one sub-body in the plurality of sub-bodies.

(4056) The ROI comprises a second 3D body different from the first 3D body, and determining the plurality of boundary conditions is based on one or more characteristics of the second 3D body.

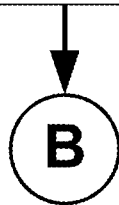

Figure 4C

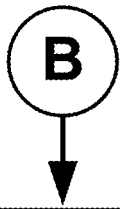

*(4058)* Determining, based at least in part on the initial state of the environment, a plurality of boundary conditions associated with a workflow for capturing the digital asset.

*(4060)* The plurality of boundary conditions comprises a position tolerance of the computer-enabled imaging device.

*(4062)* The computer-enabled is a mobile imaging device, and wherein the position tolerance of the computer-enabled imaging device comprises one or more translational position tolerances of the mobile imaging device, one or more rotational position tolerances of the mobile imaging device, or both.

*(4064)* The one or more translational position tolerances comprises a height tolerance from the ROI.

*(4066)* The one or more rotational position tolerances comprises a yaw tolerance, a pitch tolerance, a roll tolerance, or a combination thereof.

*(4068)* A first boundary condition in the plurality of boundary conditions is based on a historical workflow associated with the first 3D body.

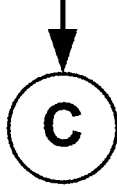

Figure 4D

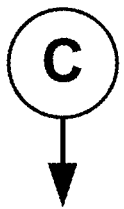

(4070) Displaying, within a graphical user interface on the display, a visualization of each respective boundary condition in a set of boundary conditions in the plurality of boundary conditions, wherein the visualization comprises a plurality of visual cues, the plurality of visual cues including a first visual cue and a second visual cue, and wherein each respective visual cue in the plurality of visual cues provides a visual indication of a state of a corresponding boundary condition in the set of boundary conditions.

(4072) The first visual cue is exhibited in the graphical user interface as an annulus, a circle, a polygon, a line, or a combination thereof.

(4074) The second visual cue is exhibited within the graphical user interface as a compass rose.

(4076) The plurality of visual cues comprises a third visual cue associated with a feature of the first 3D body.

(4078) The feature of the first 3D body comprises a facial feature.

(4080) The plurality of visual cues comprises a fourth visual cue associated with a projected representation of light projected onto the first 3D body.

(4082) The projected representation of light comprises a triangulated representation comprising a plurality of vertices and a corresponding plurality of edges interconnecting the plurality of vertices.

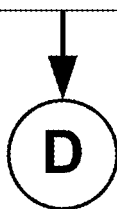

Figure 4E

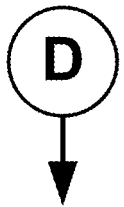

(4084) Updating, when displaying the graphical user interface, at least one of the first visual cue and the second visual cue when each boundary condition in the set of boundary conditions is satisfied.

(4086) The updating the at least one of the first visual cue and the second visual cue comprises increasing a display size of the at least one of the first visual cue and the second visual cue, decreasing the display size of the at least one of the first visual cue and the second visual cue, changing a display color of the at least one of the first visual cue and the second visual cue, changing a display shape of the at least one of the first visual cue and the second visual cue, or a combination thereof.

(4088) The computer-enabled imaging device further comprises a vibration mechanism housed by computer-enabled imaging device, and wherein the updating the graphical user interface further comprises causing the vibration mechanism to provide a plurality of vibrations at a frequency through a housing of the computer-enabled imaging device.

(4090) The plurality of vibrations comprises a set of synchronous vibrations.

(4092) The computer-enabled imaging device further comprises an audio circuitry housed by the computer-enabled imaging device, and wherein the updating (D) the graphical user interface further comprises causing the audio circuitry to provide one or more audible cues.

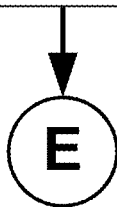

Figure 4F

(4094) Executing, in accordance with a determination that each boundary condition in the set of boundary conditions is satisfied, the workflow at the computer-enabled imaging device, thereby capturing the digital asset.

(4096) The digital asset comprises one or more digital images, one or more 2D maps, one or more 3D maps, one or more dense point clouds, one or more textured meshes, one or more cryptographic non-fungible token assets, or a combination thereof.

(4098) The one or more 2D maps comprises a decomposable triangulated graph.

(4100) The digital asset comprises one or more cryptographic non-fungible token assets, and wherein the one or more cryptographic non-fungible token assets comprises an inimitable cryptographic non-fungible token asset.

(4102) The workflow at the computer-enabled imaging device comprises: capturing a plurality of digital images of the ROI, wherein each respective digital image in the plurality of digital images is collectively defined by a plurality of characteristics; determining a characteristic relationship comprising a comparison of a first instance of a first characteristic in the plurality of characteristics defining, at least in part, a first digital image in the plurality of digital images and a second instance of the first characteristic defining, at least in part, a second digital image in the plurality of digital images; and generating the digital asset based, at least in part, on the second digital image, wherein the digital asset comprises a degree of change of the first characteristic in accordance with the characteristic relationship.

(4104) The first characteristic is associated with a position of a portion of the first 3D body, and the degree of change comprises a change in the position of the portion of the first 3D body.

(4106) The change in the position comprises aligning the portion of the first 3D body to a direction.

(4108) The change in the position comprises compensating for a tilt and/or a pan of the computer-enable imaging device.

(4110) The first characteristic is associated with a lighting of a portion of the first 3D body, and the degree of change comprises a change in the lighting of the portion of the first 3D body.

(4112) The first characteristic is associated with a visibility of a portion of the first 3D body, and the degree of change comprises a change in the visibility of the portion of the first 3D body.

*(4114)* The first characteristic is associated with a spectral range of a portion of the first 3D body, and the degree of change comprises a change in the spectral range of the portion of the first 3D body.

*(4116)* The first characteristic is associated with a position of a portion of the first 3D body, and the degree of change comprises a change in the position of the portion of the first 3D body.

*(4118)* The first characteristic is associated with a temporal change of a portion of the first 3D body, and the degree of change comprises a rate of the temporal change of the portion of the first 3D body.

*(4120)* The digital asset comprises a digital video comprising the plurality of digital images arranged in a first temporal sequence.

*(4122)* The digital asset comprises a 2D computer-aided design (CAD) and/or a 3D CAD based on the plurality of digital images.

*(4124)* The determining the characteristic relationship further comprises projecting the portion of the first 3D body to a second 3D body different from the first 3D body.

*(4126)* A first resolution of the digital asset is greater than a second resolution of an image in the plurality of digital images.

*(4128)* The plurality of digital images comprises a first set of digital images corresponding to a first spectral range and a second set of digital images corresponding to a second spectral range different from the first spectral range.

*(4130)* The digital asset provides a layered representation of spectral data, wherein the layered representation comprises a first layer corresponding to the first spectral range and a second layer corresponding to the second spectral range.

*(4132)* The workflow at the computer-enabled imaging device comprises: capturing a plurality of digital images of the ROI, wherein each respective digital image in the plurality of digital images is collectively defined by a plurality of characteristics; determining a characteristic relationship comprising a comparison of a baseline instance of a first characteristic in the plurality of characteristics and a first instance of the first characteristic defining, at least in part, a first digital image in the plurality of digital images; and generating the digital asset based, at least in part, on the first digital image, wherein the digital asset comprises a degree of change of the first characteristic in accordance with the characteristic relationship.

*(4134)* The baseline instance of the first characteristic is acquired from a remote device.

*(4136)* The baseline instance of the first characteristic is determined, at least in part, based on a corresponding industrial application of the digital asset.

*(4138)* The corresponding industrial application of the digital asset is a pharmaceutical application, a cosmetic application, a surgical application, a security application, an entertainment application, an agricultural application, or a combination thereof.

*(4140)* The workflow at the computer-enabled imaging device comprises: applying, to a cryptographic function, the digital asset and identifying information associated with the ROI, thereby generating a cryptographic block associated with a cryptographic non-fungible token asset indicative of the first 3D body; and transmitting, by a communication network, the cryptographic block to one or more cryptographic node devices, thereby recording the cryptographic block on a distributed blockchain ledger system.

*(4142)* The workflow for capturing the digital asset comprises one or more changes in positioning of the computer-enabled imaging device, one or more changes in positioning of the first 3D body, one or more changes in ambient lighting, or a combination thereof.

*(4144)* The executing (E) the workflow further comprises, in accordance with a determination that a respective boundary condition in the plurality of boundary conditions is not satisfied, ceasing the workflow.

*(4146)* Conditioning the executing (E) the workflow in accordance with a determination that a switch mechanism of the computer-enabled imaging device is in a first state.

*(5002)* A method for storing a plurality of cryptographic non-fungible token assets on a distributed blockchain ledger system.

*(5004)* Applying, to a first cryptographic function, a first digital data set comprising a first digital asset and first identifying information associated with a first subject matter of the first digital asset, thereby generating a first cryptographic block associated with a first cryptographic non-fungible token asset indicative of the first digital data set.

*(5006)* The first identifying information comprises a spatial identifier of one or more spatial coordinates associated with the first subject matter, a temporal identifier of a time associated with the first subject matter, a spectral identifier of one or more wavelengths of the electromagnetic spectrum, a biometric identifier of one or more biometric measurements associated with the first subject matter, a metadata identifier of one or more metadata of the first identifying information, or a combination thereof.

*(5008)* The one or more spatial coordinates associated with the first subject matter comprises a longitude, a latitude, an elevation, or a combination thereof.

*(5010)* The one or more spatial coordinates associated with the first subject matter comprises a physical address of the first subject matter.

*(5012)* The first identifying information comprises a spatial distance between the first subject matter and a remote device associated with a corresponding capture of the first digital asset, a length of the first subject matter, a characteristic length of the first subject matter, a height of the first subject matter, a width of the first subject matter, a lighting characteristic of the first subject matter, an orientation of the remote device associated with the corresponding capture of the first digital asset, or a combination thereof.

*(5014)* The first identifying information comprises one or more of a name of the first subject matter, an age of the first subject matter, a date associated with the first subject matter, a gender of the first subject matter, or a combination thereof.

*(5016)* The first identifying information comprises a workflow associated with a capture of the first digital asset.

*(5018)* The workflow comprises one or more computer-implemented instructions for capturing the first digital asset at a first computer-enabled imaging device.

*(5020)* The first identifying information is provided, at least in part, by the first subject matter.

*(5022)* The first identifying information comprises an owner of the first cryptographic non-fungible token asset.

*(5024)* The first digital asset comprises one or more digital images, one or more 2D maps, one or more 3D maps, one or more dense point clouds, one or more textured meshes, or a combination thereof.

*(5026)* Transmitting, by a communication network, the first cryptographic block to one or more cryptographic node devices associated with the distributed blockchain ledger system, thereby recording the first cryptographic block on the distributed blockchain ledger system.

*(5028)* Prior to the transmitting (B) the first cryptographic block, validating the first cryptographic block against a set of consensus rules, thereby determining whether the first cryptographic block satisfies each protocol rule in a set of protocol rules.

*(5030)* Further applying, to a second cryptographic function, a second digital data set comprising a second digital asset and second identifying information associated with a second subject matter of the second digital asset, thereby generating a second cryptographic block associated with a second cryptographic non-fungible token asset indicative of the second digital data set.

*(5032)* The first digital asset and the second digital asset are in a plurality of cryptographic non-fungible token assets, and wherein the plurality of cryptographic non-fungible token assets comprise an inimitable cryptographic non-fungible token asset.

*(5034)* The first cryptographic function or the second cryptographic function is a block cipher function.

*(5036)* The first cryptographic function or the second is a hash function.

*(5038)* The first cryptographic function is different from the second cryptographic function.

*(5040)* The first subject matter comprises a first 3D body at a first spacetime and the second subject matter comprises the first 3D body at a second spacetime different from the first spacetime.

*(5042)* The first subject matter comprises a first 3D body at a first spacetime and the second subject matter comprises a second 3D body, different from the first 3D body, at a second spacetime different from the first spacetime.

*(5044)* Transmitting, by the communication network, the second cryptographic block to the one or more cryptographic node devices, thereby recording the second cryptographic block on the distributed blockchain ledger system.

*(5046)* Receiving, in electronic from, from the one or more node devices, a blockchain data set comprising the first cryptographic block and the second cryptographic block, thereby storing the plurality of cryptographic non-fungible token assets on the distributed blockchain ledger system.

*(5048)* The receiving (E) the blockchain data set is responsive to a procurement transaction request for the blockchain data set.

*(5050)* Evaluating, by one or more computational models, the blockchain data set, thereby forming a third digital data set different from the first digital data set and the second digital data set.

*(5052)* The third digital data set comprises a transdiagnostic factor derived, by the one or more computational models, from the first identifying information and the second identifying information.

*(5054)* The third digital data set comprises a third digital asset associated with the first subject matter and the second subject matter.

*(5056)* The third digital asset comprises a monolithic 3D body comprising the first subject matter and the second subject matter.

*(5058)* The one or more computational models for forming the third digital asset comprises one or more supervised models, one or more unsupervised models, one or more semi-supervised models, or a combination thereof.

*(5060)* The one or more supervised models comprises a decision tree model, a rule based model, a support vector machine model, a neural network model, a probabilistic model, or a combination thereof.

*(5062)* The neural network comprises a convolutional neural network or a generative adversarial neural network.

*(5064)* The support vector machine model comprises a Lagrangian parametric model.

*(5066)* The probabilistic model comprises a Naïve Bayes model, Bayesian model, max entropy model, or Poisson distribution model.

*(5068)* The decision tree model comprises one or more pre-pruning instructions, one or more post-pruning instructions, one or more gain instructions, or a combination thereof.

*(5070)* Further applying, to a third cryptographic function, the third digital data set comprising third identifying information associated with a third subject matter of the third digital asset, thereby generating a third cryptographic block associated with a third cryptographic non-fungible token asset indicative of the third digital data set; and transmitting, by the communication network, the third cryptographic block to the one or more cryptographic node devices, thereby recording the third cryptographic block on the distributed blockchain ledger system.

(6002) A method of allowing access to a cryptographic non-fungible token asset on a distributed blockchain ledger system.

(6004) Receiving, by a communication network, from a remote device, a request to obtain the cryptographic non-fungible token asset.

> (6006) The request is a procurement transaction request for the cryptographic non-fungible token asset.

(6008) Determining whether the request satisfies one or more restriction conditions associated with accessing the cryptographic non-fungible token asset.

(6010) Applying, in accordance with a determination that each restriction condition in the one or more restriction conditions is satisfied, to a cryptographic function, a digital data set comprising identifying information associated with cryptographic non-fungible token asset, thereby generating a third cryptographic block associated with the cryptographic non-fungible token asset.

> (6012) The identifying information comprises a monetary value of the cryptographic non-fungible token asset, spatial information associated with the cryptographic non-fungible token asset, temporal information associated with the cryptographic non-fungible token asset, spectral information associated with the cryptographic non-fungible token asset, or a combination thereof.

> (6014) The one or more restriction conditions comprises one or more transfer restrictions, one or more reading restrictions, one or more writing restrictions, one or more copying restrictions, one or more recovery restrictions, or a combination thereof.

(6016) Transmitting, by the communication network, the cryptographic block to one or more cryptographic node devices, thereby recording the cryptographic block on the distributed blockchain ledger system and allowing access to the cryptographic non-fungible token asset at the remote device.

SYSTEMS, METHODS, AND DEVICES FOR GENERATING DIGITAL AND CRYPTOGRAPHIC ASSETS BY MAPPING BODIES FOR N-DIMENSIONAL MONITORING USING MOBILE IMAGE DEVICES

CROSS-REFERENCE TO RELATED APPLICATION

The present Application claims priority to U.S. Provisional Patent Application No. 63/290,041, entitled "Systems, Methods, and Devices for Generating Digital and Cryptographic Assets by Mapping Bodies for N-Dimensional Monitoring Using Mobile Imaging Devices," filed Dec. 15, 2021, which is hereby incorporated by reference in its entirety for all purposes.

BACKGROUND

Field

The present disclosure relates to imaging. More particularly, the present disclosure relates to systems and method for capturing image data, storing information, evaluating information, accessing information, protecting information, or a combination thereof.

Description of Related Art

Recently, capabilities that enable scanning of real-world objects to create digital data has captured consumer interest. Part of this increased interested is due to additional available computational resources and expanded utilization of such scans, including uses in additive manufacturing, digital garment fittings, and the like. However, when scanning real-world objects, small differences in position or orientation generate significant noise. One conventional solution compensates for this noise by co-align images from the scan based on their background. Yet this conventional solution is problematic when generating three-dimensional (3D) data due to inherent errors in the determined nature of the real-world object. Moreover, another conventional solution utilizes 3D surface reconstruction techniques, which require active depth sensors or high-end graphic processors (GPUs), which limits practical applications for consumers.

Once acquired, entry and storage of information is often difficult to associated with the acquired image data. For instance, with electronic health records (EHR), medical practitioners are tasked with entering information using structured data, semi-structured data, or unstructured data. Moreover, not every medical practitioner will enter the same information type in the same data structure. Conventional solutions aggregate the EHRs from sources, such as into a data lake that provides a schema-less repository for the EHRs with common access rights. However, such an aggregation approach fails to provide tools that allow end-users to explore and map the information that is not obtained during an ingestion phase of data acquisition.

Furthermore, with the advent of Bitcoin and similar blockchain technologies, such as the Ethereum blockchain, unique and innovative information registration techniques are provided that guarantee transparency and protection of data transferred between subjects. Moreover, these blockchain technologies allow for the acquisition of information associated with an origin of the information, such as an author of or creditor of a cryptographic asset. However, conventional applications of this technology have been limited to financial or artistic endeavors. Moreover, the conventional applications lack an ability to combine and/or partition cryptographic assets for access purposes.

Thus, prior to the present disclosure there existed a need for processes that allow for capturing a digital asset indicative of a real-world object, storing the digital asset using a cryptographic asset, and allowing access to the cryptographic asset.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Advantageously, the systems, methods, and devices detailed in the present disclosure address the shortcomings in the prior art detailed above.

Various aspects of the present disclosure are directed to providing a distributed computer system, a computer-enabled imaging device, a non-transitory computer readable storage medium including at least one executable program, and a method thereof. Particularly, the distributed computer system, the computer-enabled imaging device, the non-transitory computer readable storage medium including at least one executable program, and the method thereof provide for capturing a real world environment that includes a three-dimensional (3D) body and generating a digital asset associated with the 3D body (e.g., a computer generated model including one or more data sets associated with the environment), storing the digital asset with in a collection of a plurality of digital assets, evaluating the plurality of digital assets, generating a cryptographic non-fungible token asset indicative of the digital asset, allowing access to the cryptographic NFT asst, or a combination thereof.

To briefly describe more particular aspects of the present disclosure:

Capture.

One aspect of the present disclosure is directed providing systems, methods, and devices for capturing a real world environment that includes a 3D body (e.g., a human subject, a flora of a region of interest, an inanimate object, etc.) and generating a digital asset associated with the 3D body, hereinafter "capturing the digital asset." In some embodiments, the systems and methods for capturing the digital asset use one or more sensors (e.g., two sensors, three sensors, . . . , twenty sensors, etc.) of a computer-enabled imaging device. The one or more sensors includes a gyroscope sensor, an accelerometer sensor, a light detection and range sensor (LIDAR), or a combination thereof, which is used to acquire a plurality of space-time characteristics of the environment (e.g., before and/or when capturing the digital asset). In some embodiments, the plurality of space-time characteristics provide a simultaneous localization and mapping (SLAM) of a trajectory of the computer-enabled imaging device. In some embodiments, the plurality of space-time characteristics is used by one or more computational models to generate spatially registered base maps of the 3D body.

In some embodiments, the digital asset is two-dimensional (2D) (e.g., defined by x and y spatial coordinates), 3D (e.g., defined by x, y, and z spatial coordinates), four-dimensional (4D) (e.g., defined by x, y, and z spatial coordinates including a temporal coordinate), or n-dimensional (n-D). By way of example, consider a plurality of dimensions of a n-D digital asset defined by one or more spatial coordinates, one or more temporal coordinates, one or more spectral signatures, one or more physical light characteristics, one or more digital data sets provided by a computational model, or a combination thereof. Non-limiting examples of the one or more digital data sets include a resultant data set based on an evaluation of the digital asset, such as a classification evaluation (e.g., texture extraction classification, digital image segmentation and object-based evaluation classification, etc.), first comparison between a plurality of digital images associated with the digital asset, a second comparison between one or more computer automated design (CAD) models, and the like.

In some embodiments, the systems and methods of the present disclosure provide for acquisition of one or more digital data sets associated with the 3D body of the ROI. For instance, in some embodiments, the systems and methods of the present disclosure utilize the LIDAR sensor of the computer-enabled imaging device to generate a 2D digital asset, a 3D digital asset, a 4D digital asset, a n-D digital asset, or a combination thereof. In some such embodiments, the 2D digital asset, the 3D digital asset, the 4D digital asset, or the n-D digital asset is augmented by further using the LIDAR sensor to improve or develop the 2D digital asset, the 3D digital asset, the 4D digital asset, the n-D digital asset over a period of time. As a non-limiting example, in some embodiments, the digital asset is improved over a period of time by forming a third digital asset using one or more computational models in accordance with pairwise point cloud registration (PCR) based on paring of a first digital asset and a second digital asset. However, the present disclosure is not limited thereto.

In some embodiments, the systems and methods of the present disclosure capture the digital asset by capturing a plurality of digital images of the ROI including the 3D body associated with the digital asset. Accordingly, in some such embodiments, the systems and methods of the present disclosure utilize a characteristic relationship to affect a degree of change on a digital image in the plurality of digital images. As a non-limiting example, the systems and methods of the present disclosure utilize the characteristic relationship for alignment of the 3D body in each digital image, such as by controlling a roll of the computer-enabled imaging device, a pitch of the computer-enabled imaging device, a distance between a portion of the computer-enabled imaging device and a portion (e.g., center) of the 3D body, and the like. In some embodiments, this alignment is facilitated when capturing the plurality of digital images, such as by using one or more visual cues, one or more haptic cues, one or more audio cues, or a combination thereof. In some embodiments, this alignment is facilitated after capturing the plurality of images, such as by one or more intensity-based and/or feature-based registration computational models. From this, the systems and methods of the present disclosure minimize various differences of multi-temporal digital images of the 3D body by maximizing co-alignment between each digital image.

In some embodiments, the one or more sensors of the computer-enabled imaging device provides robust, tight integration for multi-modality sensing capabilities. For instance, in some such embodiments, the LIDAR sensor of the computer-enabled imaging device allows the systems and methods of the present disclosure to execute a workflow for capturing a digital asset. The workflow includes conducting a 3D scanning process of the 3D body using at least the LIDAR sensor. From this 3D scanning process, the systems and methods of the present disclosure allow for capturing the digital asset, such that the digital asset includes accurate, absolute distance measurement digital data sets provided, at least in part, by the LIDAR sensor. Moreover, the 3D scanning process of the systems and methods of the present disclosure enables scanning of the 3D body to capture the digital asset that includes a point cloud data set that represents a set of 3D points in a coordinate system. Moreover, the point cloud of the present disclosure is dense enough (e.g., $1\times10^2$ points, $1\times10^3$ points, $1\times10^4$ points, $1\times10^5$ points, $1\times10^6$ points, $1\times10^7$ points, $1\times10^8$ points, etc.) to build a digital 3D model (e.g., 3D CAD model) of the 3D body. Furthermore, in some embodiments, the systems and methods of the present disclosure execute the workflow at different points in time and/or space, which enables accurate repetition of the 2D or 3D scanning of the 3D body. In some embodiments, the repetition of the 2D or 3D scanning of the 3D body captures a 4D digital asset associated with the 3D body, such as by augmenting an initial instance of the 2D or 3D scanning of the 3D body to improve one or more characteristics the point cloud of a first digital asset. Accordingly, this improving the one or more characteristics the point cloud includes a uniform presentation characteristic (e.g., an unstructured, unordered data set of 3D points in a Euclidian space), a discrete representation characteristic (e.g., various samples of shapes without topologic and/or geometric restrictions), an irregularity characteristic (e.g., determine an irregular spatial distribution and/or varying spatial density), an incompleteness characteristic (e.g., due to discrete sampling); an ambiguity characteristic (e.g., based on a nearest neighbor point, such as surface type, object type, etc.), a per-point attribute characteristics (e.g., surface normal, color, reflectance, etc.), a massiveness characteristic (e.g., a density of the point cloud), or a combination thereof.

In some such embodiments, the workflow is generated at a first computer-enabled imaging device when capturing the digital at the first computer-enabled imaging device or generated at the first computer-enabled imaging device for execution at a second computer-enabled imaging device different than the first computer-enabled imaging device. As such, the workflow provides an orchestrated and repeated process (e.g., for performance by an end-user at the computer-enabled imaging device) that allows for capturing a different digital asset associated with the 3D body, or a different 3D body, using the workflow. Accordingly, the workflow allows for revisiting the base map for innovative body parts mapping, full human body mapping, and other non-human target bodies uses that augments the base map.

In some embodiments, the executing the workflow at different points in time generates a n-D digital asset (e.g., in which n is greater than or equal to four) by capturing one or more spectral signals associated with the ROI, such as a digital image of a spectral range, which is mapped onto the 3D model or utilized for comparison against a different digital asset. In some embodiments, the spectral range includes cross and/or linearly polarized layers. In some embodiments, the spectral signals is configured to reveal one or more surfaces or subsurface features of the 3D body. For instance, as a non-limiting example, in some embodiments, one or more optical computational models utilize the spectral signatures to create a digital volumetric model of the 3D body by using specific selected spectral bands provided by one or more light sources in combination with cross polarization (e.g., one or more polarizing filters of the computer-enabled imaging device) allows the systems and methods of the present disclosure to generate the n-D digital asset to provide visualization of subepidermal features of the 3D body. Accordingly, by assigning different spectral ranges to different layers of the 3D model digital asset, the different spectral aspects are collectively grouped, altered, moved, hidden, or a combination thereof from the 3D model digital asset as required by one of skill in the art of the present disclose.

In some embodiments, the systems and methods of the present disclosure allow for capturing the digital asset associated with the 3D body or one or more sub-bodies of the 3D body. As a non-limiting example, consider a human 3D body with each sub-body in the one or more bodies defined at a point of articulation of the human 3D body. In some embodiments, the systems and methods of the present disclosure capture a first digital asset associated with a first sub-body in the one or more sub-bodies and a second digital asset associated with a second sub-body in the one or more sub-bodies (e.g., first digital asset of a face, second digital asset of a foot, etc.). In some such embodiments, a third digital asset is generated based on the first and second digital assets, in which the third digital asset is associated with a combination of the first and second sub-bodies. For instance, consider the systems and methods of the present disclosure executing one or more workflows (e.g., longer and/or new 3D scan processes), in which each instance of a respective workflow increases LIDAR point cloud density resolution to enable whole body mapping of the 3D body based on a complication of the one or more sub-bodies. From this, an expansion to any 3D body using enhanced LIDAR point cloud densities to develop a standalone 3D body capable of being revisited to be characterized over time is provided by the systems and methods of the present disclosure.

In some embodiments, the systems and methods of the present disclosure determine a plurality of boundary conditions that collectively define standards for executing the workflow for capturing the digital asset. In some embodiments, the plurality of boundary conditions facilitates lighting standardization, such as by removing contaminating ambient light using one or more computational models. As another non-limiting example, in some embodiments, the plurality of boundary conditions is configured to guide (e.g., assist, support) an end-user operating the computer-enabled imaging device through: the workflow; an automatic revisitation of a portion of the ROI (e.g., in accordance with a determination of a deficiency in a digital asset); map a portion of the 3D body; illuminate the portion of the ROI; or a combination thereof to enable complete standardized photographic digital assets. From this, medical personnel, patients off-site, various consumer in-residence uses, and the like utilize the digital assets as fit for specific industrial applications.

In some embodiments, the systems and methods of the present disclosure guide the end-user by displaying a graphical user interface on a display, such as a first display of the computer-enabled imaging device or a second display of a remote client device. In some such embodiments, the graphical user interface is configured to display a visualization of a different metric directly derived from the one or more sensors of the computer-enabled imaging device. In some embodiments, the graphical user interface is configured to support the end-user when executing the workflow to capture the digital asset in order to collect a digital data set in accordance with the plurality of boundary conditions, such as pre-defined target boundary conditions. In some embodiments, the graphical user interface displays the visualization of a respective boundary condition in a set of boundary conditions (e.g., some or all of the plurality of boundary conditions). For instance, in some embodiments, the visualization includes a plurality of visual cues to cease the attention of the end-user.

In some embodiments, the plurality of visual cues include a first visual que exhibited within the graphical user interface as a visual bubble configured to support positioning the computer-enabled imaging device in an upright, non-tilted position (e.g., roll and pitch are each <1 degrees), in which a roll and a pitch of the computer-enabled imaging device are determined in real-time, or substantially real time (e.g., a millisecond) using the gyroscope sensor. In some embodiments, the plurality of visual cues include a second visual cue that is exhibited within the graphical user interface as one or more bars, lines, dots, or a combination thereof. As a non-limiting example, consider one or more cross bars displayed to project over a portion (e.g., face) of the 3D Body, a first horizontal line displayed to project intersecting each center of a first set of features (e.g., eye) of the 3D body, a second vertical line displayed to project intersecting each point on a second set of features (e.g., nose and lips) of the 3D body, and the like. In some embodiments, the plurality of visual cues include a third visual cue that is exhibited within the graphical user interface as a plurality of points (e.g., point cloud) projected onto the portion of the 3D body. Accordingly, a characteristic of each respective visual cue is based on a corresponding boundary condition and changes when the corresponding boundary condition is satisfied, such as increasing a display size of the respective visual cue, decreasing the display size of the respective visual cue, changing a display color of the respective visual cue, changing a display shape of the respective cue, or a combination thereof. Accordingly, by utilizing the plurality of boundary conditions with the plurality of visual cues, the systems and methods of the present disclosure utilize real time (e.g., near instantaneous, such as less than 1 millisecond) image processing techniques to position the computer-enabled imaging device within the environment.

In some embodiments, a respective visual cue is associated with a haptic cue. In some embodiments, the respective visual cue is associated with an audio cue, such as a guide user to "move closer," "move further," "hold," or a combination thereof in order to satisfy a respective boundary condition.

In some embodiments, the systems and methods of the present disclosure evaluates the ROI to determine an identity of the 3D body. In some embodiments, this evaluation is based on a comparison against the plurality of digital assets. In some such embodiments, this evaluation utilizes one or more feature recognition processes, such as a facial recognition process and/or body port recognition process. In some embodiments, this evaluation is based on a determination of one or more characteristics associated with the ROI, such as a determined identity of the ROI, one or more optical characteristics of the ROI, and the like. In some embodiments, this evaluation includes requiring a presence of a first 3D body in a plurality of 3D bodies (e.g., presence of a first end-user) and/or absence of a second 3D body in the plurality of 3D bodies (e.g., absence of a portion of the first end-user, such as a human eye).

In some embodiments, the systems and methods of the present disclosure are configured for a particular industrial process, such as a medical application, a skincare application, a forensics application, a biometric application, a security application, an anthropological application, an entertainment application, an agricultural application, a fashion or textile application, or the like.

Turning to more specific aspects, one aspect of the present disclosure is directed to providing a method for capturing a digital asset. The method is performed at a computer-enabled imaging device. The computer-enabled imaging device includes one or more processors, one or more sensors, a display, and a controller. At least one program is non-transiently stored in the controller, or a memory accessible by the controller, and executable by the controller. The at least one program causing the controller to perform the method. The method includes acquiring, in electronic form, using at least the one or more sensors, an initial state of an environment. The environment includes a state of each sensor in the one or more sensors, a ROI, and a state of one or more light sources. The ROI includes a first 3D body. Moreover, the digital asset is associated with the first 3D body. The method further includes determining, based at least in part on the initial state of the environment, a plurality of boundary conditions associated with a workflow for capturing the digital asset. From this, the method includes displaying, within a graphical user interface on the display, a visualization of each respective boundary condition in a set of boundary conditions in the plurality of boundary conditions. The visualization includes a plurality of visual cues. The plurality of visual cues include a first visual cue and a second visual cue. Each respective visual cue in the plurality of visual cues provides a visual indication of a state of a corresponding boundary condition in the set of boundary conditions. Moreover, the method includes updating, when displaying the graphical user interface, at least one of the first visual cue and the second visual cue when each boundary condition in the set of boundary conditions is satisfied. The method further includes executing, in accordance with a determination that each boundary condition in the set of boundary conditions is satisfied, the workflow at the computer-enabled imaging device. From this, the method captures the digital asset.

In some embodiments, the one or more sensors includes a gyroscope, an accelerometer, or both. In some embodiments, the one or more sensors includes an objective lens and a two-dimensional pixelated detector in communication with the objective lens. In some embodiments, the one or more sensors includes a light detection and ranging (LIDAR) sensor.

In some embodiments, the initial state of the environment includes one or more spatial dimensions characteristics of the environment. In some embodiments, the one or more spatial dimensions characteristics includes a spatial distance between the first 3D body and a sensor in the one or more sensors, a length of the first 3D body, a characteristic length of the first 3D body, a height of the first 3D body, a width of the first 3D body, a lighting characteristic, an orientation of the computer-enabled imaging device, or a combination thereof. In some embodiments, the initial state of the environment includes a first characteristic of an ambient lighting.

In some embodiments, the one or more light sources includes a light emitting diode (LED). In some embodiments, the LED is an additive white LED. In some embodiments, the LED is an additive wavelength range specific LED.

In some embodiments, the one or more light sources includes a polarized light source. In some embodiments, the polarized light source is an additive polarized light source.

In some embodiments, the first 3D body is a portion of a first human subject.

In some embodiments, the first human subject is an operator of the computer-enabled imaging device. In some embodiments, a second human subject different from the first human subject is an operator of the computer-enabled imaging device.

In some embodiments, the first 3D body includes a plurality of sub-bodies. Moreover, the digital asset is a digital representation of at least one sub-body in the plurality of sub-bodies.

In some embodiments, the plurality of boundary conditions includes a position tolerance of the computer-enabled imaging device.

In some embodiments, the computer-enabled is a mobile imaging device. Furthermore, the position tolerance of the computer-enabled imaging device includes one or more translational position tolerances of the mobile imaging device, one or more rotational position tolerances of the mobile imaging device, or both.

In some embodiments, the one or more translational position tolerances includes a distance tolerance from the ROI.

In some embodiments, the one or more rotational position tolerances includes a yaw tolerance, a pitch tolerance, a roll tolerance, or a combination thereof.

In some embodiments, a first boundary condition in the plurality of boundary conditions is based on a historical workflow associated with the first 3D body.

In some embodiments, the computer-enabled imaging device includes a power supply powering the computer-enabled imaging device and the one or more light sources.

In some embodiments, the computer-enabled imaging device is controlled through an interface on a second computer-enabled device.

In some embodiments, the initial state is associated with a point in spacetime.

In some embodiments, the one or more light sources includes a laser light source. In some embodiments, the laser light source is a pulsed laser.

In some embodiments, a respective light source in the one or more light sources is configured to emit light that is substantially limited to a spectral range. In some embodiments, the spectral range is an ultra-violet (UV) spectral range (e.g., UV-A, UV-B, UV-C, or combination thereof), a visible spectral range, a near-infrared spectral range, or the like.

In some embodiments, the digital asset includes one or more digital images, one or more two-dimensional (2D) maps, one or more 3D maps, one or more dense point clouds, one or more textured meshes, one or more cryptographic non-fungible token assets, or a combination thereof. In some embodiments, the one or more 2D maps includes a decomposable triangulated graph.

In some embodiments, the workflow at the computer-enabled imaging device includes capturing a plurality of digital images of the ROI. Each respective digital image in the plurality of digital images is collectively defined by a plurality of characteristics. Moreover, the workflow at the computer-enabled imaging device includes determining a characteristic relationship. The characteristic relationship includes a comparison of a first instance of a first characteristic in the plurality of characteristics defining, at least in part, a first digital image in the plurality of digital images and a second instance of the first characteristic defining, at least in part, a second digital image in the plurality of digital images. The workflow at the computer-enabled imaging device further includes generating the digital asset based, at least in part, on the second digital image. The digital asset includes a degree of change of the first characteristic in accordance with the characteristic relationship.

In some embodiments, the first characteristic is associated with a position of a portion of the first 3D body. Furthermore, the degree of change includes a change in the position of the portion of the first 3D body.

In some embodiments, the change in the position includes aligning the portion of the first 3D body to a direction.

In some embodiments, the change in the position includes compensating for a tilt and/or a pan of the computer-enable imaging device.

In some embodiments, the first characteristic is associated with a lighting of a portion of the first 3D body. Moreover, the degree of change includes a change in the lighting of the portion of the first 3D body.

In some embodiments, the first characteristic is associated with a visibility of a portion of the first 3D body. Furthermore, the degree of change includes a change in the visibility of the portion of the first 3D body.

In some embodiments, the first characteristic is associated with a spectral range of a portion of the first 3D body. Moreover, the degree of change includes a change in the spectral range of the portion of the first 3D body.

In some embodiments, the first characteristic is associated with a position of a portion of the first 3D body. Furthermore, the degree of change includes a change in the position of the portion of the first 3D body.

In some embodiments, the first characteristic is associated with a temporal change of a portion of the first 3D body. Moreover, the degree of change includes a rate of the temporal change of the portion of the first 3D body.

In some embodiments, the digital asset includes a digital video. The digital video includes the plurality of digital images arranged in a first temporal sequence.

In some embodiments, the digital asset includes a 2D computer-aided design (CAD) and/or a 3D CAD based on the plurality of digital images.

In some embodiments, the determining the characteristic relationship further includes projecting the portion of the first 3D body to a second 3D body different from the first 3D body.

In some embodiments, a first resolution of the digital asset is greater than a second resolution of an image in the plurality of digital images.

In some embodiments, the plurality of digital images includes a first set of digital images corresponding to a first spectral range. The plurality of digital images further includes a second set of digital images corresponding to a second spectral range different from the first spectral range.

In some embodiments, the digital asset provides a layered representation of spectral data. The layered representation includes a first layer corresponding to the first spectral range and a second layer corresponding to the second spectral range.

In some embodiments, the workflow at the computer-enabled imaging device includes capturing a plurality of digital images of the ROI. Each respective digital image in the plurality of digital images is collectively defined by a plurality of characteristics. Furthermore, the workflow at the computer-enabled imaging device includes determining a characteristic relationship. The characteristic relationship includes a comparison of a baseline instance of a first characteristic in the plurality of characteristics and a first instance of the first characteristic defining, at least in part, a first digital image in the plurality of digital images. The workflow at the computer-enabled imaging device further includes generating the digital asset based, at least in part, on the first digital image. The digital asset includes a degree of change of the first characteristic in accordance with the characteristic relationship.

In some embodiments, the baseline instance of the first characteristic is acquired from a remote device. In some embodiments, the baseline instance of the first characteristic is determined, at least in part, based on a corresponding industrial application of the digital asset.

In some embodiments, the corresponding industrial application of the digital asset is a pharmaceutical application, a cosmetic application, a surgical application, a security application, an entertainment application, an agricultural application, or a combination thereof.

In some embodiments, the workflow at the computer-enabled imaging device includes applying, to a cryptographic function, the digital asset and identifying information associated with the ROI. From this, a cryptographic block associated with a cryptographic non-fungible token asset indicative of the first 3D body is generated. Moreover, the workflow at the computer-enabled imaging device includes transmitting, by a communication network, the cryptographic block to one or more cryptographic node devices. From this, the cryptographic block on a distributed blockchain ledger system is recorded.

In some embodiments, the digital asset includes one or more cryptographic non-fungible token assets. Moreover, the one or more cryptographic non-fungible token assets includes an inimitable cryptographic non-fungible token asset.

In some embodiments, the workflow for capturing the digital asset includes one or more changes in positioning of the computer-enabled imaging device, one or more changes in positioning of the first 3D body, one or more changes in ambient lighting, or a combination thereof.

In some embodiments, the updating the at least one of the first visual cue and the second visual cue includes increasing a display size of the at least one of the first visual cue and the second visual cue, decreasing the display size of the at least one of the first visual cue and the second visual cue, changing a display color of the at least one of the first visual cue and the second visual cue, changing a display shape of the at least one of the first visual cue and the second visual cue, or a combination thereof.

In some embodiments, the first visual cue is exhibited in the graphical user interface as an annulus, a circle, a polygon, a line, or a combination thereof. In some embodiments, the second visual cue is exhibited within the graphical user interface as a compass rose. In some embodiments, the plurality of visual cues include a third visual cue associated with a feature of the first 3D body. In some embodiments, the feature of the first 3D body includes a facial feature. In some embodiments, the plurality of visual cues includes a fourth visual cue associated with a projected representation of light projected onto the first 3D body.

In some embodiments, the projected representation of light includes a triangulated representation. The triangulated representation includes a plurality of vertices and a corresponding plurality of edges interconnecting the plurality of vertices.

In some embodiments, the computer-enabled imaging device further includes a vibration mechanism housed by computer-enabled imaging device. Moreover, the updating the graphical user interface further includes causing the vibration mechanism to provide a plurality of vibrations at a frequency through a housing of the computer-enabled imaging device.

In some embodiments, the plurality of vibrations includes a set of synchronous vibrations.

In some embodiments, the ROI includes a second 3D body different from the first 3D body. Furthermore, the determining the plurality of boundary conditions is based on one or more characteristics of the second 3D body.

In some embodiments, the executing the workflow further includes, in accordance with a determination that a respective boundary condition in the plurality of boundary conditions is not satisfied, ceasing the workflow.

In some embodiments, the method further includes conditioning the executing of the workflow in accordance with a determination that a switch mechanism of the computer-enabled imaging device is in a first state.

In some embodiments, the computer-enabled imaging device further includes an audio circuitry housed by the computer-enabled imaging device. Moreover, the updating the graphical user interface further includes causing the audio circuitry to provide one or more audible cues.

Yet another aspect of the present disclosure is directed to providing a computer system for capturing a digital asset. The computer system including one or more processors, one or more processors, one or more sensors, a display, and a controller. At least one program is non-transiently stored in the controller and executable by the controller. The at least one program causes the controller to perform a method of the present disclosure.

Yet another aspect of the present disclosure is directed to providing a non-transitory computer readable storage medium storing one or more programs. The one or more programs includes instructions, which when executed by a computer system (e.g., distributed computer system), cause the computer system to perform a method of the present disclosure for capturing a digital asset.

Storage and/or Evaluation.

Another aspect of the present disclosure is directed to providing systems and methods for development and/or maintenance of a database, such as a distributed server system or the like, that includes a plurality of digital assets. In some embodiments, the database stores the plurality of digital assets in the form of a plurality of cryptographic assets indicative of the plurality of digital assets. While some example features are described herein in terms of storage and evaluation of the plurality of digital assets, those skilled in the art will appreciate from the present disclosure that various other similar features for cryptographic assets have not been illustrated for the sake of brevity and so as not to obscure more pertinent aspects of the examples disclosed herein.

Accordingly, the systems and methods of the present disclosure facilitating receiving a respective digital asset captured at the computer-enabled imaging device for storage and/or analysis by inclusion in the plurality of digital assets. As such, not only do the systems and methods of the present disclosure store a digital asset in the plurality of assets but also store rich data sets associated with the digital asset in the form of the identifying information associated with a subject matter of the first digital asset. By way of example, in some embodiments, this identifying information includes an identification of a 3D body, associated meta-data (e.g., units, material, geometric specifications, elapsed time when executing a workflow associated with the digital asset, audio, design versions, environmental information, bounding-box dimensions, volume, surface area, etc.), and the like. However, the present disclosure is not limited thereto.

In some embodiments, this analysis of the respective digital asset is performed in insolation by considering each respective digital asset in the plurality of digital assets associated with a first subject matter (e.g., a particular 3D body). For instance, in some embodiments, a first digital asset is associated with a first 3D body at a first point in spacetime and a second digital asset is associated with the first 3D body at a second point in spacetime, which allows for evaluation of one or more temporal trends or patterns identified when comparing the first digital asset against the second digital asset. However, the present disclosure is not limited thereto. In alternative embodiments, this analysis of the respective digital asset is performed against the plurality of digital assets, such as by or considering the respective digital asset together with the plurality of digital assets.

Accordingly, in some embodiments, the systems and methods of the present disclosure facilitate capturing the plurality of digital assets (e.g., a plurality of digital images) associated with the 3D body at the computer-enabled imaging device and apply one or more temporal progression comparison computational models to the plurality of digital assets. From this, the systems and methods of the present disclosure monitor a respective 3D body associated with the plurality of the digital assets by uniquely monitor changes of gross to fine features of the 3D body. In some embodiments, the changes include biological changes. In this way, storing the digital asset with the identifying information that includes imaging information is particularly important because the imaging information provides spatially and temporally relevant information that is localized to particular portions of the 3D body (e.g., anatomic and/or functional information). For instance, in some embodiments, the monitoring of changes includes determining a change in spatial size of a portion of the 3D body (e.g., a change in length of an inflamed region), a change in shape, a change in spectral occurrence, a change in density (e.g., amount per surface area, etc.), or a combination thereof. As yet another non-limiting example, in some embodiments, the monitoring of changes includes determining a change in: angiogenesis, calcification, lipid-deposits, necrosis, hemorrhage, rigidity, density, stenosis, dilation, angle of attack (e.g., entrance and exit angle), or a combination thereof. In some embodiments, the change is based on a change in quantity, a change in degree, a change in character, or a combination thereof. From this, the systems and methods of the present disclosure allow for registration of spatial changes associated with the 3D body, which provides new levels of biological cartographic mapping to show detailed changes over time of the 3D body that otherwise would be unobservable to the naked eye or at an instantaneous point of time. As a non-limiting example, in some embodiments, by storing the plurality of digital assets and the identifying information, the systems and methods of the present disclosure provide quantitative imaging evaluations for specific biological characteristics, such as a first characteristics indicates the effectiveness of a first treatment administered to the 3D body, how effective a current treatment is when administered to the 3D body, what risk a subject is at should the subject remains untreated, or the like.

In some embodiments, the systems and methods of the present disclosure enable a first end-user to capture a digital asset using a computer-enabled imaging device (e.g., client device). From this, the computer-enabled imaging device transmits, by a communication network, the digital asset to a computer-enabled system (e.g., distributed blockchain ledger system), which then facilitates storing and evaluating the digital asset, such as by inclusion within the plurality of digital assets. By storing the digital asset, the systems and methods of the present disclosure provide an organically growing database that yields an unprecedented data set based on imagery of various ROIs with identifying information with similar capturing modalities (e.g., distance, angle, lighting, etc.). In some embodiments, this identifying information associated with the digital asset includes the workflow executed at the computer-enabled imaging device to capture the digital asset. In some embodiments, the identifying information includes all data elements associated with the digital asset including one or more digital images, one or more 3D digital models, meta data, one or more value added products, one or more derived data sets, and the like. In some embodiments, the meta data includes a date of capture of the digital asset, an orientation of the computer-enabled imaging device, a spatial dimension of a feature (e.g., height), and the like. In some embodiments, the meta data includes one or more spacetime coordinates and/or one or more spectral signatures associated with the capture of the digital asset. In some embodiments, the plurality of digital assets is associated with the first end-user, which allows for enabling temporal comparison between two or more digital assets in the plurality of digital assets, such as between the identifying information of the two or more assets. In some embodiments, the plurality of digital assets is associated with a plurality of end-users including the first end-user, which allows for enabling cohort-based comparisons between two or more digital assets in the plurality of digital assets associated with similar 3D bodies (e.g., face, hand, leg, full body, etc.). However, the present disclosure is not limited thereto.

Turning to more specific aspects, yet another aspect of the present disclosure is directed to providing a method of storing a plurality of cryptographic non-fungible token assets on a distributed blockchain ledger system. The method includes applying, to a first cryptographic function, a first digital data set. The first digital data set includes a first digital asset and first identifying information associated with a first subject matter of the first digital asset, which generates a first cryptographic block associated with a first cryptographic non-fungible token asset indicative of the first digital data set. The method further includes transmitting, by a communication network, the first cryptographic block to one or more cryptographic node devices associated with the distributed blockchain ledger system. From this, the first cryptographic block is recorded on the distributed blockchain ledger system. Moreover, the method includes further applying, to a second cryptographic function, a second digital data set. The second digital data set includes a second digital asset and second identifying information associated with a second subject matter of the second digital asset. Accordingly, a second cryptographic block associated with a second cryptographic non-fungible token asset indicative of the second digital data set is generated. The method further includes transmitting, by the communication network, the second cryptographic block to the one or more cryptographic node devices, which records the second cryptographic block on the distributed blockchain ledger system.

In some embodiments, the first digital asset and the second digital asset are in a plurality of cryptographic non-fungible token assets. Moreover, the plurality of cryptographic non-fungible token assets includes an inimitable cryptographic non-fungible token asset.

In some embodiments, the first identifying information includes a spatial identifier of one or more spatial coordinates associated with the first subject matter, a temporal identifier of a time associated with the first subject matter, a spectral identifier of one or more wavelengths of the electromagnetic spectrum, a biometric identifier of one or more biometric measurements associated with the first subject matter, a metadata identifier of one or more metadata of the first identifying information, or a combination thereof.

In some embodiments, the one or more spatial coordinates associated with the first subject matter includes a longitude, a latitude, an elevation, or a combination thereof. In some embodiments, the one or more spatial coordinates associated with the first subject matter includes s a physical address of the first subject matter.

In some embodiments, the first identifying information includes a spatial distance between the first subject matter and a remote device associated with a corresponding capture of the first digital asset, a length of the first subject matter, a characteristic length of the first subject matter, a height of the first subject matter, a width of the first subject matter, a lighting characteristic of the first subject matter, an orientation of the remote device associated with the corresponding capture of the first digital asset, or a combination thereof.

In some embodiments, the first identifying information includes one or more of a name of the first subject matter, an age of the first subject matter, a date associated with the first subject matter, a gender of the first subject matter, or a combination thereof.

In some embodiments, the first identifying information includes a workflow associated with a capture of the first digital asset. In some embodiments, the workflow includes one or more computer-implemented instructions for capturing the first digital asset at a first computer-enabled imaging device.

In some embodiments, the first identifying information is provided, at least in part, by the first subject matter. In some embodiments, the first identifying information includes an owner of the first cryptographic non-fungible token asset.

In some embodiments, the first cryptographic function or the second cryptographic function is a block cipher function. In some embodiments, the first cryptographic function or the second is a hash function. In some embodiments, the first cryptographic function is different from the second cryptographic function.

In some embodiments, the first digital asset includes one or more digital images, one or more 2D maps, one or more 3D maps, one or more dense point clouds, one or more textured meshes, or a combination thereof.

In some embodiments, the first subject matter includes a first 3D body at a first spacetime and the second subject matter includes the first 3D body at a second spacetime different from the first spacetime. In some embodiments, the first subject matter includes a first 3D body at a first spacetime and the second subject matter includes a second 3D body, different from the first 3D body, at a second spacetime different from the first spacetime.

In some embodiments, the method further includes, prior to the transmitting the first cryptographic block, validating the first cryptographic block against a set of consensus rules. From this, a determination whether the first cryptographic block satisfies each protocol rule in a set of protocol rules is provided.

In some embodiments, the method further includes receiving, in electronic from, from the one or more node devices, a blockchain data set. The blockchain data set includes the first cryptographic block and the second cryptographic block. Accordingly, the plurality of cryptographic non-fungible token assets is stored on the distributed blockchain ledger system.

In some embodiments, the receiving the blockchain data set is responsive to a procurement transaction request for the blockchain data set.

In some embodiments, the method further includes evaluating, by one or more computational models, the blockchain data set. This evaluating the blockchain data set forms a third digital data set different from the first digital data set and the second digital data set. For instance, in some embodiments, the third digital data set includes a third digital asset based on the first digital data set and the second digital data set. In some embodiments, the third digital asset is a combination of the first digital data set and the second digital data set, such as some or all of the identifying information of the first digital data set and the second digital data set. However, the present disclosure is on limited thereto. For instance, in some embodiments, the forming the third digital data set includes identified and quantified biological properties based on a combination of imaging features from a plurality of digital images of the first digital data set and a plurality of non-image data (e.g., environmental state information).

In some embodiments, the third digital data set includes a transdiagnostic factor derived, by the one or more computational models, from the first identifying information and the second identifying information.

In some embodiments, the third digital data set includes a third digital asset associated with the first subject matter and the second subject matter. In some embodiments, the third digital asset includes a monolithic 3D body including the first subject matter and the second subject matter.

In some embodiments, the one or more supervised models includes a decision tree model, a rule based model, a support vector machine model, a neural network model, a probabilistic model, or a combination thereof. In some embodiments, the neural network includes a convolutional neural network or a generative adversarial neural network. In some embodiments, the support vector machine model includes a Lagrangian parametric model. In some embodiments, the probabilistic model includes a Naïve Bayes model, Bayesian model, max entropy model, or Poisson distribution model. In some embodiments, the decision tree model includes one or more pre-pruning instructions, one or more post-pruning instructions, one or more gain instructions, or a combination thereof.

In some embodiments, the method further includes further applying, to a third cryptographic function, the third digital data set. The third digital data set includes third identifying information associated with a third subject matter of the third digital asset. This applying the third digital data set generates a third cryptographic block associated with a third cryptographic non-fungible token asset indicative of the third digital data set. The method further includes transmitting, by the communication network, the third cryptographic block to the one or more cryptographic node devices. This transmitting the third cryptographic block records the third cryptographic block on the distributed blockchain ledger system.

Yet another aspect of the present disclosure is directed to providing a decentralized computing system for storing a plurality of NFT assets. The decentralized computer system includes one or more node devices. Each node device includes one or more processors, and a memory coupled to the one or more processors. The memory storing one or more programs executed by the one or more programs. The one or more programs configured to perform a method of the present disclosure.

Yet another aspect of the present disclosure is directed to providing a non-transitory computer readable storage medium storing one or more programs. The one or more programs includes instructions, which when executed by a computer system (e.g., distributed computer system), cause the computer system to perform a method of the present disclosure for storing a plurality of NFT assets.

Cryptographic Assets.

Yet another aspect of the present disclosure is directed to providing systems and methods that generate a cryptographic asset, such as a cryptographic non-fungible token (NFT) asset based on the digital asset captured at the computer-enabled imaging device. From this, in some embodiments, the systems and methods of the present disclosure store the digital asset in at least the form on the NFT asset by applying the digital asset to a cryptographic function, which generates a cryptographic block associated with the NFT asset indicate of the digital asset. Accordingly, the digital asset is preserved as the NFT to maintain integrity of not only the digital asset but also identifying information associated with the digital asset using a distributed blockchain ledger system. As a non-limiting example, consider the cryptographic function being a zero trust function or a zero knowledge function.

In some embodiments, the systems and methods of the present disclosure provide a marketplace (e.g., a client application executed at a client device, such as an imaging device 300, to display a user interface of a digital marketplace platform) for the NFT asset. As a first non-limiting example, consider the marketplace that allows access to the NFT asset by changing a controller of the NFT asset. As a second non-limiting example, consider the marketplace that allows access to a first NFT asset indicative of a first digital asset by partitioning the first digital asset associated with a first 3D body and identifying information described by the first NFT asset into a second digital asset associated with a sub-body of the first 3D body, in which the second digital asset is used to generate a second NFT asset. Accordingly, the systems and methods of the present disclosure allow for commoditization of the digital asset associated with the NFT for various inviolate transactional requests.

Accordingly, in some such embodiments, the NFT asset is indicative of the workflow by including the identifying information. Non-limiting examples of such identifying information including a collection name, an operator name, an owner name, an asset electronic address, meta data (e.g., environmental state data), and the like. As such, based on allowed access to the NFT asset, an end-user is allowed to generate further digital assets based on the workflow used to generate the digital asset the NFT asset is indicative of. Moreover, this allowed access yields the identifying information associated with the digital asset, which allows an accessee (e.g., a subject accepting access) to conduct evaluations based on this identifying information and an accessor (e.g., a subject providing access) to monetize the identifying information. In some embodiments, the systems and methods of the present disclosure allow for accessing the NFT on the distributed blockchain ledger system, such as by purchasing ownership of the NFT asset, sell ownership of the NFT asset, trade the NFT asset, licensing the NFT asset, donating a portion of the NFT asset (e.g., a sub-body of the digital asset), and the like. In some embodiments, access to the NFT asset is tradeable, transactional, and/or donatable. In some embodiments, access to the NFT asset is defined by one or more restriction conditions configured by an owner of the NFT asset and/or an author of the NFT asset. For instance, in some embodiments, the one or more restriction conditions include a smart contract that defines how access is allowed to the NFT asset. By way of example, in some embodiments, the smart contracts defining NFT asset specifies one or more fee distribution restriction conditions with respect to specific types of transactions involving the NFT asset. In some embodiments, a request for access to the NFT asset within a marketplace platform (e.g., a request for sale of the NFT asset) results in one or more residual royalty payment transactions that is recoded in the block chain including a residual royalty payment to the owner that minted the NFT asset. In this way, an authenticity of a particular NFT asset is independently verifiable by auditing the one or more transaction records associated with the NFT asset within the blockchain to confirm consistency with the smart contract defining the NFT asset.

Furthermore, in some such embodiments, the NFT asset provides a guaranteed authenticity of the identifying information, ensuring trusted origin and non-alteration of some or all of the identifying information. This guarantee is due to the inviolate nature of the NFT asset coupled with the distributed blockchain ledger system, which provides zero-trust integrity by way of the one or more cryptographic functions. Moreover, this guarantee provides an assuredness and trust for the end-user when providing personal identifiable information (PII), which then lends to longer term aggregation of future digital assets within the plurality of digital assets for evaluation by one or more computational models.

In some embodiments, the NFT asset is an inimitable NFT asset. As such, the inimitable NFT asset cannot be copied or, similarly, controlled (e.g., allowed access) for selective copying. In this way, the NFT asset has an inherent strength by publishing original ownership, access rights, and other inviolate properties of the NFT asset.

Turning to more specific aspects, yet another aspect of the present disclosure is directed to providing a method of allowing access to a cryptographic non-fungible token asset on a distributed blockchain ledger system. The method includes receiving, by a communication network, from a remote device, a request to obtain the cryptographic non-fungible token asset. The method further includes determining whether the request satisfies one or more restriction conditions associated with accessing the cryptographic non-fungible token asset. Furthermore, the method includes applying, in accordance with a determination that each restriction condition in the one or more restriction conditions is satisfied, to a cryptographic function, a digital data set. The digital data set includes identifying information associated with cryptographic non-fungible token asset. This applying the digital data set generates a third cryptographic block associated with the cryptographic non-fungible token asset. Moreover, the method includes transmitting, by the communication network, the cryptographic block to one or more cryptographic node devices. This transmitting the cryptographic block records the cryptographic block on the distributed blockchain ledger system and allows access to the cryptographic non-fungible token asset at the remote device.

In some embodiments, the request is a procurement transaction request for the cryptographic non-fungible token asset.

In some embodiments, the identifying information includes a monetary value of the cryptographic non-fungible token asset, spatial information associated with the cryptographic non-fungible token asset, temporal information associated with the cryptographic non-fungible token asset, spectral information associated with the cryptographic non-fungible token asset, or a combination thereof.

In some embodiments, the one or more restriction conditions includes one or more transfer restrictions, one or more reading restrictions, one or more writing restrictions, one or more copying restrictions, one or more recovery restrictions, or a combination thereof.

Yet another aspect of the present disclosure is directed to providing a decentralized computing system for allowing access to a NT asset on a distributed blockchain ledger system. The decentralized computer system includes one or more node devices. Each node device includes one or more processors, and a memory coupled to the one or more processors. The memory storing one or more programs executed by the one or more programs. The one or more programs configured to perform a method of the present disclosure.

Yet another aspect of the present disclosure is directed to providing a non-transitory computer readable storage medium storing one or more programs. The one or more programs includes instructions, which when executed by a computer system (e.g., distributed computer system), cause the computer system to perform a method of the present disclosure for allowing access to a NFT asset.

The computer-enabled imaging device, mobile imaging device, method, and non-transitory computer readable storage medium of the present invention have other features and advantages that will be apparent from, or are set forth in more detail in, the accompanying drawings, which are incorporated herein, and the following Detailed Description, which together serve to explain certain principles of exemplary embodiments of the present invention.

BRIEF DESCRIPTION OF THE DRAWINGS

FIGS. 4A, 4B, 4C, 4D, 4E, 4F, 4G, 4H, and 4I collectively provide a flow chart illustrating exemplary methods for capturing a digital asset, in which dashed boxes indicate optional features, in accordance with some embodiments of the present disclosure;

FIGS. 5A, 5B, 5C, and 5D collectively provide another flow chart illustrating exemplary methods for storing a plurality of cryptographic non-fungible token assets, in which dashed boxes indicate optional features, in accordance with some embodiments of the present disclosure;

FIG. 6 provides yet another flow chart illustrating exemplary methods for allowing access to a cryptographic non-fungible token asset, in which dashed boxes indicate optional features, in accordance with some embodiments of the present disclosure;

Figure 1:
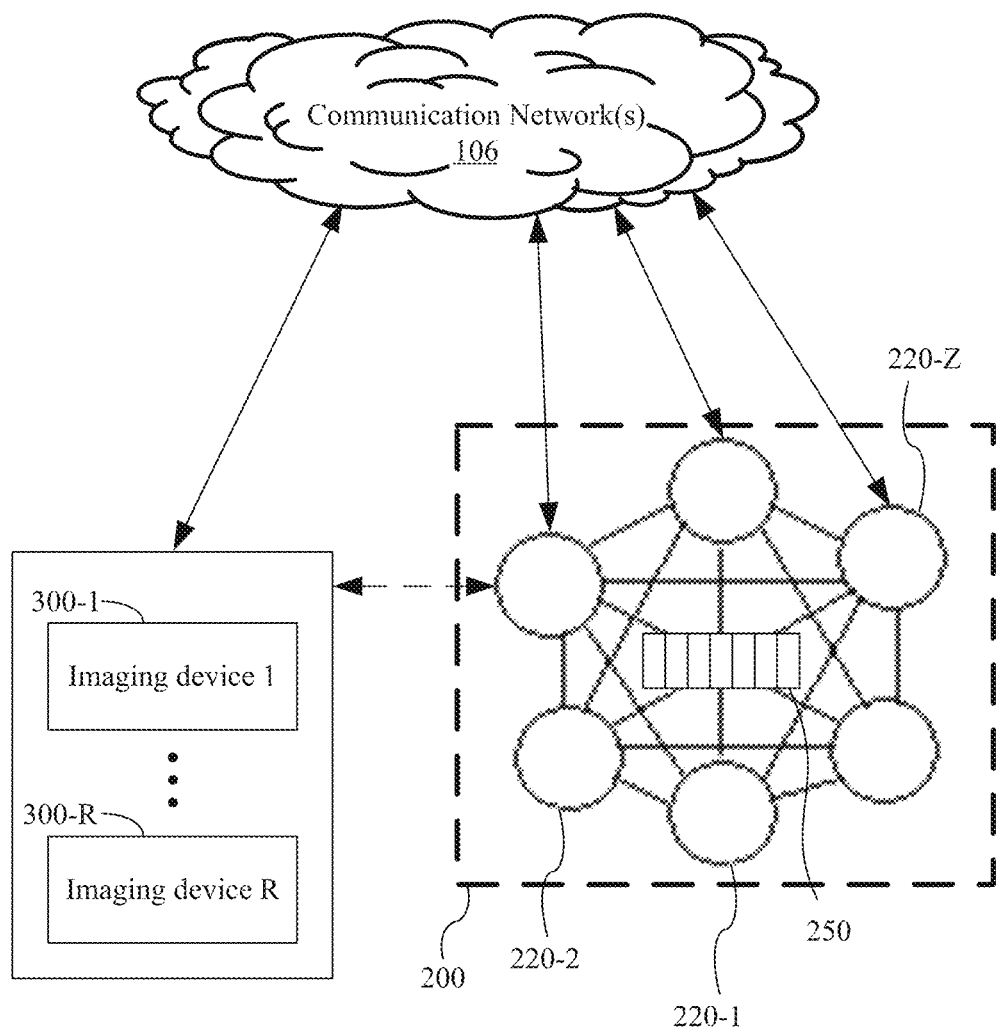
FIG. 1 illustrates a block diagram illustrating an embodiment of a system for generating and storing digital and cryptographic assets, in which dashed boxes and lines indicate optional features, in accordance with an embodiment of the present disclosure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The present disclosure is directed to provided are systems, methods, and devices for generating one or more digital and/or cryptographic assets using a computer-enabled imaging device. More particularly, in some embodiments, the systems, methods, and devices of the present disclosure acquire an initial state of an environment using a plurality of sensors (e.g., two or more sensors, three or more sensors, four or more sensors, five or more sensors, seven or more sensors, etc.). The initial state of the environment includes a state of each sensor in the plurality of sensors, which allows for generating a quantitative data set associated with the environment. Moreover, the initial state of the environment includes a region of interest (ROI) that further include a three-dimensional (3D) body. Accordingly, the 3D body is a real world object that, at least in part, is a subject of the digital asset. Furthermore, the initial state of the environment includes a state of one or more light sources. In some embodiments, the one or more light sources is configured to illuminate a portion of the ROI, such as a first portion of the ROI that includes a first portion of the 3D body. In some embodiments, the systems, methods, and devices of the present disclosure determine a plurality of boundary conditions associated with a workflow for capturing the asset. A visualization of a set of boundary conditions is displayed on a display, such as within a graphical user interface on the display. The visualization includes a plurality of visual cues, which includes a first visual and a second visual cue. Each respective visual cue in the plurality of visual cues provides a visual indication of a state of a corresponding boundary condition in the set of boundary conditions. At least one visual cue of the first visual cue or the second visual cue in the plurality of visual cues is updated when each boundary condition in the set of boundary conditions is satisfied. When satisfied, the workflow at the computer-enabled imaging device is executed. From this executed workflow, the digital asset is captured by the systems, methods, and devices of the present disclosure.

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents, and other embodiments, which may be included within the spirit and scope of the invention as defined by the appended claims.

It will also be understood that, although the terms first, second, etc. may be used herein to describe various elements, these elements should not be limited by these terms. These terms are only used to distinguish one element from another. For example, a first subject could be termed a second subject, and, similarly, a second subject could be termed a first subject, without departing from the scope of the present disclosure. The first subject and the second subject are both subjects, but they are not the same subject.

Furthermore, the terms "subject" and "user" are used interchangeably herein.

Additionally, the terms "client device" and "computer-enabled imaging device" are used interchangeably herein.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Moreover, as used herein, the term "dynamically" means an ability to update a program while the program is currently running.

Furthermore, when a reference number is given an "$i^{th}$" denotation, the reference number refers to a generic component, set, or embodiment. For instance, a light source termed "light source 710-$i$" refers to the $i^{th}$ light source in a plurality of light source.

As used herein, the term "about" or "approximately" can mean within an acceptable error range for the particular value as determined by one of ordinary skill in the art, which can depend in part on how the value is measured or determined, e.g., the limitations of the measurement system. For example, "about" can mean within 1 or more than 1 standard deviation, per the practice in the art. "About" can mean a range of ±20%, ±10%, ±5%, or ±1% of a given value. Where particular values are described in the application and claims, unless otherwise stated, the term "about"

means within an acceptable error range for the particular value. The term "about" can have the meaning as commonly understood by one of ordinary skill in the art. The term "about" can refer to ±10%. The term "about" can refer to ±5%.

As used herein, the term "equally spaced" means that a distance from a first feature to a corresponding second feature is the same for successive pairs of features unless expressly stated otherwise.

Additionally, as used herein, the term "digital data set" means a data set generated by a computer system that has not been applied to a cryptographic function associated with a distributed blockchain ledger system.

Furthermore, as used here, the term "cryptographic data set" means a data set generated by a computer system that has been applied to a cryptographic function associated with a distributed blockchain ledger system.

As used herein, the term "CAD model" and "CAD" mean any conventional boundary representation of a three-dimensional geometry, either through the use of non-uniform rational basis splines, polygons, or other surface representations.

Moreover, as used herein, the term "parameter" refers to any coefficient or, similarly, any value of an internal or external element (e.g., a weight and/or a hyperparameter) in an algorithm, model, regressor, and/or classifier that can affect (e.g., modify, tailor, and/or adjust) one or more inputs, outputs, and/or functions in the algorithm, model, regressor and/or classifier. For example, in some embodiments, a parameter refers to any coefficient, weight, and/or hyperparameter that can be used to control, modify, tailor, and/or adjust the behavior, learning, and/or performance of an algorithm, model, regressor, and/or classifier. In some instances, a parameter is used to increase or decrease the influence of an input (e.g., a feature) to an algorithm, model, regressor, and/or classifier. As a nonlimiting example, in some embodiments, a parameter is used to increase or decrease the influence of a node (e.g., of a neural network), where the node includes one or more activation functions. Assignment of parameters to specific inputs, outputs, and/or functions is not limited to any one paradigm for a given algorithm, model, regressor, and/or classifier but can be used in any suitable algorithm, model, regressor, and/or classifier architecture for a desired performance. In some embodiments, a parameter has a fixed value. In some embodiments, a value of a parameter is manually and/or automatically adjustable. In some embodiments, a value of a parameter is modified by a validation and/or training process for an algorithm, model, regressor, and/or classifier (e.g., by error minimization and/or backpropagation methods). In some embodiments, an algorithm, model, regressor, and/or classifier of the present disclosure includes a plurality of parameters. In some embodiments, the plurality of parameters is n parameters, where: n≥2; n≥5; n≥10; n≥25; n≥40; n≥50; n≥75; n≥100; n≥125; n≥150; n≥200; n≥225; n≥250; n≥350; n≥500; n≥600; n≥750; n≥1,000; n≥2,000; n≥4,000; n≥5,000; n≥7,500; n≥10,000; n≥20,000; n≥40,000; n≥75,000; n≥100,000; n≥200,000; n≥500,000; n≥1×10$^6$, n≥5×10$^6$, or n≥1×10$^7$. In some embodiments n is between 10,000 and 1×10$^7$, between 100,000 and 5×10$^6$, or between 500,000 and 1×10$^6$. In some embodiments, the algorithms, models, regressors, and/or classifier of the present disclosure operate in a k-dimensional space, where k is a positive integer of 5 or greater (e.g., 5, 6, 7, 8, 9, 10, etc.). As such, the algorithms, models, regressors, and/or classifiers of the present disclosure cannot be mentally performed.

Distributed Client-Server System.

FIG. 1 depicts a block diagram of a distributed client-server system (e.g., distributed client-server system 100) according to some embodiments of the present disclosure. The system 100 facilitates capturing a digital asset using a computer-enabled imaging device (e.g., imaging device 300 of FIG. 3), storing a cryptographic non-fungible token (NFT) asset on a distributed blockchain ledger system (e.g., blockchain 250 of distributed blockchain ledger system 200 of FIG. 1), allowing access to the NFT access, or a combination thereof.

In some embodiments, the distributed blockchain ledger system 200 includes a permissionless or public blockchain 250. The permissionless or public blockchain utilizes a concerns protocol that is accessibly by a subject at a computer-enabled imaging device using a communication network 106. A non-limiting example of a permissionless or public blockchain is the Bitcoin blockchain 250 or Ethereum blockchain 250. In some embodiments, the distributed blockchain ledger system 200 includes a permissioned or private blockchain 250, which is has restricted access that is managed by a private administrator of one or more subjects. A non-limiting example of a permissioned or private blockchain 250 is the Ripple (XRP) blockchain 250. Furthermore, in some embodiments, the distributed blockchain ledger system 200 is consortium blockchain, in which management is performed by a continuum of administrators (e.g., a Quorum).

Examples of the communication network 106 includes, but are not limited to, the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

In some embodiments, the communication network 106 optionally includes the Internet, one or more local area networks (LANs), one or more wide area networks (WANs), other types of networks, or a combination of such networks.

It should be noted that the exemplary topology shown in FIG. 1 merely serves to describe the features of an embodiment of the present disclosure in a manner that will be readily understood to one of skill in the art. Other topologies of the system 100 are possible. For instance, in some embodiments, any of the illustrated devices and systems can, in fact, constitute several computer systems that are linked together in a network or be one or more virtual machines and/or containers in a cloud-computing environment. Moreover, rather than relying on a physical communications network 106, the illustrated devices and systems may wirelessly transmit information between each other.

Figure 2:
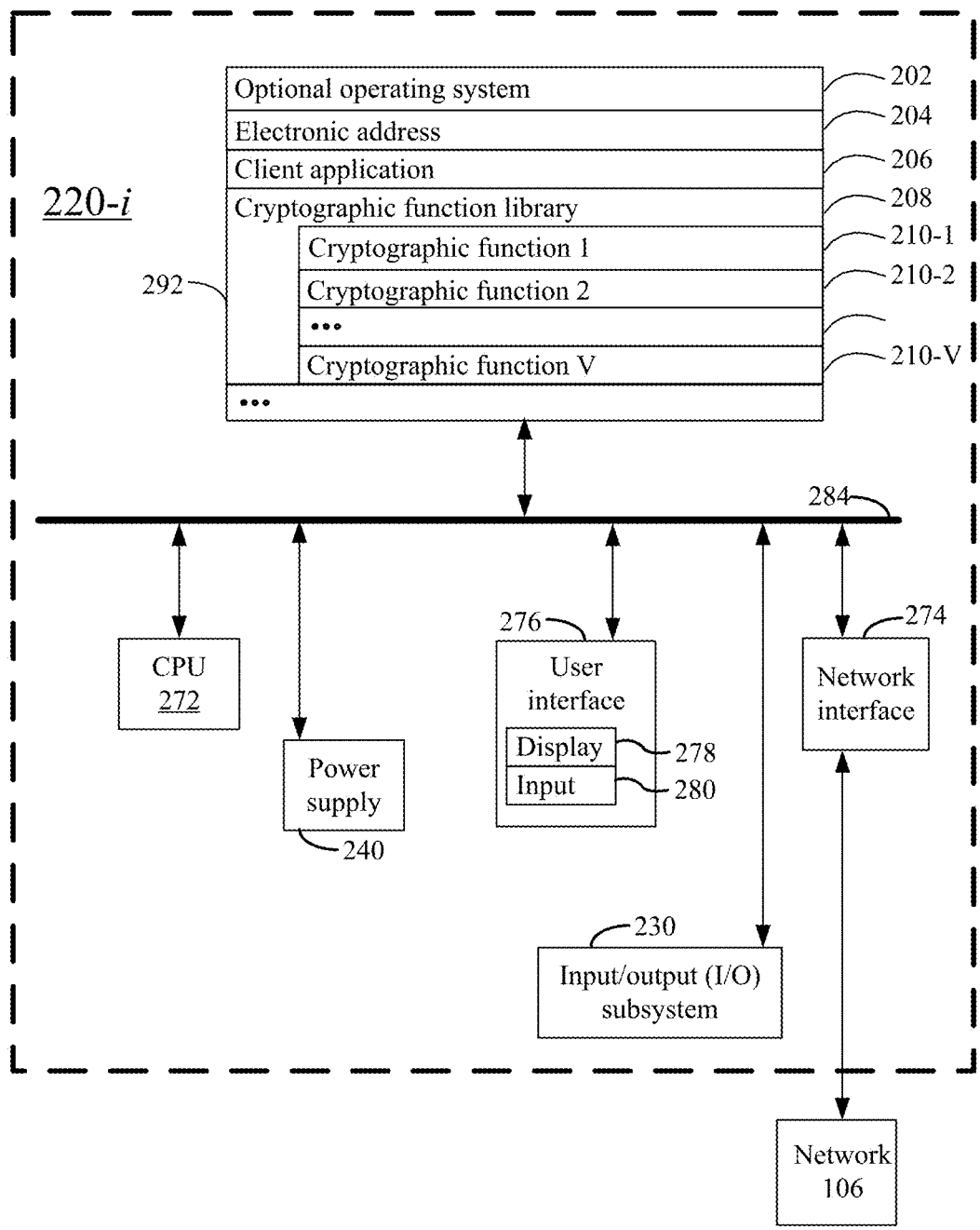
FIG. 2 illustrates a node device for engaging with a distributed, in accordance with an embodiment of the present disclosure.

FIG. 2 depicts an exemplary cryptographic node device 220 for receiving a transmission of a cryptographic block and/or recording the cryptographic block on the distributed blockchain ledger system 200 (e.g., onto blockchain 250 of the distributed blockchain ledger system 200). In various embodiments, the cryptographic node device 220 includes one or more processing units (CPUs) 272, a network or other communications interface 274, and memory 292.

Memory 292 includes high-speed random access memory, such as DRAM, SRAM, DDR RAM, or other random access solid state memory devices, and optionally also includes non-volatile memory, such as one or more magnetic disk storage devices, optical disk storage devices, flash memory devices, or other non-volatile solid state storage devices. Memory 292 may optionally include one or more storage devices remotely located from the CPU(s) 272. Memory 212, or alternatively the non-volatile memory device(s) within memory 292, includes a non-transitory computer readable storage medium. Access to memory 292 by other components of the cryptographic node device 220, such as the CPU(s) 272, is, optionally, controlled by a controller. In some embodiments, memory 292 can include mass storage that is remotely located with respect to the CPU(s) 272. In other words, some data stored in memory 292 may in fact be hosted on devices that are external to the cryptographic node device 220, but that can be electronically accessed by the cryptographic node device 220 over an Internet, intranet, or other form of communication network 106 or electronic cable using network interface 274.

In some embodiments, the memory 292 of cryptographic node device 220 for receiving a transmission of a cryptographic block and/or recording the cryptographic block on the distributed blockchain ledger system 200 stores:

an operating system 202 (e.g., ANDROID, iOS, DARWIN, RTXC, LINUX, UNIX, OS X, WINDOWS, or an embedded operating system such as VxWorks) that includes procedures for handling various basic system services;

an electronic address 204 associated with the cryptographic node device 220 that identifies the cryptographic node device 220;

a client application 206 for generating content for display through a graphical user interface presented on a display (e.g., display 408 of FIG. 3); and a cryptographic function library 208 including one or more cryptographic functions 210 that form the basis of a protocol used within the system 100.

An electronic address 204 is associated with the cryptographic node device 220. The electronic address 204 is utilized to at least uniquely identify the cryptographic node device 220 from other devices and components of the distributed system 100 (e.g., uniquely identify cryptographic node device 220 from imaging device 300-1, imaging device 300-2, . . . or imaging device 300-R of FIG. 1). For instance, in some embodiments, the electronic address 204 is utilized to identify an origin of a cryptographic asset. However, the present disclosure is not limited thereto. In some embodiments, the electronic address 204 is associated with a digital wallet that includes a set of cryptographic keys, such as a private key and public key, and cryptographic tokens.

In some embodiments, a client application 206 is a group of instructions that, when executed by a processor 272, generates content for presentation to the user, such as a visualization of a set of boundary conditions. In some embodiments, the client application 30+ generates content in response to one or more inputs received from the user through the node device 220, such as the inputs 310 of the node device. As a non-limiting exemplary embodiment, in some embodiments, the client application 206 updates the visualization responsive to the inputs of an imaging device. However, the present disclosure is not limited thereto.

A cryptographic function library retains one or more cryptographic functions (e.g., first cryptographic function 210-1, second cryptographic function 210-2, . . . , cryptographic function V 210-V) that defines a protocol for accessing and/or authenticating information disseminated across a blockchain 250 of a distributed blockchain ledger system 200. In some embodiments, the blockchain 250 achieves consensus using one or more cryptographic functions 210 that is configured to increase in difficulty over time and/or iterations. In some embodiments, the cryptographic function is a zero trust function. In some embodiments, the cryptographic function 210 is a proof, or zero knowledge, function. However, the present disclosure is not limited thereto. Additional details and information regarding the one or more cryptographic functions 210 is described infra, particularly in at least descriptions of methods 5000 for storing NFT assets.

Each of the above identified modules and applications correspond to a set of executable instructions for performing one or more functions described above and the methods described in the present disclosure. These modules (e.g., sets of instructions) need not be implemented as separate software programs, procedures or modules, and thus various subsets of these modules are, optionally, combined or otherwise re-arranged in various embodiments of the present disclosure. In some embodiments, the memory 292 optionally stores a subset of the modules and data structures identified above. Furthermore, in some embodiments, the memory 212 stores additional modules and data structures not described above.

It should be appreciated that FIG. 2 illustrates only an example of the cryptographic node device 220, and that the cryptographic node device 220 optionally has more or fewer components than shown, optionally combines two or more components, or optionally has a different configuration or arrangement of the components. The various components shown in FIG. 2 are implemented in hardware, software, firmware, or a combination thereof, including one or more signal processing and/or application specific integrated circuits. Moreover, the cryptographic node device 220 can be a single device that includes all the functionality of the cryptographic node device 220. The cryptographic node device 220 can also be a combination of multiple devices. For instance, the functionality of the cryptographic node device 220 may be spread across any number of networked computers and/or reside on each of several networked computers and/or by hosted on one or more virtual machines and/or containers at a remote location accessible across a communications network (e.g., communications network 106, network interface 274, or both). One of skill in the art will appreciate that a wide array of different computer topologies is possible for the cryptographic node device 220, and other devices and systems of the preset disclosure, and that all such topologies are within the scope of the present disclosure.

Figure 3:
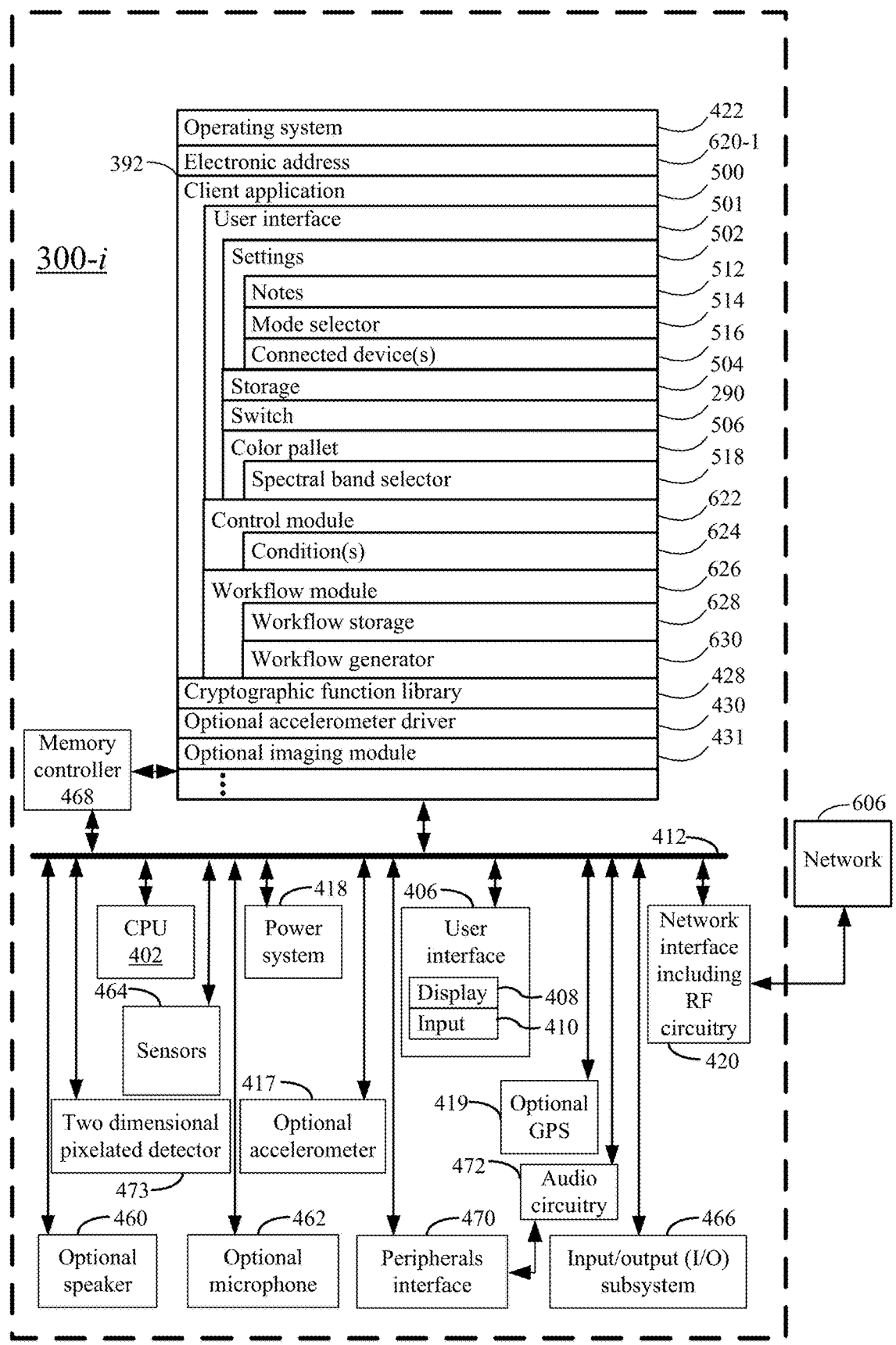
FIG. 3 illustrates a client device for a digital asset, in accordance with an embodiment of the present disclosure.

Referring to FIG. 3, an exemplary computer-enabled imaging device 300 is provided.

A computer-enabled imaging device 300 of the present disclosure can be utilized in a plurality of fields and industries. In one implementation, a computer-enabled imaging device 300 can be utilized for medical purposes, such as personal-use, close range 3D body applications (e.g., a property object belonging to a user), and/or industrial purposes (e.g., as a component of a medical service environment), and the like. In some embodiments, systems and methods of the present disclosure use regions of interest as small as tens or hundreds of microns such as an organism or virus, to regions of interest of approximately 500 square centimeters ($cm^2$) for uses such as object and tool capture (e.g., capturing a 3D body of an office desk and computer station), and even to regions of interest on a scale of tens or hundreds of square meters ($m^2$). Regions of interest in some cases can range from 1 square meter ($m^2$) or less, such as a plant, to hundreds of square meters such as a structure. In some such large region of interest cases, an array of computer-enabled imaging device 300 is utilized and/or a single computer-enabled imaging device. Additionally, regions of interest include two-dimensional regions of interest (e.g., a surface of an object), three-dimensional regions of interest (e.g., a volumetric region such as a volume of a 3D body), a four-dimensional regions of interest (e.g., a volumetric region including a temporal dimension), and an n-dimensional region of interest (e.g., a volumetric region include a temporal dimension, one or more spectral dimensions, one or more biometric dimensions, or a combination thereof).

The computer-enabled imaging device 300 has one or more processing units (CPU's) 402, peripherals interface 470, memory controller 468, a network or other communications interface 420, a memory 392 (e.g., random access memory), a user interface 406, the user interface 406 including a display 408 and input 410 (e.g., keyboard, keypad, touch screen), an optional accelerometer 417, an optional GPS 419, optional audio circuitry 472, an optional speaker 460, an optional microphone 462, one or more optional intensity sensors 464 for detecting intensity of contacts on the device 102 (e.g., a touch-sensitive surface such as a touch-sensitive display system 408 of the device 300), optional input/output (I/O) subsystem 466, one or more communication busses 412 for interconnecting the aforementioned components, and a power system 418 for powering the aforementioned components.

In some embodiments, the input 410 is a touch-sensitive display (e.g., display 408 of FIG. 2), such as a touch-sensitive surface. In some embodiments, the user interface 406 includes one or more soft keyboard embodiments. The soft keyboard embodiments may include standard (QWERTY) and/or non-standard configurations of symbols on the displayed icons. In some embodiments, the computer-enabled imaging device 300 further includes a display 408, and the method further includes displaying information on the display 408, such as one or more boundary conditions (e.g., conditions 624 of FIG. 3) or an image captured by the computer-enabled imaging device 300. In some embodiments, the displayed image is enlargeable or reducible by human touch to the touch screen display 408. In some embodiments, the display 408 is configured for focusing an image of a surface of a region of interest acquired by the two-dimensional pixelated detector. Furthermore, in some embodiments, the display 408 allows for the user to visualize the region of interest when directly viewing the region of interest is undesirable or difficult for the user, such as if the region of interest is exposed to harmful irradiation (e.g., from the one or more light sources 710 of FIG. 7). Additionally, in some embodiments, the display allows the user to visual the region of interest when the region of interest is otherwise out of the line of sight of the user, such as around a corner or behind another 3D body. However, the present disclosure is not limited thereto.

Figure 13A:
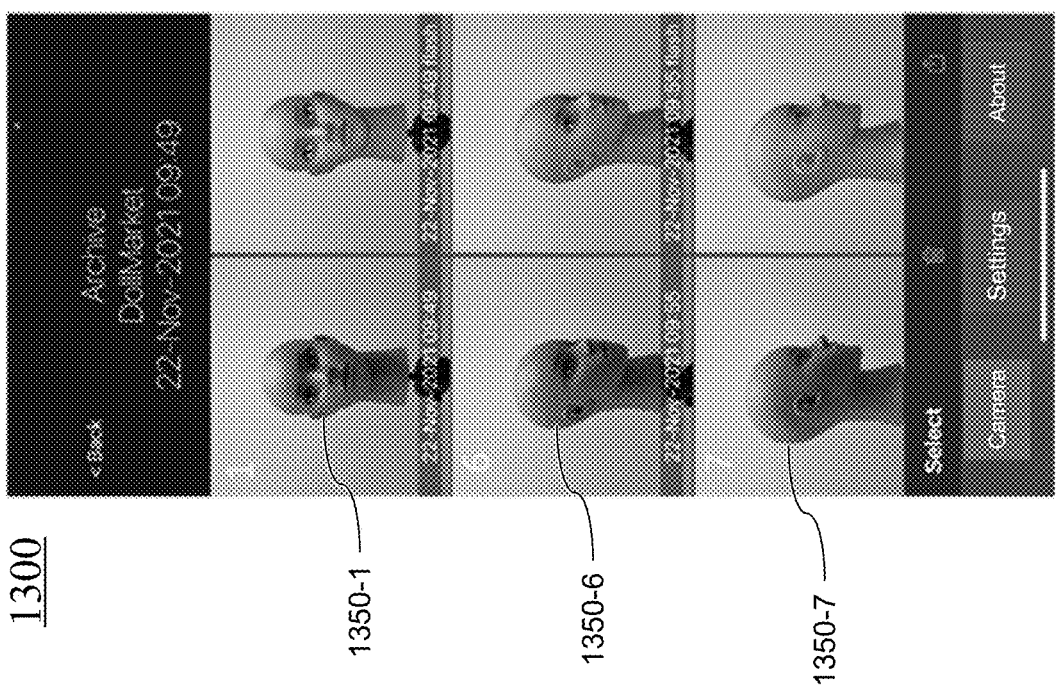
FIGS. 13A, 13B, and 13C collectively illustrate a series of user interfaces for displaying a digital asset, in accordance with an embodiment of the present disclosure.
Figure 13B:
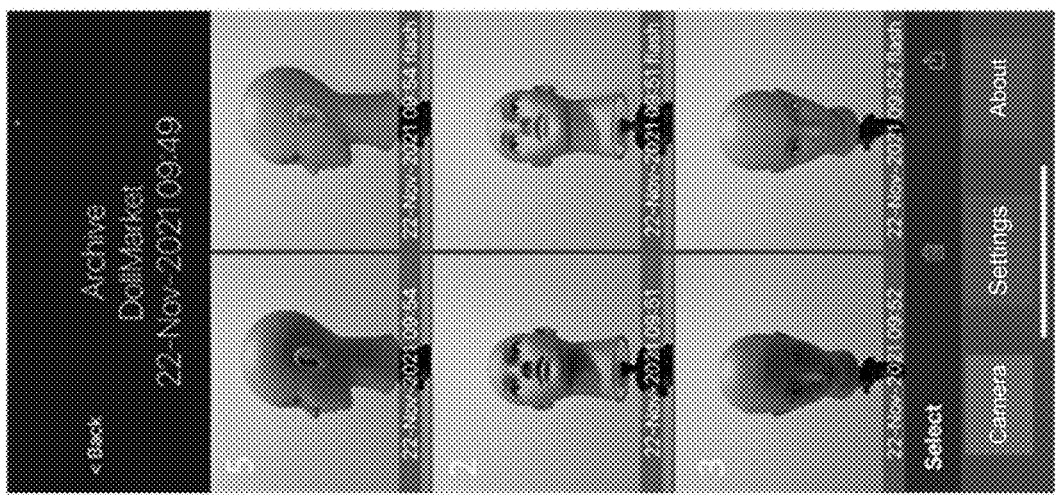
Figure 13C:
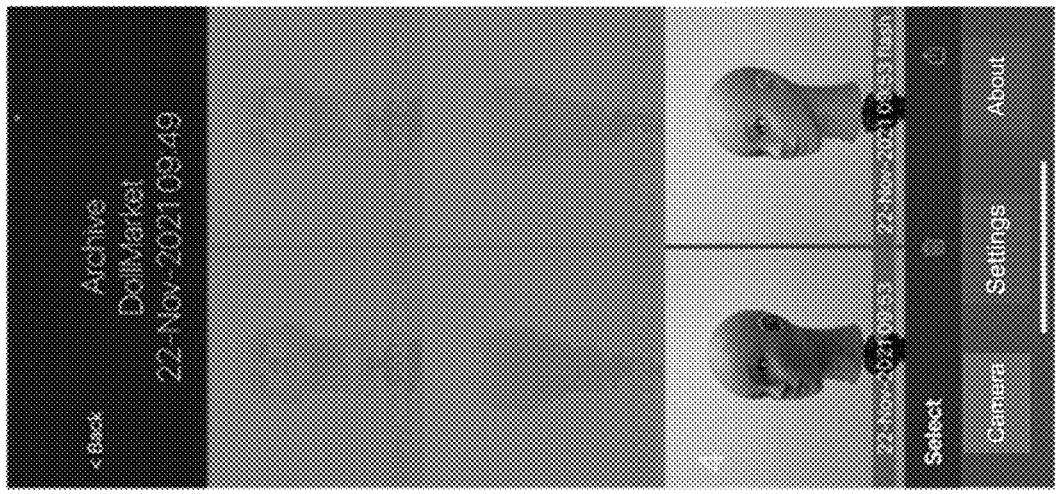

The computer-enabled imaging device 300 includes one or more sensors, such as one or more range and distance (e.g., LIDAR) sensors, one or more accelerometers 417, and/or one or gyroscopes, and, optionally, includes, a magnetometer and a GPS 419 (or GLONASS or other global navigation system) receiver for obtaining information concerning a position of the computer-enabled imaging device 300, such as a location and/or an orientation (e.g., portrait or landscape; orientation with respect to one or more axis; a pose) of the computer-enabled imaging device 300. In this way, one or more changes in the positioning of the computer-enabled imaging device 300 is determined through the measurements of positions obtained from the one or more sensors of the computer-enabled imaging device 300, such as if the computer-enabled imaging device 300 is held at a first position. Accordingly, in some embodiments, the computer-enabled imaging device 300 places one or more boundary conditions 624 that is based on the one or more changes in positioning of the computer-enabled imaging device 300 or the 3D body of the ROI, which is determined from the one or more sensors of the computer-enabled imaging device 300 (e.g., accelerometer 417, gyroscope, GPS 419, objective lens 750, LIDAR, or a combination thereof). From this, in some embodiments, the computer-enabled imaging device 300 discontinues (i.e., ceases) capturing a digital asset (e.g., executing a workflow for capturing the digital asset), instructs the end-user for further capturing the digital asset (e.g., digital assets 1350 of FIG. 13) when one or more changes in the positioning of the computer-enabled imaging device 300 do not satisfy the boundary conditions 624. However, the present disclosure is not limited thereto. In some embodiments, a plurality of measurements obtained from the one or more sensors of the computer-enabled imaging device 300 includes a corresponding value for one or more conditions 624, such as each boundary condition 624 or a subset of boundary conditions 624. Additionally, in some embodiments, the plurality of measurements and/or one or more characteristics associated with a capture of a digital asset is stored in a memory of the computer-enabled imaging device 300 (e.g., workflow storage 626 of memory 392 of FIG. 3). This storing at least allows for the computer-enabled imaging device 300 to provide an evaluation a previous instance of capturing the digital asset and/or a template workflow for repeating the previous instance of capturing the digital asset. However, the present disclosure is not limited thereto.

It should be appreciated that the computer-enabled imaging device 300 is only one example of a multifunction device that may be used by users when engaging with an imaging device 300, and that the computer-enabled imaging device 300 optionally has more or fewer components than shown, optionally combines two or more components, or optionally has a different configuration or arrangement of the components. The various components shown in FIG. 3 are implemented in hardware, software, firmware, or a combination thereof, including one or more signal processing and/or application specific integrated circuits.

In some embodiments, a peripherals interface 470 can be used to couple input and output peripherals of the computer-enabled imaging device 300 to the CPU(s) 402 and the memory 392. The one or more processors 402 run or execute various software programs and/or sets of instructions stored in the memory 392 to perform various functions for the computer-enabled imaging device 300 and to process data. For instance, in some embodiments, the various software programs and/or set of instructions (e.g., application 500 of FIG. 3) allows for a controlled capturing of the digital asset. In some embodiments, this controlled capturing of the digital asset is based on one or more predetermined conditions 624 or user defined boundary conditions 624. However, the present disclosure is not limited thereto.

In some embodiments, the peripherals interface 470, the CPU(s) 402, and the memory controller 468 are, optionally, implemented on a single chip. In some other embodiments, the peripherals interface 470, the CPU(s) 402, and the memory controller 468 are, optionally, implemented on separate chips.

The RF (radio frequency) circuitry 420 of network interface 420 receives and sends RF signals, also called electromagnetic signals. The RF circuitry 420 converts electrical signals to/from electromagnetic signals and communicates with communications networks and other communications devices via the electromagnetic signals. The RF circuitry 420 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. Moreover, the RF circuitry 420 optionally communicates with the communication network 106. In some embodiments, network circuitry does not include the RF circuitry and, in fact, is connected to the communication network 106 through one or more hard wires (e.g., an optical cable, a coaxial cable, or the like).

In some embodiments, an audio circuitry 472, a speaker 460, and a microphone 462 provide an audio interface between a user and the imaging device 300. The audio circuitry 472 receives audio data from the peripherals interface 470, converts the audio data to an electrical signal, and transmits the electrical signal to the speaker 460. The speaker 460 converts the electrical signal to human-audible sound waves. The audio circuitry 472 converts the electrical signal to audio data and transmits the audio data to the peripherals interface 470 for processing. The audio data is, optionally, retrieved from and/or transmitted to the memory 392 and/or the RF circuitry 420 by the peripherals interface 470. In some embodiments, the speaker 460 is utilized to communicate one or more audible instructions associated with a capturing of the digital asset, such as an instruction to for a user to move the computer-enabled imaging device 300 in a first direction (e.g., away from the region of interest, towards a portion of the region of interest, etc.).

Memory 392 includes high-speed random access memory, such as DRAM, SRAM, DDR RAM, or other random access solid state memory devices, and optionally also includes non-volatile memory, such as one or more magnetic disk storage devices, optical disk storage devices, flash memory devices, or other non-volatile solid state storage devices. Memory 392 may optionally include one or more storage devices remotely located from the CPU(s) 402. Memory 392, or alternatively the non-volatile memory device(s) within memory 392, includes a non-transitory computer readable storage medium. Access to memory 392 by other components of the imaging device 300, such as the CPU(s) 402 and the I/O subsystem 466, is, optionally, controlled by a controller. In some embodiments, memory 392 can include mass storage that is remotely located with respect to the CPU 402. In other words, some data stored in memory 392 may in fact be hosted on devices that are external to the imaging device 300, but that can be electronically accessed by the imaging device 300 over an Internet, intranet, or other form of communication network 106 or electronic cable using communication interface 304.

In some embodiments, the memory 392 of the imaging device 300 stores:
- an operating system 316 that includes procedures for handling various basic system services;
- an electronic address 318 associated with the imaging device 300 that identifies the imaging device 300 within a distributed system 100;
- a client application 320 for generating content for display through a graphical user interface presented on the display 308 of the imaging device 300; and
- an engine 322 that allows a client application 320 to operate in conjunction with the imaging device 300.

An electronic address 318 is associated with the imaging device 300, which is utilized to at least uniquely identify the imaging device 300 from other devices and components of the distributed system 100. In some embodiments, the electronic address 318 associated with the imaging device 300 is used to determine a source of an assessment provided by the imaging device 300 (e.g., receiving an assessment from the cryptographic node device 220 and communicating one or more responses based on the assessment).

In some embodiments, each client application 500 is a group of instructions that, when executed by a processor, generates content for presentation to the user, such as a visualization of one or more visual cues, a visualization of a digital asset, a visualization of a cryptographic asset, or the like. A client application 500 may generate content in response to inputs received from the user through movement of the imaging device 300, such as the inputs 310 of the client device.

As illustrated in FIG. 3, a computer-enabled imaging device 300 preferably includes an operating system 422 that includes procedures for handling various basic system services. The operating system 422 (e.g., iOS, DARWIN, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

In some embodiments, a computer-enabled imaging device 300 further includes an electronic address 620 (e.g., a mobile phone number, a social media account, an e-mail address, an internet protocol (IP) address, etc.) associated with the corresponding imaging device 300. In such embodiments, an application 500 utilizes the electronic address 620 for communication, such as identifying the computer-enabled imaging device 300 within a communication network 106. In this way, the computer-enabled imaging device 300 can receive specific communications (e.g., specific boundary conditions 624) communicated from a remote device through the electronic address 620 and the communication network 106, such as receiving a predetermined workflow for capturing of the digital asset.

In some embodiments, meta data is associated with captured multimedia (e.g., images and/or video of a region of interest), such as a device identifier (e.g., identifying the computer-enabled imaging device 300 within a group of computer-enabled imaging device 3003 that captured the multimedia item, which may include an arbitrary identifier, a MAC address, a device serial number, etc.), temporal meta data (e.g., date and time of a corresponding capture), location data (e.g., GPS coordinates of the location at which multimedia item was captured, a position of the imaging device 300, etc.), a multimedia capture frequency (e.g., the frequency at which a stream of images is captured by the imaging device 300), device configuration settings (e.g., image resolution captured multimedia items, frequency ranges that the pixilated detector of the computer-enabled imaging device 300 is configured to detect, one or more boundary conditions 624 of the computer-enabled imaging device 300, one or more determinations of satisfying the one or more conditions 624, etc.), and/or other sensor data (e.g., a first data set from the gyroscope sensor, a second data set from the accelerometer sensor, a third data set from the LIDAR sensor, etc.) or environmental factors associated with captured multimedia at the imaging device 300.

In some embodiments, the computer-enabled imaging device 300 further includes an application 500, which allows for a user of the computer-enabled imaging device 300 to at least control a firing of the one or more light sources 710 through a user interface 501 of the application 500, control capturing of the digital asset, and/or configure a future capturing of the digital asset, such as configuring a workflow for capturing of the digital asset through a workflow generator 630 of the application 500. However, the present disclosure is not limited thereto. In some embodiments, the application 500 runs on native device frameworks, and is available for download onto one or more mobile imaging devices 400 running an operating system 422, such as an Android operating system 422 or an iOS operating system 422.

In some embodiments, the user interface 501 of the application 500 includes a setting module 502, a gallery or storage 504, the fire or switch 290, a color pallet 506 including Spectral band selector slider 518, or a combination thereof. In some embodiments, the settings 502 opens a menu or table, such as an interface table menu, of various options and customizable parameters to configure when operating the imaging device 300. Such options and parameters include an exposure time slider (e.g., a dosage selector), an ISO light sensitivity slider, a notes area 512, a mode selector 514, a remote drone control 516, or a combination thereof.

In some embodiments, the computer-enabled imaging device 300 determines a characteristic of a region of interest (e.g., a material of a surface of the region of interest, such as a glass surface, a ceramic surface, a metallic surface; a distinctive shape associated with the region of interest, such as a facial feature of the 3D body; etc.) and modifies a boundary condition and/or workflow for capturing of the digital asset based on the characteristic of the region of interest. In this way, in some such embodiments, the capturing of the digital asset by the computer-enabled imaging device 300 corresponds to various characteristics of the region of interest identified by the imaging device 300. From this, in some embodiments, the present disclosure not only ensures sufficient capturing of the digital asset that is indicative of the 3D body of the region of interest, but also reduces a risk of harm to the user through unnecessary firing of the one or more light sources 710.

In some embodiments, a notes 512 module is configured to allow a user of the application 500 to input various media, such as text, images, videos, and the like, as well as providing one or more predetermined and/or stored notes for the user associated with a digital asset and/or a workflow.

Figure 15:
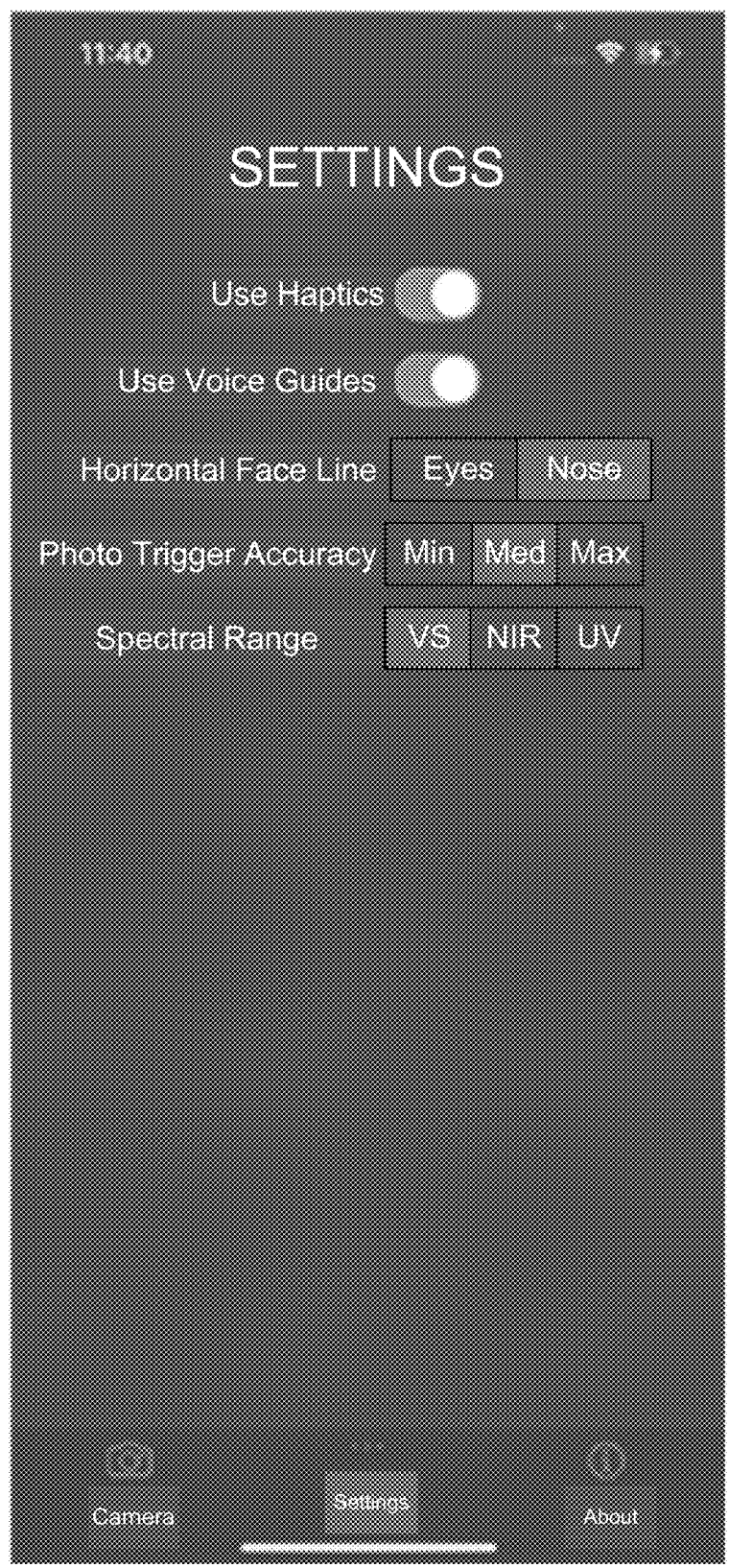
FIG. 15 illustrates a user interface for displaying one or more settings of a client application for capturing a digital asset, in accordance with an embodiment of the present disclosure.

A mode selector 514 allows a user to adjust an acquired image according to various uses cases of the imaging device 300, such as selection between a first mode associated with illuminating the ROI with visible light, a second mode associated with illuminating the ROI with near-infrared light, a third mode associated with illuminating the ROI with UV light, or the like. In some embodiments, the selection between one or more modes of the imaging device 300 is determined based on one or more conditions 624 associated with the computer-enabled imaging device 300. For instance, referring briefly to FIG. 15, in some embodiments, the mode selector 514 allows the user to adjust, using a user interface 1500 displayed on a display of the computer-enabled imaging device, between the first mode, the second mode, and the third mode using one or more graphical buttons. In some embodiments, the mode selector 514 allows the user to switch between a third mode configured to allow the user to target any region of interest, and a fourth mode configured to allow the user to target one or more predetermined regions of interest. For instance, referring briefly to FIG. 15, in some embodiments, the mode selector 514 allows the user to adjust, using a user interface 1500 displayed on a display of the computer-enabled imaging device, between the first mode, between the third mode for a nose 3D body or a fourth mode for an eye 3D body. Accordingly, in some embodiments, the one or more predetermined regions of interest include one or more user defined regions of interests and/or one or more regions of interest from a prior firing of the one or more light sources 710. In this way, in some embodiments, the computer-enabled imaging device 300 is restricted to execute a workflow for capturing the digital asset when directed towards or away from the one or more predetermined regions of interest (e.g., towards a non-human 3D body, away from the eye 3D body, etc.). However, the present disclosure is not limited thereto. In some embodiments, the computer-enabled imaging device 300 is allowed to execute a workflow for capturing the digital asset when directed towards or away from the one or more predetermined regions of interest. In some embodiments, the one or more predetermined regions of interest is associated with one or more corresponding boundary conditions 624. For instance, in some embodiments, a first ROI (e.g., a keyboard, which has number grooves and hidden surfaces) is associated with a first threshold value of a first boundary condition 624 and a second ROI (e.g., a phase, which has little to no hidden surfaces) is associated with a second threshold value of the first boundary condition 624 different than the first threshold value.

In some embodiments, a drone control 516 module can be utilized in various embodiments where the imaging device 300 is attached to a drone, such as an unmanned remote demote device, or each computer-enabled imaging device 300 in a plurality of mobile imaging devices 400 is attached to a respective drone in a plurality of drones. However, the present disclosure is not limited thereto. In such embodiments, swarm control and/or control of individual drone and respective devices can be manipulated through the drone control 516. However, the present disclosure is not limited thereto. In some embodiments, the drone control 516 is utilized to operate and/or control the computer-enabled imaging device 300 from a remote location, such that the computer-enabled imaging device 300 acts as a user controlled drone device for a first user at the remote location. In this way, in some embodiments, the drone control 516 module facilities receiving one or more instructions related to a firing of the one or more light sources 710, including one or more instructions associated with a condition 624, one or more instructions associated with storing images captured at the imaging device 300, and the like. For instance, in some embodiments, the one or more instructions includes one or more boundary condition specifications.

In some embodiments, a spectral band selector slider 518 module allows a user to manipulate spectral bands of emitted light within a spectral range, such as within the visible light range. In some embodiments, the spectral band selector slider is a standard red, green, blue (RGB) 256-point slider. In this way, a selection of a first light source 710-1 is configurable to provide various bands of light emitted by the computer-enabled imaging device. Moreover, in some embodiments, the spectral band selector slider 518 allows for a selection of an intensity of light emitted from the first light source set 710-1 or the one or more light sources 710. From this, the spectral band selector allows for a selection of a band of electromagnetic light and/or an intensity of light emitted from the one or more light sources 710. However, the present disclosure is not limited thereto. In other embodiments, the slider 518 incorporates other, or is limited to, one or more spectral bands of the electromagnetic spectrum including, but not limited to, a visible light spectral band, a near-infrared spectral band, an infrared light spectral band, and/or an ultraviolet light spectral band. By way of example, in some embodiments, the slider 518-8 allows for the computer-enabled imaging device 300 to emit light through the one or more light sources 710 from a first spectral band of ultraviolet C (UV-C) light, a second spectral band of infrared light, a third spectral band of visible light, or a combination thereof.

Figure 8:
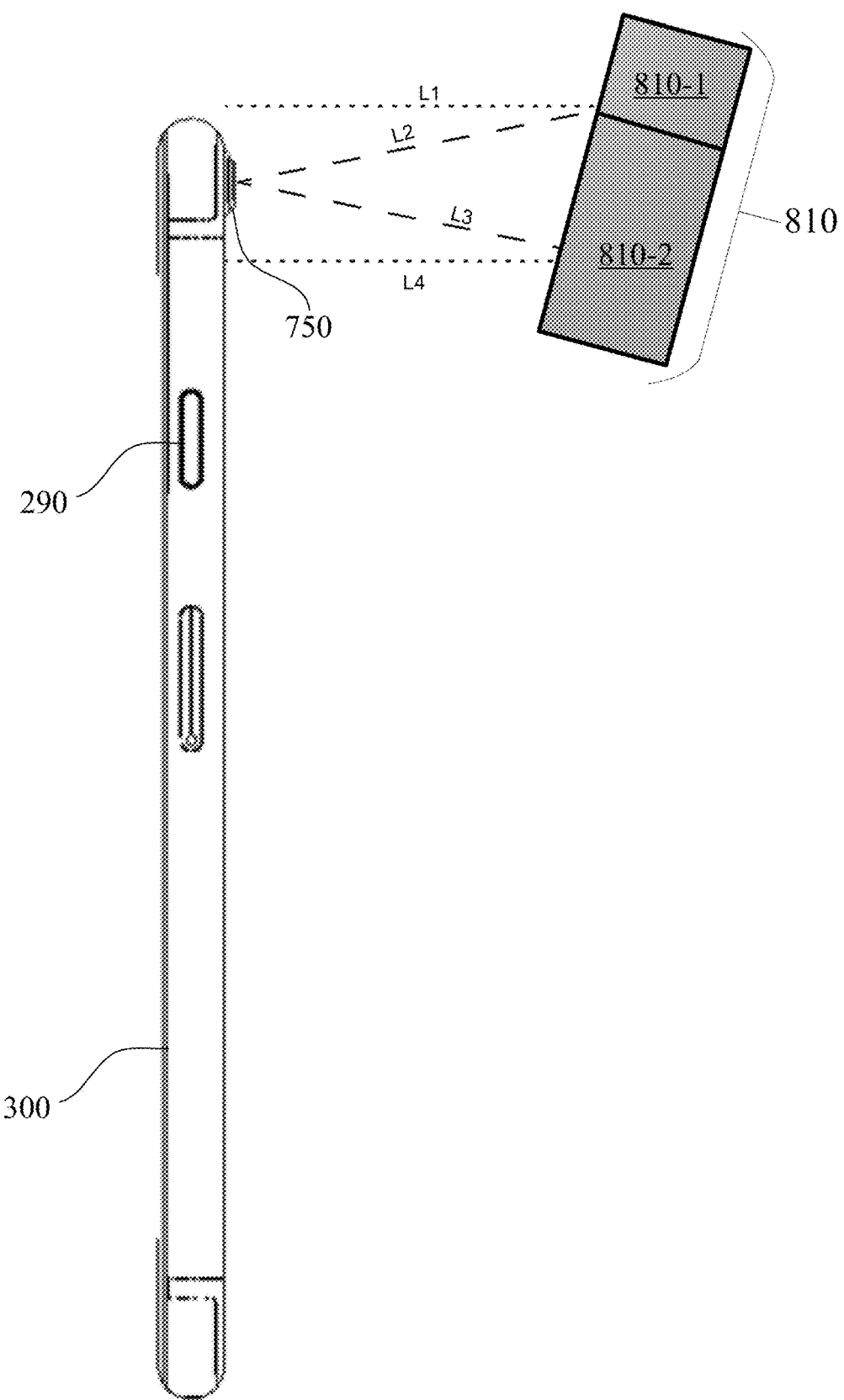
FIG. 8 is a side schematic view of a computer-enabled imaging device, in accordance with an embodiment of the present disclosure.
Figure 9:
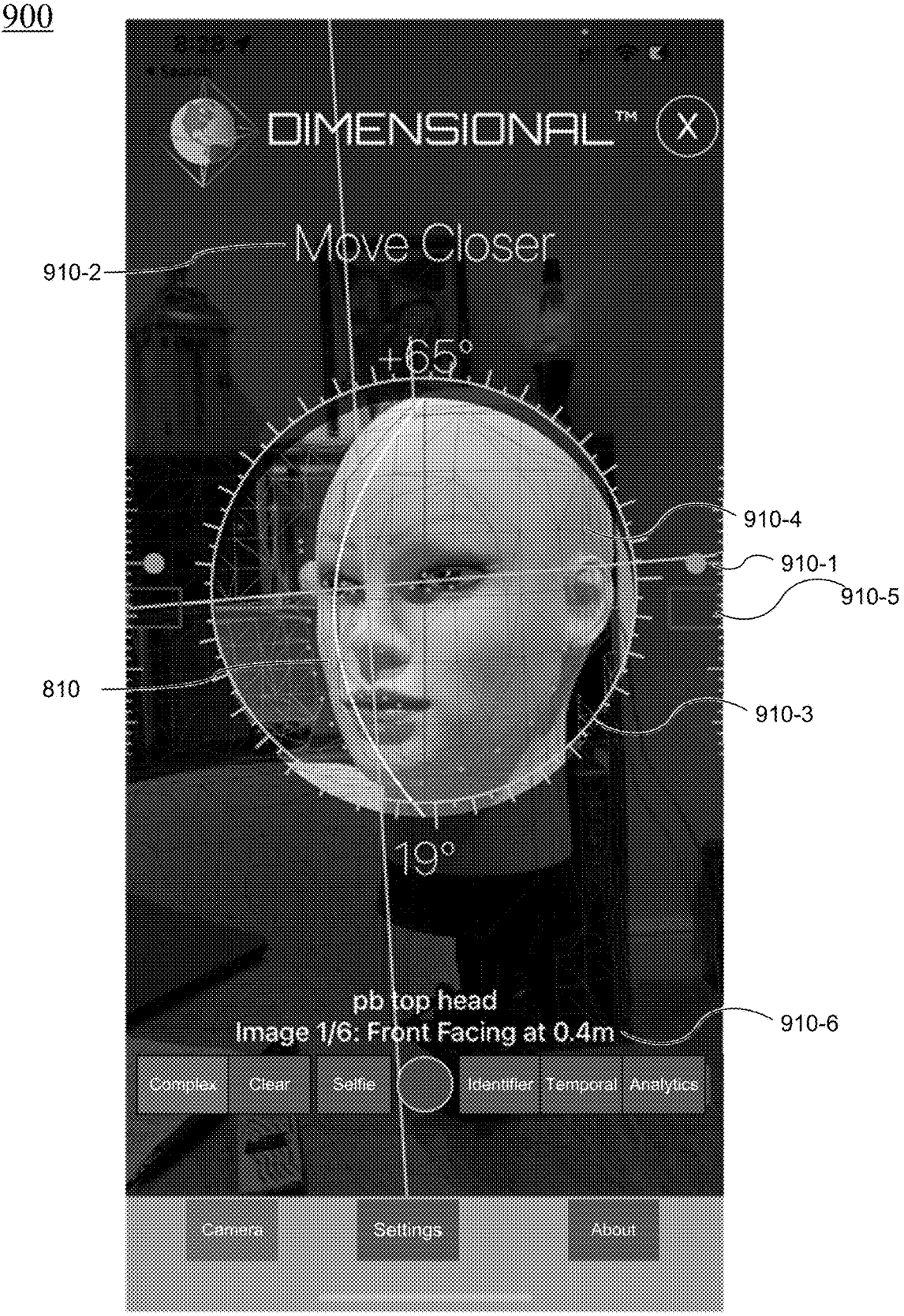
FIG. 9 illustrates a user interface for displaying a visualization of a set of boundary conditions, in accordance with an embodiment of the present disclosure.
Figure 10:
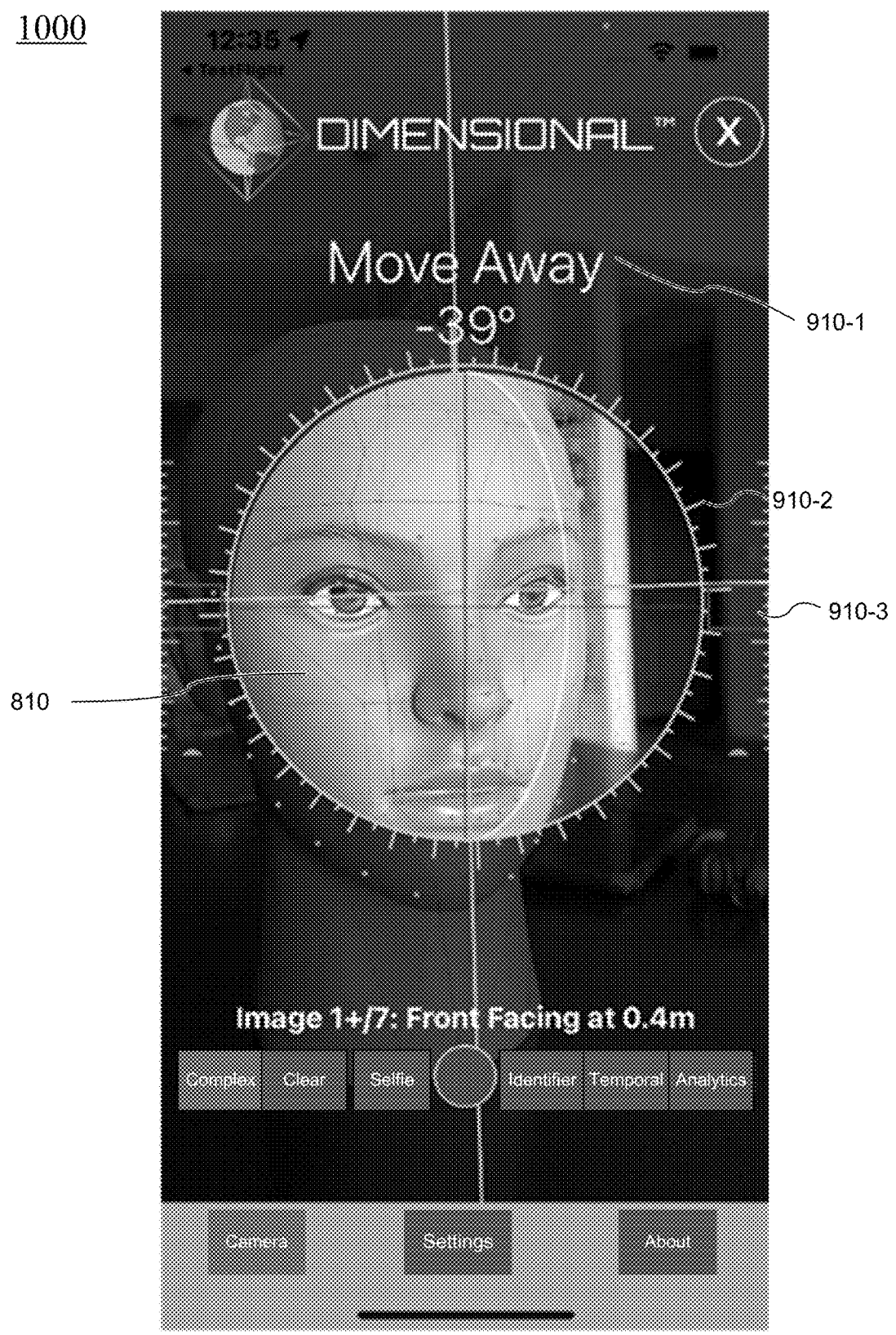
FIG. 10 illustrates another user interface for displaying a visualization of a set of boundary conditions, in accordance with an embodiment of the present disclosure.
Figure 11C:
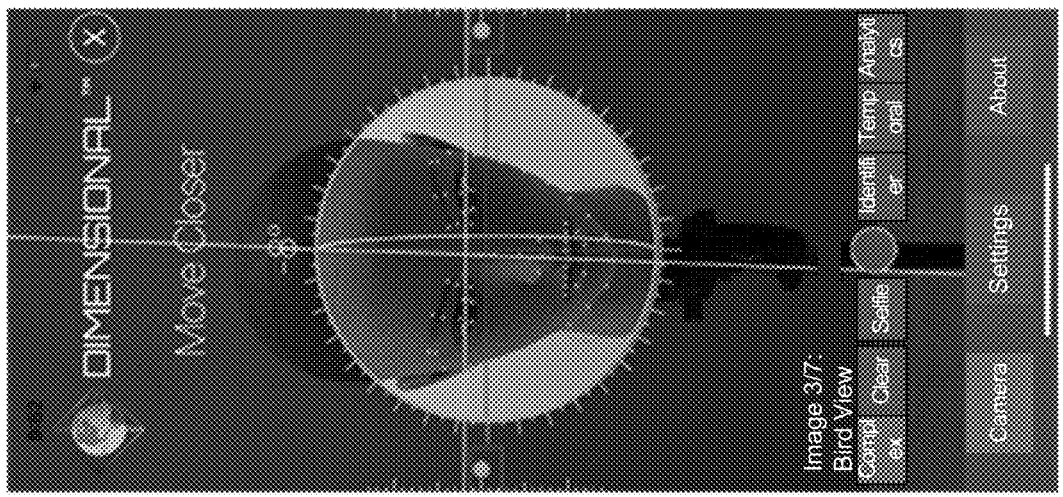
FIGS. 11A, 11B, and 11C collectively illustrate a series of user interfaces for executing a workflow at a computer-enabled imaging device, in accordance with an embodiment of the present disclosure.
Figure 11B:
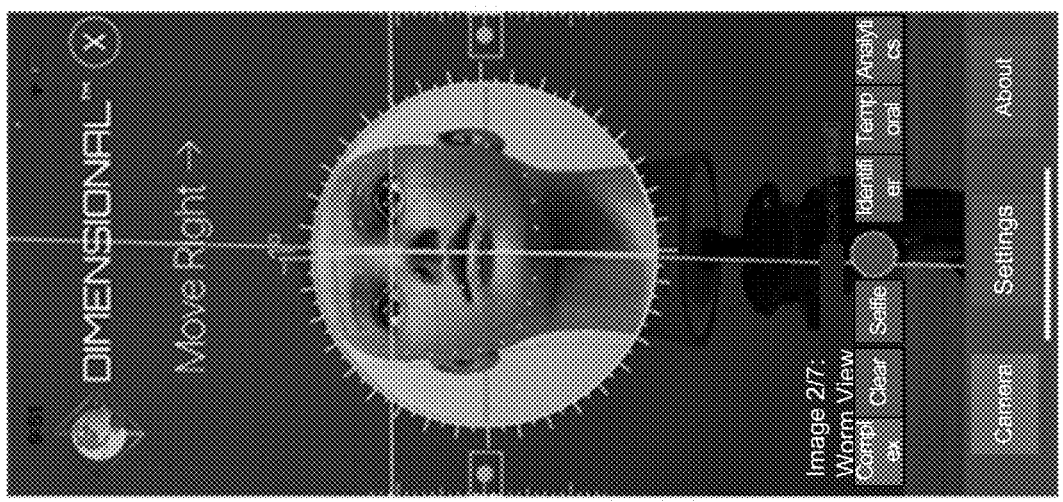
Figure 11A:
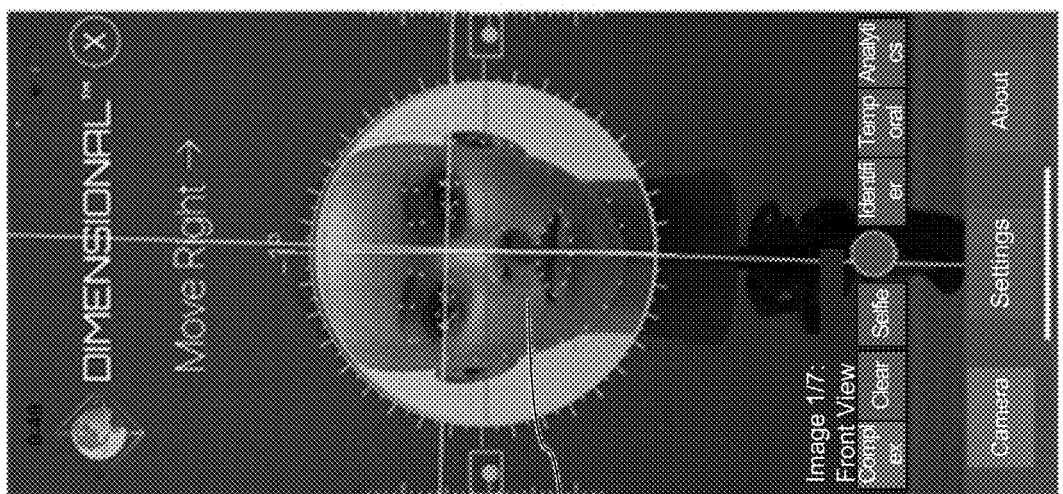
Figures 12A, 12B, 12C, 12D:
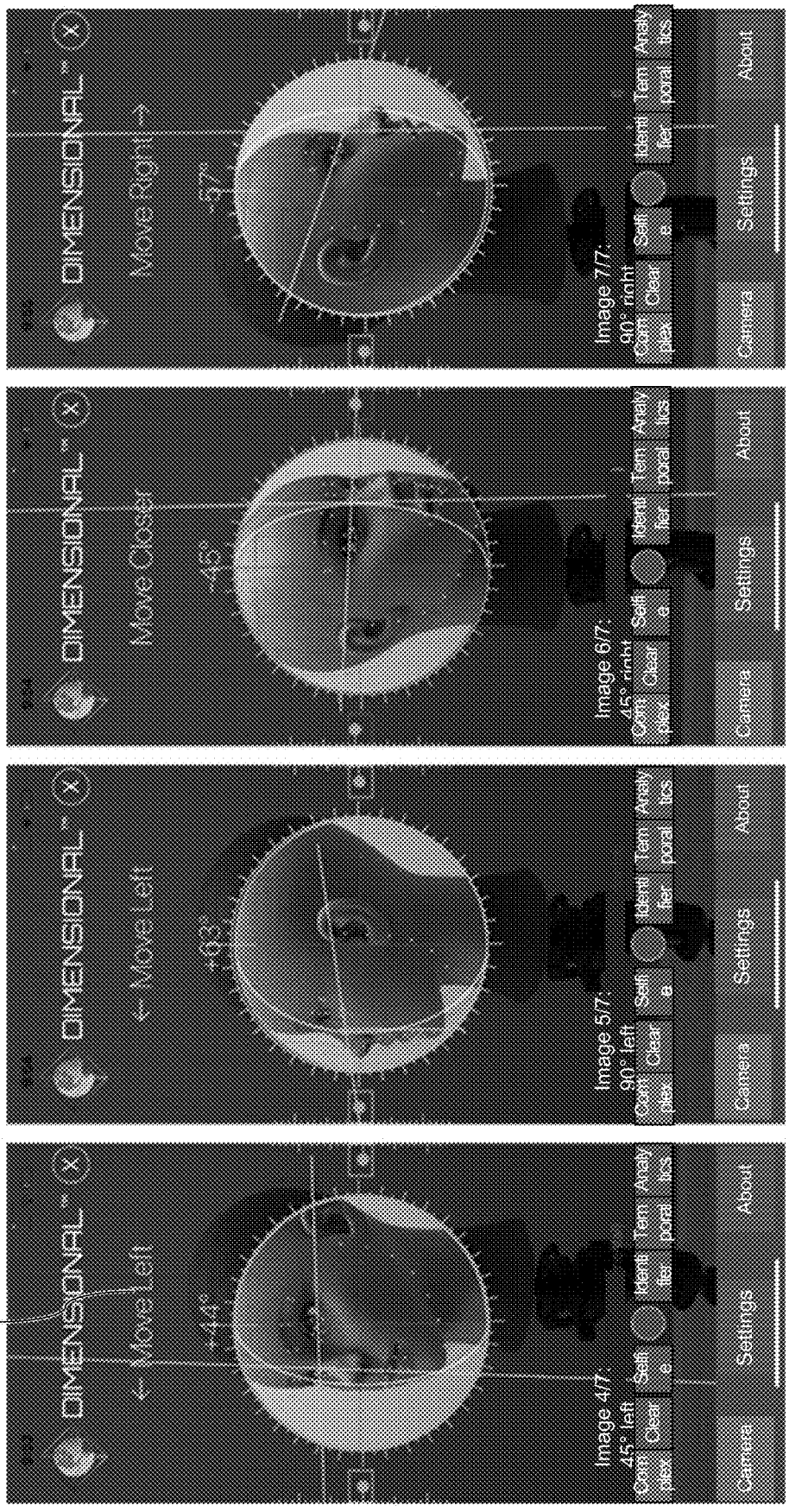
FIGS. 12A, 12B, 12C, and 12D collectively illustrate another series of user interfaces for executing a workflow at a computer-enabled imaging device, in accordance with an embodiment of the present disclosure.

In some embodiments, such as the embodiments shown in FIG. 2 and FIG. 8, a switch 290 is configured as a component of the imaging device 300, such as a home button of a smart phone type imaging device 300. In some embodiments, the switch 290 is configured to implement, fire, or execute a method (e.g., method 4000 of FIGS. 4a through 4I, method 5000 of FIGS. 5A through 5D, method 6000 of FIG. 6, etc.) or non-transitory computer readable storage medium including one or more programs of the imaging device 300. In some embodiments, the switch 290 is remotely activated, such as from a second imaging device 300-2. The remote activation can be achieved through a sensor, a plurality of sensors, an electronic communication, or a wireless transmission. Thus, a user can remotely operate the imaging device 300 from a distance, which reduces a risk of harm to the user when emitting UV-C irradiation from the mobile imaging device. In some embodiments, such as the embodiment shown in FIG. 3, the switch 290 a physical mechanism disposed on an external surface of the housing of the imaging device 300. In various embodiments, the switch 290 can be configured as various ON/OFF mechanism such as a knob, a dial, a slide, and the like. In some embodiments, the switch 290 is a power supply switch of the imaging device 300, such that the switch 290 allows for a control of power to the one or more light sources 710 through the imaging device 300. In some embodiments, a plurality of switches 290 can exists. Furthermore, use of the switch 290 allows for the distance between the imaging device 300 and the computer-enabled imaging device 300 to increase to such distances, that the imaging device 300 can be mechanically coupled to a vehicle (e.g., a remote-controlled vehicle, a telescopic pole) and/or wirelessly communicate with the imaging device 300, to allow remote control of the imaging device 300 through the switch 290 of the imaging device 300.

Accordingly, a user interface according to an exemplary embodiment of the present disclosure achieves the advantages of allowing a user to optimize and customize executing a workflow for capturing the digital asset. Furthermore, the user interface allows for the user to view a region of interest through a display of the computer-enabled imaging device 300 when executing a workflow for capturing the digital asset, which is particularly important when emitting irradiation from the one or more light sources 710 that may harm an end-user. In this way, the user can safely view the region of interest from the display of the computer-enabled imaging device 300 without directly viewing the region of interest.

A control module 622 allows for a control of the computer-enabled imaging device 300 through the imaging device 300. Specifically, the control module 622 facilitates determining and/or evaluating one or more conditions 624 of the control module 622 in order to allow for executing a workflow for capturing the digital asset, such as allowing for an initial firing or a continuous firing of the one or more light sources 710. Furthermore, in some embodiments, each condition 624, or a subset of conditions 624, includes at least one corresponding specification, which provides a requirement of the boundary condition 624 in order for the boundary condition 624 to be deemed satisfied by the control module 622. For instance, in some embodiments, the control module 622 is in communication with the one or more sensors of the computer-enabled imaging device 300 (e.g., accelerometer 417, gyroscope, etc.), and evaluates one or more measurements obtained from the one or more sensors in order to determine if a respective boundary condition 624 is satisfied by the one or more measurements. Said otherwise, the respective boundary condition 624 provides a quantifiable, objective requirement for allowing for the executing a workflow for capturing the digital asset, which provides an improved quality (e.g., resolution) of the digital asset. For instance, in some embodiments, these one or more measurements include a corresponding value for the at least one corresponding specification of the condition 624. Additionally, in some embodiments, the condition 624 specification provides the requirements for satisfying the corresponding condition 624, such as a function to determine positional tolerance of movement of the computer-enabled imaging device 300 when executing a workflow for capturing the digital asset. However, the present disclosure is not limited thereto.

In some embodiments, the control module 622 stores one or more workflows including one or more predetermined conditions 624 for utilizing the imaging device 300. For instance, in some embodiments, a first workflow is associated with a first subset of conditions 624 and a second workflow is associated with a second subset of conditions 624. If each subset of conditions 624 is associated with a unique region of interest, then either a first imaging device 300-1 conducts the first workflow and the second workflow to capture the digital asset, or the first imaging device 300-1 conducts the first workflow and a second imaging device 300-2 conducts the second workflow. In some embodiments, progress about a workflow (e.g., progress about conducting method 4000 of FIGS. 4A through 4I, method 5000 of FIGS. 5A through 5D, method 6000 of FIG. 6, etc.) is further stored in the control module 622. However, the present disclosure is not limited thereto.

A workflow module 626 facilitates storing and generating one or more workflows. Each respective workflow defines parameters for executing a workflow for capturing the digital asset (e.g., method 4000, etc.), such as a respective plurality of conditions 624 associated with the firing of the one or more light sources 710 or positioning the imaging device 300. Specifically, the workflow module 626 includes a workflow storage 628 that retains information related each workflow, such as each condition 624 utilized in the capturing the digital asset, each region of interest targeted, each image captured when executing a workflow for capturing the digital asset, and the like. In this way, the computer-enabled imaging device 300 can repeat the first workflow, for instance, in accordance with a determination that capturing the digital asset did not satisfy the end-user or one or more computational models. Furthermore, in some embodiments, the computer-enabled imaging device 300 communicates a retained workflow to a second imaging device 300-2 or a server, allowing the retained workflow to be reiterated and/or evaluated outside of the computer-enabled imaging device 300 computing environment. However, the present disclosure is not limited thereto. In some embodiments, a respective workflow retained by the workflow storage further includes information related to a location of a corresponding instance of executing a workflow for capturing the digital asset (e.g., GPS coordinates of the corresponding capture, position data of the imaging device 300, etc.), a time of the corresponding instance of executing a workflow for capturing the digital asset (e.g., date and/or time of the corresponding capture), and the like.

Figure 16:
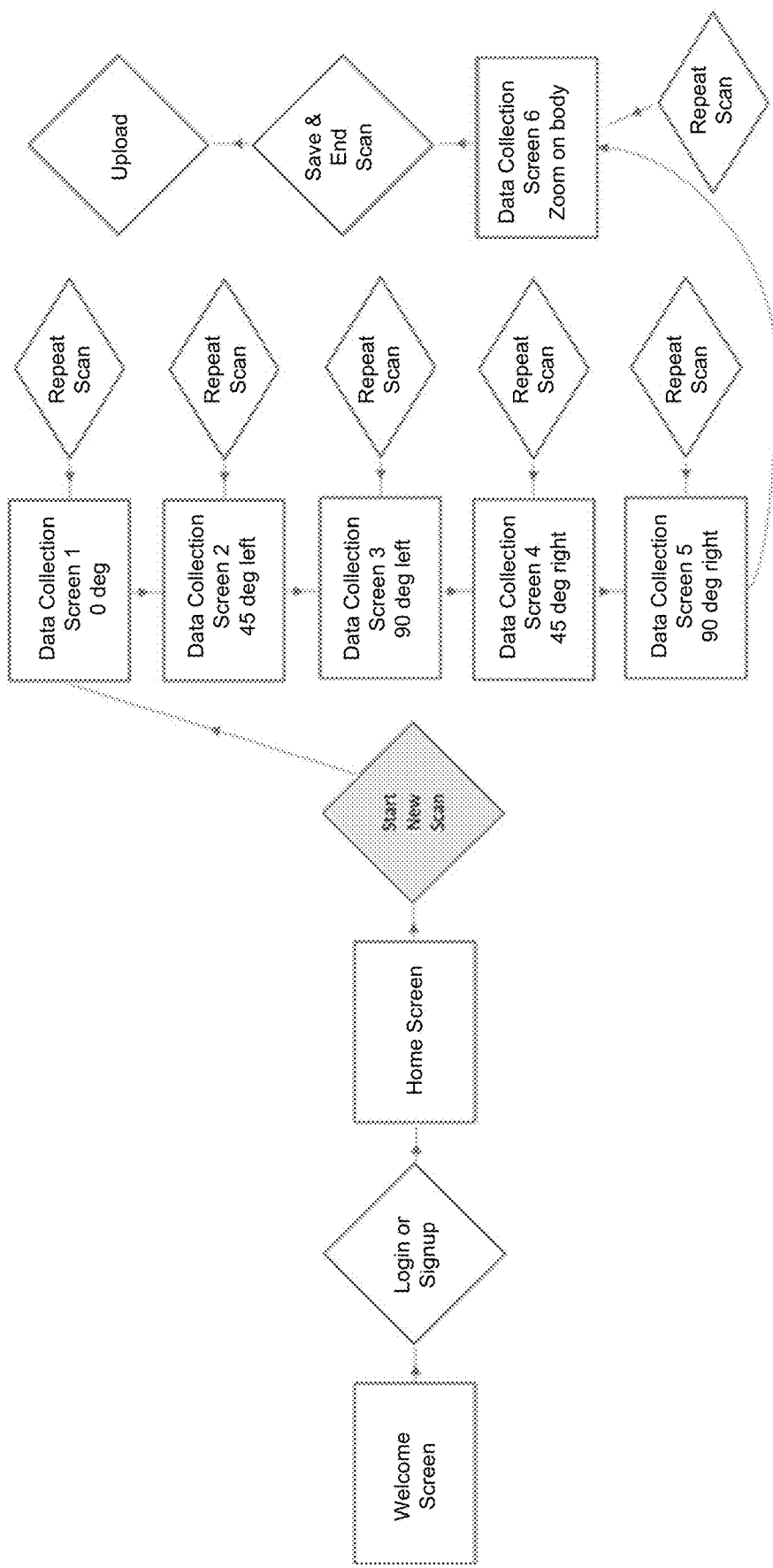
FIG. 16 provides a chart for capturing a digital asset and storing a cryptographic non-fungible token asset indicative of the digital asset using a computer-enabled imaging device, in accordance with an embodiment of the present disclosure.
Figure 17:
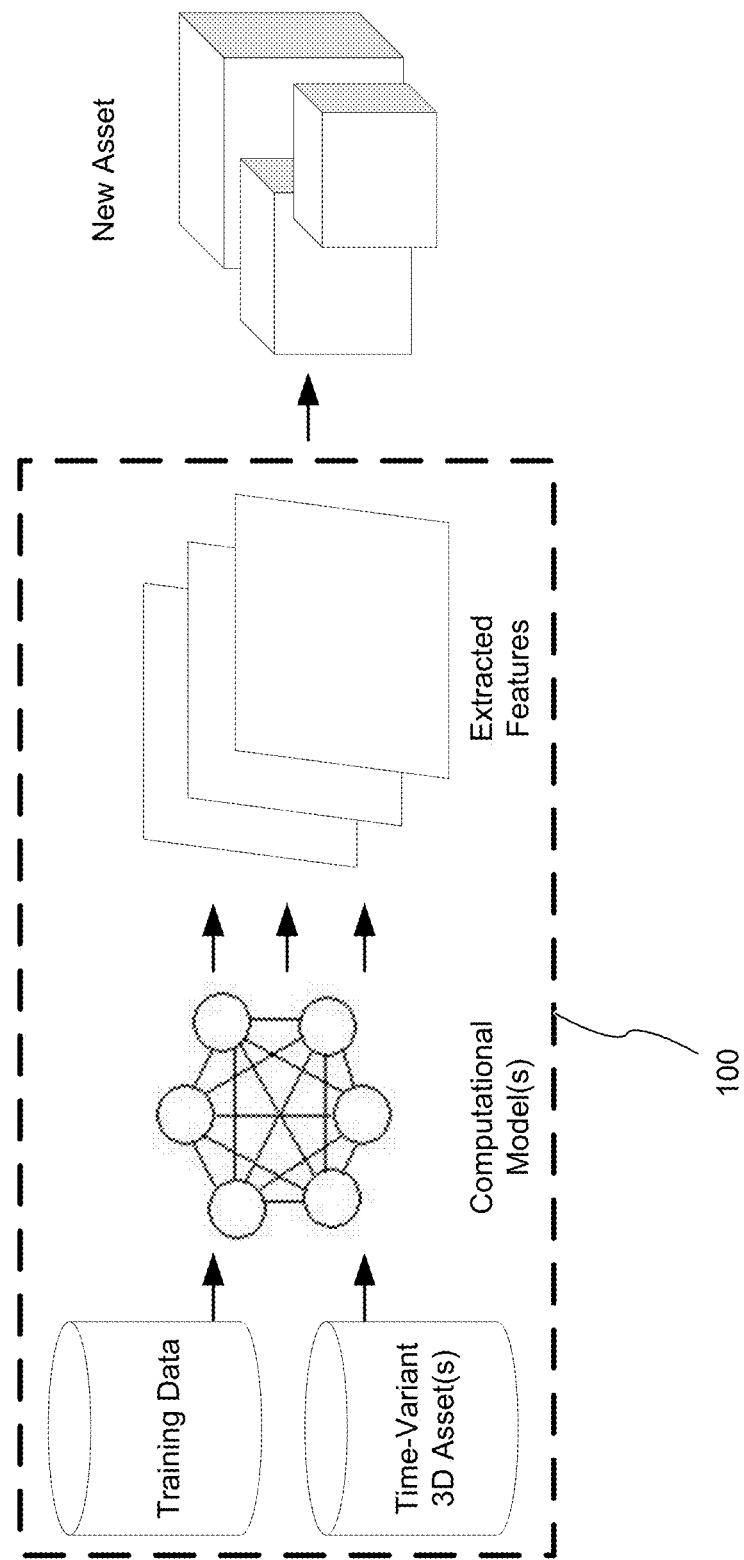
FIG. 17 provides a chart for forming a third digital or cryptographic asset based on a first digital or cryptographic asset and a second digital or cryptographic asset, in accordance with an embodiment of the present disclosure.

Referring briefly to FIGS. 16 and 17, a workflow generator 630 facilitates generating one or more workflows for capturing the digital asset associated with a 3D body at a region of interest. For instance, in some embodiments, the workflow generator 630 evaluates a respective capturing of the digital asset (e.g., a respective instance of method 4000, and generates a corresponding workflow based on the capturing of the digital asset. In some embodiments, the workflow generator 630 receives data relating to one or more workflows of the workflow storage 628, and generates a first workflow based on the one or more workflows received from the workflow storage 628. In this way, the workflow generator 630 can produce novel workflows for capturing of the digital asset based on previous instances of the capturing of the digital asset. In some embodiments, the workflow generator 630 includes one or more evaluation models, which provide a unique evaluation of an input workflow. From this, the workflow generator 630 can utilize an evaluation model for generating a workflow that can verify and/or improve a previously generated workflow.

In some embodiments, the workflow generator 630 includes one or more computational models. In some embodiments, the one or more computational models is utilized to determine n-dimensional vectors (e.g., feature vectors) whose numerical components describe select observable characteristics associated with the 3D body or the ROI. In some embodiments, the one or more computational models is utilized to determine if a boundary condition associated with a quality of a respective digital asset (e.g., resolution, etc.) is satisfied. In some embodiments, the one or more computational models of the workflow generator accomplish this by using a decision tree evaluation model, a neural network evaluation model, a support vector machine (SVM) evaluation model, a Naïve Bayes evaluation model, a pattern-matching evaluation model, a Bayesian evaluation model, a rule based evaluation model, or a combination thereof. However, the present disclosure is not limited thereto. Furthermore, in some embodiments, the decision tree evaluation model, the neural network evaluation model, the SVM evaluation model, the Naïve Bayes evaluation model, the pattern-matching evaluation model, the Bayesian evaluation model, the rule based evaluation model, or the combination thereof is utilized in determining a characteristic (e.g., an identify, a material property) of a region of interest. For instance, in some embodiments, the workflow generator utilizes the one or more computational models in order to ensure that a digital asset captured by a respective workflow is in the form of a 3D point cloud has uniform representation in a coordinate space, has discrete representation including using shapes (e.g., triangulated graphs) without restricted topology and/or geometry, is without irregularity by augmenting previously irregular spatial distributions, and the like. However, the present disclosure is not limited thereto. As another non-limiting example, in some embodiments, the workflow generator utilizes the one or more computational models in order to ensure that a digital asset captured by the respective workflow is in accordance with a second digital asset captured by the workflow, such as by utilizing a digital differential correction computational model to correct the first digital asset in accordance with known vector features from the second digital asset. As yet another non-limiting example, in some embodiments, the workflow generator utilizes the one or more computational models in order to ensure that one or more boundary conditions associated with a photogrammetric range imaging process (e.g., a structure from motion (SfM) process) such that the 3D digital asset of the 3D body is constructed with adequate resolution from a plurality of 2D digital images of the 3D body. Additional details and information regarding using the one or more computational models with the workflow can be found at Liu et al., 2018, "Generating a High-precision True Digital Orthophoto Map based on UAV Images," ISPRS International Journal of Ge-Information, 7(9), pg. 333; Dönner et al., 2020, "Geospatial Artificial Intelligence: Potentials of Machine Learning for 3D Point Clouds and Geospatial Digital Twins," PFG—Journal of Photogrammetry, Remote Sensing and Geoinformation Science, 88(1), pg. 15; Li et al., 2020, "GESAC: Robust Graph Enhanced Sample Consensus for Point Cloud Registration," ISPRS Journal of Photogrammetry and Remote Sensing, (167), pg. 363, each of which is hereby incorporated by reference in its entirety.

Additionally, in some embodiments, the workflow generator 630 facilities determining if a corresponding value for one or more condition 624 of a first capturing of the digital asset satisfies a corresponding condition based upon a plurality of measurements associated with a region of interest acquired from one or more sensors of the imaging device 300. By way of example, in some embodiments, in accordance with a determination that the corresponding value for the one or more condition 624 of the first capturing of the digital asset does not satisfy a corresponding condition, the workflow generator produces a workflow for a second capturing of the digital asset that ensures the satisfaction of the corresponding condition. In this way, if a first capturing of the digital asset does not adequately satisfy one or more conditions 624, a second workflow is generated by the workflow generator 630 to ensure adequately satisfy the one or more conditions 624.

In some embodiments, the second workflow includes one or more instructions, or notes, for the user to ensure satisfy the one or more boundary conditions 624. For instance, referring briefly to FIG. 9 through FIG. 12D, in some embodiments, the second workflow displays through a graphical user interface a note instructing the user to move (e.g., closer, towards, left, right, etc.) relative to a first portion of the region of interest that did not satisfy the one or more boundary conditions 624, or illuminates the first portion of the region of interest with a first light source set 710-1 to visible indicate the first portion of the region of interest. However, the present disclosure is not limited thereto. For instance, by having the workflow guide the user through a series of movements, the digital data set and identifying information captured when executing the respective workflow has minimal noise and increased optimization based on the comparable boundary conditions of each instance of the executed workflow. As such, this workflow generator requires a computer to be used because such considerations cannot be mentally solved. In other words, given an input to the computational model to collectively consider each respective result to generate a workflow, the computational model output needs to be determined using a computer rather than mentally in such embodiments.

In some embodiments, meta data is associated with captured multimedia (e.g., images and/or video of a region of interest) and/or a workflow for capturing of the digital asset, such as a device identifier (e.g., identifying the computer-enabled imaging device 300 within a group of mobile imaging devices 400 that fired a respective one or more light sources 710), which may include an arbitrary identifier, a MAC address, a device serial number, etc.), temporal meta data (e.g., date and time of a corresponding acquisition of conditions 624, date and time of a corresponding capture), location data (e.g., GPS coordinates of the location at which a one or more light sources 710 was fired, a position of the imaging device 300, etc.), a workflow frequency (e.g., a first frequency at which a stream of images is captured by the imaging device 300 using a first workflow, etc.), device configuration settings (e.g., image resolution, frequency ranges that the pixilated detector of the computer-enabled imaging device 300 is configured to detect, one or more boundary conditions 624, one or more determinations of satisfying the one or more conditions 624, one or more objects associated with the region of interest, etc.), and/or other camera data, data associated with the capturing of the digital asset, environmental factors associated with the capturing of the digital asset, and data associated with the region of interest and/or one or more 3D bodies within the region of interest.

Accordingly, U.S. Pub. No.: 2017/0323472, entitled "Methods and Systems for Surface Informatics Based Detection with Machine-To-Machine Networks and Smart Phones;" U.S. Pat. No. 10,455,134, entitled "Temporal Processes for Aggregating Multi Dimensional Data from Discrete and Distributed Collectors to Provide Enhanced Space-Time Perspective;" U.S. Pub. No.: 2017-0336203, entitled "Methods and Systems for Remote Sensing with Drones and Mounted Sensor Devices;" U.S. application Ser. No. 15/532,578, entitled "Swarm Approach to Consolidating and Enhancing Smartphone Target Imagery by Virtually Linking Smartphone Camera Collectors Across Space and Time Using Machine-to Machine Networks;" U.S. application Ser. No. 15/867,653, entitled "Systems and Methods for Spectral Imaging with a Transmitter Using a Plurality of Light Sources;" application Ser. No. 16/780,755, entitled "Systems and Methods for Spectral Imaging with Compensation Functions;" U.S. application Ser. No. 17/484,053, entitled "Systems and Methods for Deactivation of Viruses and Other Organisms with Mobile Ultraviolet Light Devices;" are each hereby incorporated by reference in their entirety for all purposes.

It should be appreciated that the computer-enabled imaging device 300 is only one example of a portable multifunction device, and that the computer-enabled imaging device 300 optionally has more or fewer components than shown in FIG. 3, optionally combines two or more components, or optionally has a different configuration or arrangement of the components.

Figure 7:
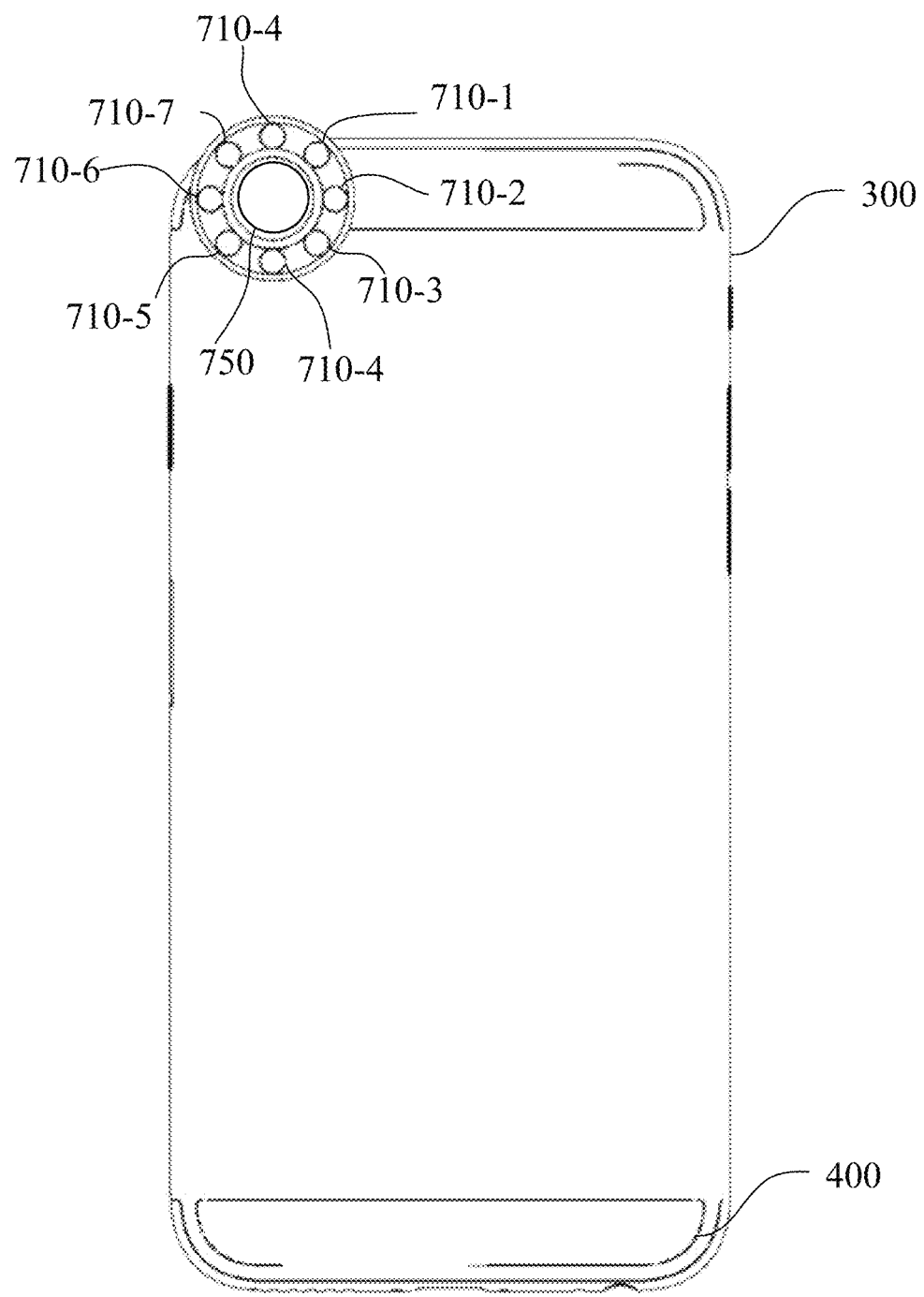
FIG. 7 is a front schematic view of a computer-enabled imaging device, in accordance with an embodiment of the present disclosure.

Referring to FIG. 7, the computer-enabled imaging device 300 includes an objective lens 750. Furthermore, in some embodiments, one or more optical mechanisms are coupled with the objective lens 750, such as one or more filters and/or a collimator, which reduces stray light. However, the present disclosure is not limited thereto. For instance, in some embodiments, the objective lens 750 is formed as a part of the computer-enabled imaging device 300 (e.g., integrally formed with the imaging device 300).

In in some embodiments, the objective lens 750 is a stand-alone device such as an auxiliary web camera in communication with the imaging device 300. In various embodiments, the objective lens 750 is selected from the group consisting of a 3D binocular, a fiber optic, a fisheye lens, a macro lens, a microscopic lens, a normal lens, and a telephoto lens.

In some embodiments, the battery 240, the power management circuit 260, and the network interface 274, or a combination thereof is disposed within a housing of the imaging device 300. In other embodiments, the battery 240, the power management circuit 260, and the network interface 274, or a combination thereof are disposed with the imaging device 300. In some embodiments, the battery 240 is a rechargeable battery. For instance, in some embodiments, the battery 240 receives power from the power system 418 of the imaging device 300, allowing for the computer-enabled imaging device 300 to supplement power for components of the computer-enabled imaging device 300 (e.g., the one or more light sources 710).

In some embodiments, the communication interface 280 includes a wireless signal transmission element and instructions are sent in accordance with an imaging method (e.g., method 4000 of FIGS. 4A through 4I, method 5000 of FIGS. 5A through 5D, method 6000 of FIG. 6, etc.) by the wireless signal transmission element. In various embodiments, wireless signal transmission element is selected from the group consisting of a Bluetooth transmission element, a ZigBee transmission element, and a Wi-Fi transmission element. In this way, the computer-enabled imaging device 300 can be controlled through the imaging device 300, such that the mobile imaging device communicates one or more instructions (e.g., conditions 624) to the imaging device through the communications interface 280. Accordingly, the communications interface 280 allows a user to communicate instructions to one or many imaging devices 100 associated with the imaging device 300.

In one implementation, the communication interface 280 includes a first communications interface 280. The computer-enabled imaging device 300 is coupled to the imaging device 300, thereby bringing the first communications interface 280 in direct physical and electrical communication with a second communication interface of the imaging device 300, thereby enabling instructions to be sent directly to the second communications interface from the first communications interface 280 in accordance with a method for capturing a digital asset.

The computer-enabled imaging device 300 also includes a controller 486. The controller 486 includes at least one executable program non-transiently stored therein, and is configured to control at least the one or more light sources 710. In some embodiments, the controller 486 is a component of the imaging device 300. However, the present disclosure is not limited thereto.

Capture.

Now that a general topology of the system 100 has been described in accordance with various embodiments of the present disclosures, details regarding some processes in accordance with FIGS. 4A through 6 will be described.

Specifically, FIGS. 4A though 4I collectively illustrates a flow chart of methods (e.g., method 4000) using a computer-enabled imaging device (e.g., imaging device 300) in accordance with an embodiment of the present disclosure. In the flow chart, the preferred parts of the methods are shown in solid line boxes whereas optional variants of the methods, or optional equipment used by the methods, are shown in dashed line boxes.

Various modules in the memory 292 of the distributed blockchain ledger system 200 and/or the imaging device 300 perform certain processes of the methods 4000 described in FIGS. 4A though 4I, unless expressly stated otherwise. Furthermore, it will be appreciated that the processes in FIGS. 4A though 4I can be encoded in a single module or any combination of modules.

Block 4002. Referring to block 4002 of FIG. 4A, a method 4000 for capturing a digital asset is provided.

The method 4000 is performed at a computer-enabled imaging device (e.g., computer-enabled imaging device 300 of FIG. 7). The computer-enabled imaging device includes one or more processors (e.g., CPU 372), a display (e.g., display 408 of FIG. 3), and a controller (e.g., controller 468 of FIG. 3). However, the present disclosure is not limited thereto. For instance, in some embodiments, the display is remote from the computer-enabled imaging device 300, such as a display of a cryptographic node device 220 or the like. At least one program (e.g., client application 500 of FIG. 3) is non-transiently stored in the controller, or a memory (e.g., memory 392 of FIG. 3) accessible by the controller. The at least one programs is configured to be executed by the one or more processors Block 4004-4008. Referring to blocks 4004-4008, in some embodiments, the one or more sensors of the computer-enabled imaging device 300 includes a gyroscope, an accelerometer (e.g., accelerometer 417 of FIG. 3), or both. Each of the gyroscope and the accelerometer determines an acceleration (e.g., a linear acceleration) or a tilting angle (e.g., pitch, a roll, a yaw), respectively, of the computer-enabled imaging device 300.

In some embodiments, the one or more sensors includes an objective lens, which allows the computer-enabled imaging device 300 to capture light from a ROI. Moreover, in some such embodiments, the imaging device 300 includes a two-dimensional pixelated detector (e.g., two-dimensional pixelated detector 473 of FIG. 3) in communication with the objective lens 750.

In some embodiments, the computer-enabled imaging device 300 includes one or more two-dimensional pixelated detectors 473. In some embodiments, the one or more two-dimensional pixelated detector 473 includes a charge-coupled device (CCD), a complementary metal-oxide-semiconductor (CMOS) phototransistors, a photo-cell, and a focal plane array. The two-dimensional pixelated detector 473 receives light from the environment, communicates with one or more lens, such as the objective lens 750, and converts the light to data representing a digital image. In some embodiments, in conjunction with the imaging module 431 (also called a camera module), the two-dimensional pixelated detector 473 captures a plurality of still digital images and/or video of a ROI. In some embodiments, the captured images and/or video for region of interest allows for the computer-enabled imaging device 300 to determine an identity of the region of interest and/or a characteristic associated with the region of interest, such as a reflectance of the region of interest, a size of the region of interest (e.g., a depth of the region of interest, a volume of the region of interest, a surface area of the region of interest, etc.). However, the present disclosure is not limited thereto.

In some embodiments, a first two-dimensional pixelated detector 473-1 is located on a rear end portion of the imaging device 300, opposite a display system 408 on a front end portion of the imaging device 300, so that the touch screen is enabled for use as a viewfinder for still and/or video image acquisition. In some embodiments, a second two-dimensional pixelated detector 473-2 is located on the front end portion of the imaging device 300, allowing for the computer-enabled imaging device 300 to acquire images and/or video of the user when operating the computer-enabled imaging device 300 (e.g., while conducting method 4000).

In some embodiments, the one or more sensors includes a ranging and imaging sensors, such as a LIDAR sensor. In some embodiments, the LIDAR sensor determines one or more distances to a portion of an ROI, such as the first 3D body 810-1, using illumination, such as laser illumination. In some embodiments, the LIDAR sensor provides 3D imaging data of an environment around the ROI. In some embodiments, the imaging data is processed by one or more computational models to generate a 3D model of the first 3D body 810-1. In some embodiments, the LIDAR sensor includes a laser light source configured to generate a plurality of target illumination laser beams (e.g., laser light channels). In some embodiments, this plurality of target illumination laser beams is aimed at, or directed to, the first 3D body and guided outwardly from the imaging device 300 to the ROI.

In some embodiments, the computer-enabled imaging device 300 and/or a portion of the ROI (e.g., the first 3D body 810-1) is forced to rotate about an axis, such that the plurality of target illumination laser beams is directed in a m-degree range about the axis. For instance, in some embodiments, the LIDAR sensor includes a photodiode receiver that is configured to detect when light from the plurality of target illumination laser beams emitted into the ROI returns (e.g., reflected echo from a portion of the first 3D body) to the LIDAR sensor. In some embodiments, the one or more computational models determine with the LIDAR sensor, based on a period of time associated with an initial time of the emission of light to a terminal time of the detected return of light, a distance from the computer-enabled imaging device to the illuminated portion of the 3D body. Accordingly, by forcing the computer-enabled imaging device 300 to traverse about an axis, Accordingly, in some embodiments, the LIDAR sensor generates a plurality of points per second that collectively form a point cloud of the digital asset. In some embodiments, the LIDAR sensor generates about 1,000 points per second, about 10,000 points per second, about 100,000 points per second, about 250,000 points per second, about 750,000 points per second, about 1 million points per second, about 2 million points per second, about 5 million points per second, or a combination thereof.

Block 4010. Referring to block 4010, in some embodiments, the computer-enabled imaging device includes a power supply (e.g., power supply of power system 418 of FIG. 3), which provides power to the computer-enabled imaging device 300 and/or the one or more light sources. In some embodiments, the power supply includes a power management system, one or more power sources (e.g., battery, alternating current (AC)), a recharging system, a power failure detection circuit, a power converter or inverter, a power status indicator (e.g., a light-emitting diode (LED)), and any other components associated with the generation, management, and distribution of power in imaging devices. In some embodiments, such as various embodiments where the housing is integrated with the imaging device 300, a battery 240, a power management circuit 260, and a communication interface 280 are components of the imaging device 300, such as a power system 418 and a network interface 420. In this way, the computer-enabled imaging device 300 is capable of providing power the one or more light sources 710 through the power system 418, allowing a user to fire the one or more light sources 710 at a variety of regions of interest without restriction to a wired power supply, such as an electrical outlet, for the computer-enabled imaging device 300. However, the present disclosure is not limited thereto. In some embodiments, by allowing the computer-enabled imaging device 300 to utilize the power supply, the imaging device 300 further utilizes the sensors without requiring one or more sensors ancillary to the imaging device 300, and power for the one or more sensors. Additionally, in some embodiments, this configuration allows a greater distance and/or angled (i.e., bent) distance to be provided between the computer-enabled imaging device 300 and the ROI. This bent distance reduces a level of harm to a user (e.g., when irradiating a 3D body with light that is harmful to a human eye. Moreover, the bent distance allows access to difficult to reach regions of interest, Block 4012. Referring to block 4012, in some embodiments, the computer-enabled imaging device (e.g., first imaging device 300-1) is controlled through an interface on a second computer-enabled device 300-2. For instance, in some embodiments, the second computer-enabled device 300-2 is physically distance from the first computer-enabled device 300-1 by about 2 meters (m), about 5 m, about 10 m, about 25 m, about 50 m, about 1,000 m, about 10,000 m, about 5 million m, about 13 million m, or a combination thereof.

Block 4014. Referring to block 4014 of FIG. 4B, the method 4000 includes acquiring an initial state of an environment in electronic form, which is a state of the environment when a process for capturing the digital asset starts. Accordingly, in some such embodiments, the initial state is configured as a set of initial values (e.g., a state of the computer-enabled imaging device $X=(x,y,\theta)$ in the initial state is abbreviated as $X_0=(x_0, y_0, \theta_0)$, for use with the one or more computational models. This initial state of the environment is acquired using the one or more sensors, which yields a data set of the initial value, which is indicative of the initial state. In some embodiments, the environment includes a state of each sensor in the one or more sensors, the ROI including the first 3D body, and a state of one or more light sources.

Blocks 4016-4018. Referring to blocks 4016-4018, in some embodiments, the initial state of the environment includes one or more spatial dimensions characteristics of the environment. Each spatial dimension characteristics in the one or more spatial dimension characteristics of the environment defines a position or an orientation of a portion of the ROI, such the imaging device 300 or the first 3D body 810-1. As a non-limiting example, in some embodiments, the one or more spatial dimensions characteristics includes a spatial distance between the first 3D body and a sensor in the one or more sensors (e.g., L1, L2, L3, L4, or a combination thereof of FIG. 8), a length of the first 3D body, a characteristic length of the first 3D body (e.g., a characteristic diameter of the first 3D body), a height of the first 3D body, a width of the first 3D body, a lighting characteristic (e.g., luminous flux, a luminous intensity, an illuminance, a spectral range, etc.), an orientation of the computer-enabled imaging device (e.g., a roll, a yaw, a pitch, or a combination there), or a combination thereof. Moreover, in some such embodiments, the spatial dimension characteristics include a velocity of the imaging device or the 3D body, an angle between the imaging device and the 3D body, a translational acceleration, an angular velocity of the imaging device 300 and/or the 3D body, or a combination thereof.

Block 4020. Referring to block 4020, in some embodiments, the initial state of the environment includes a first characteristic of an ambient lighting. In some embodiments, the first characteristic of the ambient lighting includes an ambient light intensity, a variation of the ambient light intensity, a spectral range of the ambient light, and the like.

Block 4022. Referring to block 4022, in some embodiments, the initial state is associated with a point in space-time, such as an event in spacetime (e.g., a step of method 4000, a step of method 5000, a step of method 6000, etc.). In some embodiments, spacetime all the points within a certain area or volume in space (e.g., the ROI), and within a certain time interval (e.g., between 1:00 PM and 1:02 PM on Friday, Aug. 22, 2021. A non-limiting example of a spacetime include a data set that defines a plurality of movements of a subject (e.g., subject holding imaging device 300). For instance, in some embodiments, the imaging device 300 includes a GPS transmitter that periodically determines one or more spatial coordinates within a certain degree of accuracy. As the imaging device 300 moves about within a certain time period, the imaging device 300 generates spacetime data points. Accordingly, in some embodiments, the spacetime data points are combined (e.g., by interpolation and/or expanded) to generate an event in spacetime.

Blocks 4024-4028. Referring to block 4024-4028, in some embodiments, the one or more light sources includes a light emitting diode (LED). In some embodiments, the LED is an additive white LED. In some embodiments, the LED is an additive wavelength range specific LED. For instance, in some embodiments, the method 4000 utilizes principles of additive color mixing using a plurality of additive white LEDs, which allows for tuning the LED's luminous flux, input power, and luminous efficacy of white-light LED cluster Blocks 4030-4032. Referring to blocks 4030-4032, in some embodiments, the one or more light sources includes a polarized light source. In some embodiments, the polarized light source is an additive polarized light source. By using the additive polarized light source, the method 4000 allows for capturing the digital asset including a plurality of digital images, in which the plurality of digital images includes cross polarized digital images and/or linearly polarized digital images. In some such embodiments, the polarization of the digital images allows for polarized layering of the digital asset.

Blocks 4034-4036. Referring to blocks 4034-4036, in some embodiments, the one or more light sources 710 includes a laser light source or a plurality of laser light sources. In some embodiments, a plurality of spot readings is simultaneously compiled for each laser light source in plurality of laser light sources. Laser light sources are particularly useful when a subject or region of interest is a solid color. However, the present disclosure is not limited thereto. In some embodiments, the one or more light sources 710 omit a laser light pulsed source.

Blocks 4038-4046. Referring to blocks 4038-4046 of FIG. 4C, in some embodiments, a respective light source in the one or more light sources is configured to emit light that is substantially limited to a spectral range. In the present embodiment, each single light source has a predetermined spectral range or wavelength. some embodiments, the unique spectral range of each light source set 710 is defined by a given type of light source disposed in a respective light source 710. However, the present disclosure is not limited thereto. For instance, in some embodiments, one or more filters is disposed interposing between a respective light source 710 and the region of interest. In some embodiments, the one or more light sources 710 includes full spectrum light sources. In another embodiment, the one or more light sources 710 includes partial spectrum light sources including, but not limited to, halogen light sources, tungsten light sources, fluorescent light sources, and/or a combination thereof. In some embodiments, the one or more light sources 710 includes stable LEDs, tunable LEDs, or a combination thereof. In some embodiments, the one or more light sources 710 includes light sources that vary in wavelength with time or a predetermined function.

As such, in some embodiments, each light source (710-1, 710-2, 710-3, 710-4) in the one or more light sources 710 emits a unique spectral range or wavelength associated with a corresponding predetermined spectral range. By way of example, a light source 710-1 emits a first spectral range or wavelength, a light source 710-2 emits a second spectral range or wavelength, a light source 710-3 emits a third spectral range or wavelength, and a light source 710-4 emits a fourth spectral range or wavelength. However, the present invention is not limited thereto. In some embodiments, each light source 710 is characterized by (e.g., emits) a predetermined spectral range or wavelength. In some embodiments, each light source 710 is characterized by a different spectral range or wavelength that does not overlap with the spectral range or wavelength of any of the other light source 710. In some embodiments, each light source 710 is characterized by a different spectral range that does not overlap with the spectral range of any of the other light source 710. In some embodiments, each light source 710 is characterized by a different spectral range and the different spectral range of at least one light source 710 that partially overlaps with the spectral range of another light source 710. For instance, in some embodiments, a first light source 710 is characterized by a spectral range from x toy nm and a second first source 710 is characterized by a spectral range from w to z nm, where w is between x and y.

In various embodiments, only a red spectral band light source 710-1, a green light spectrum band light source 710-2, a blue light spectrum band light source 710-3, or a combination there exists in the one or more light sources 710. In such embodiments, the imaging device further includes a color detector. The color detector is configured to detect across the electromagnetic spectrum, specifically the visible light band in the present embodiment, and senses excitation light reflected from a region of interest. Red, green, and blue light wavelengths bands are distinct and can easily be differentiated from each other, thus, in some embodiments, the detector detect a multi-modal distribution of light. The multi-modal distribution can be analyzed to determine the specific of wavelengths or spectral bands of light detected by the color detector. Thus, a single image can be captured, analyzed, and processes to produce an image for analysis by the imaging device 300. However, the present disclosure is not limited thereto.

In this way, light emitted by the computer-enabled imaging device 300 is limited to the predetermined spectral range. In some embodiments, various light source 710 in the one or more light sources 710 share and/or overlap within a spectral range. In some embodiments, the predetermined spectral range is from a first wavelength to a second wavelength (e.g., from 250 nm to 1500 nm, from 250 nm to 400 nm, from 250 nm to 310 nm, from 400 nm to 1500 nm, from 400 nm to 710 nm, from 400 nm to 695 nm, from 695 nm to 715 nm, from 710 nm to 1500 nm, or a combination thereof). In some embodiments, the first wavelength and the second wavelength are associated with a similar band of light or different bands of light. By way of example, in some embodiments, the first wavelength is a first region of the red visible light spectral range and the second wavelength is a green visible light spectral range, such that the first wavelength and the second wavelength are of the similar visible light spectral band. As another non-limiting the example, in some embodiments, the first wavelength is a first region of the UV-C spectral range (e.g., 260 nm-270 nm) and the second wavelength is a first region of the blue visible light range (e.g., 460 nm-470 nm), such that the first wavelength and the second wavelength are of dissimilar regions of the electromagnetic spectrum.

In some embodiments, these spectral band options are automatically adjusted and optimized by evaluating the initial state of the environment by one or more computational models according to various environmental factors, or can be manually adjusted by a user of the imaging device 300, or further can be adjusted based one or more boundary conditions, such as one or more boundary conditions that is predetermined based on a corresponding region of interest and/or application (e.g., a first boundary condition 624-1 based on a predetermined region of interest associated with a eye; a second condition 624-2 based on an application of emitting light at a first medium, such as water or air; etc.). However, the present disclosure is not limited thereto.

In some embodiments, the first spectral range and the $k^{th}$ spectral range overlap but do not coexist. In other embodiments, the first spectral range and the $k^{th}$ spectral range overlap. In some embodiments, each spectral range in the plurality of spectral ranges is engineered for a specific predetermined wavelength or spectral range.

In one implementation, the computer-enabled imaging device 300 is configured to collect a set of images. The set of images is collected in order to determine particular characteristics of a region of interest, such as either at the computer-enabled imaging device 300 or at a remote device. For instance, in some embodiments, each image is collected at a discrete spectral band and time period, and the set of images includes images collected at any two or more set of discrete spectral bands having central wavelengths. However, in the present disclosure is not limited thereto. In some embodiments, a first image is collected as a boundary condition 624, such as when a first light source 710-1 in the one or more light sources 710-1 emits light, which has a wavelength in the visible region of the electromagnetic spectrum for 2 ms, and a second image is collected, such as when a second light source 710-2 in the one or more light sources 710 emits light which has a wavelength of 265±5 nm for 9 ms. In this way, the computer-enabled imaging device 300 can evaluate the second image against the first image to ensure safe firing of the one or more light sources 710. However, the present disclosure is not limited thereto. Furthermore, the above exposure times are not meant to significantly limit the present disclosure. For instance, in some embodiments each exposure time can vary by ±1 ms, ±2 ms, or ±5 ms.

In some implementations, each respective light source of a respective light source (e.g., 710-1-A, 710-2-A, 710-3-A) includes a unique discrete spectral range or wavelength. However, the present disclosure is not limited thereto.

Blocks 4048-4052. In some embodiments, the first 3D body is a portion of a first human subject. For instance, referring briefly to FIG. 9, a first 3D body 810 is depicted that is a head portion of a (inanimate) human subject. In some embodiments, the portion of the first human subject includes the head, the neck, the skull, the forehead, the nose, the mouse, the eyes, the ears, the chest, the shoulders, the breast, the abdomen, the buttocks, the hips, the back, the pelvic, the pubic, the forearm, the upper arm, the wrist, the hand, the leg, the foot, etc. In some such embodiments, each aforementioned portion of the first human subject includes one or more sub-bodies.

In some embodiments, the first human subject is an operator of the computer-enabled imaging device. By having the first human subject operate the computer-enabled imaging device 300, the method 4000 supports and guides the user in performing the method 4000 to capture the digital asset. Furthermore, with the first human subject as the operator, in some such embodiments, the digital asset includes a 3D body of the first human subject. Accordingly, the computer-enabled imaging device allows for capturing the digital asset that includes a self-digital image (e.g., a selfie).

In some embodiments, a second human subject different from the first human subject is an operator of the computer-enabled imaging device. For instance, in some embodiments, the second human subject is a medical practitioner (e.g., clinician) associated with the first human subject, which allows for professional human oversight when capturing the digital asset. However, the present disclosure is not limited thereto.

Block 4054. Referring to block 4054, in some embodiments, the first 3D body includes a plurality of sub-bodies, such as one or more limbs and/or digits (e.g., fingers, toes). Moreover, the digital asset is a digital representation of at least one sub-body in the plurality of sub-bodies. For instance, in some embodiments, the imaging device is used to capture digital images for the first 3D body and capture a digital asset of a sub-body of the first 3D body, such as the right eye of the first 3D body. However, the present disclosure is not limited thereto.

Block 4056. Referring to block 4056, in some embodiments, the ROI includes a second 3D body different from the first 3D body. Furthermore, the determining the plurality of boundary conditions is based on one or more characteristics of the second 3D body.

Block 4058. Referring to block 4058 of FIG. 4D, in some embodiments, the method 4000 includes determining, based at least in part on the initial state of the environment, a plurality of boundary conditions associated with a workflow for capturing the digital asset. Each boundary condition 624 is utilized by the method 4000 to enable the capturing of the digital asset, such as to initiating capturing a respective digital image or powering one or more light sources 710. Accordingly, in some embodiments, a first boundary condition in the plurality of boundary conditions is defined, at least in part, by a measurement from a sensor in the one or more sensors (e.g., a threshold accelerometer value to ensure the computer-enabled imaging device is not traversing at an excess velocity). In some embodiments, a second boundary condition in the plurality of boundary conditions is defined, at least in part, by a state of the 3D body and/or the ROI, such as one or more lighting characteristics. However, the present disclosure is not limited thereto.

As a non-limiting example, in some embodiments, the determining of the plurality of boundary conditions 624 includes capturing a first digital image through the objective lens of the computer-enabled imaging device 300. The computer-enabled imaging device 300 evaluates (e.g., using a Bayesian computational model) the first digital image to determine a classification or a feature of the 3D body. In some embodiments, the determination of the classification of the 3D body includes considering requiring a presence of a corresponding object (e.g., a face of a user) in the region of interest when executing the workflow. Additional details and information regarding an evaluation of an image can be found at Bauml et al., 2010, "Multi-pose Face Recognition for Person Retrieval in Camera Networks," IEEE International Conference on Advanced Video and Signal Based Surveillance; Barbu et al., 2019, "Objectnet: A large-scale Bias-controlled Dataset for Pushing the Limits of Object Recognition Models," 33rd Conference on Neural Information Processing Systems, print, each which is hereby incorporated by reference in its entirety. For instance, in some embodiments, when executing the workflow for capturing the digital asset, a threshold value required to satisfy a corresponding boundary condition is modified based on the classification or the feature of the 3D body. For instance, in accordance with a determination that the 3D body is a nose, given a random background of the ROI, a random position of the 3D body and/or the computer-enabled imaging device (e.g., initial position, orientation, etc.), and a random imaging viewpoint, the workflow ensures that the computer-enabled imaging device 300 traverses a proper path to capture the digital asset (e.g., given that the contours of the nose are collectively obtained within the plurality of digital images). In this way, in some such embodiments, the workflow and boundary conditions provide exploitable correlations for capturing a respective digital asset. However, the present disclosure is not limited thereto.

In some embodiments, the second plurality of boundary conditions includes at least 2 boundary conditions, at least 5 boundary conditions, at least 10 boundary conditions, at least 25 boundary conditions, at least 40 boundary conditions, at least 50 boundary conditions, at least 75 boundary conditions, at least 100 boundary conditions, at least 125 boundary conditions, at least 150 boundary conditions, at least 200 boundary conditions, at least 225 boundary conditions, at least 350 boundary conditions, at least 500 boundary condition, at least 750 boundary conditions, at least 2,000 boundary conditions, at least 5,000 boundary conditions, at least 10,000 boundary conditions, at least 75,000 boundary conditions, at least 200,000 boundary conditions, at least 500,000 boundary conditions, at least $1 \times 10^6$ boundary conditions, at least $5 \times 10^6$ boundary conditions, at least $1 \times 10^{10}$ boundary conditions, or a combination thereof. In some embodiments, the second plurality of boundary conditions includes at most 2 boundary conditions, at most 5 boundary conditions, at most 10 boundary conditions, at most 25 boundary conditions, at most 40 boundary conditions, at most 50 boundary conditions, at most 75 boundary conditions, at most 100 boundary conditions, at most 125 boundary conditions, at most 150 boundary conditions, at most 200 boundary conditions, at most 225 boundary conditions, at most 350 boundary conditions, at most 500 boundary condition, at most 750 boundary conditions, at most 2,000 boundary conditions, at most 5,000 boundary conditions, at most 10,000 boundary conditions, at most 75,000 boundary conditions, at most 200,000 boundary conditions, at most 500,000 boundary conditions, at most $1 \times 10^6$ boundary conditions, at most $5 \times 10^6$ boundary conditions, at most $1 \times 10^7$ boundary conditions, or a combination thereof. In some embodiments, the second plurality of boundary conditions is between 10,000 and $1 \times 10^7$, between 100,000 and $5 \times 10^6$, or between 500,000 and $1 \times 10^6$.

Blocks 4060-4066. Referring to blocks 4060-4066, in some embodiments, the plurality of boundary conditions is derived from a measurement by the one or more sensors. For instance, in some embodiments, the plurality of boundary conditions includes a position tolerance of the computer-enabled imaging device. In some embodiments, the computer-enabled is a mobile imaging device. Furthermore, the position tolerance of the computer-enabled imaging device includes one or more translational position tolerances of the mobile imaging device, one or more rotational position tolerances of the mobile imaging device, or both. In some embodiments, the one or more translational position tolerances includes a distance tolerance from the ROI, such as a height from a portion of the ROI. In some embodiments, the one or more rotational position tolerances includes a yaw tolerance, a pitch tolerance, a roll tolerance, or a combination thereof.

Block 4068. Referring to block 4068, in some embodiments, a first boundary condition in the plurality of boundary conditions is based on a historical workflow associated with the first 3D body. For instance, in some embodiments, the first boundary condition is obtained from a workflow retained by a workflow storage (e.g., workflow storage 628 of FIG. 3), which allows the method 4000 to utilized previous boundary condition when capturing an asset of the present disclosure. In some embodiments, the historical workflow is a respective workflow previously executed by an imaging device 300. For instance, in some embodiments, the historical workflow represents a logical condition previously evaluated by a remote device, a solution to a quantitative problem, a boundary condition associated with a first 3D body, or a combination thereof. However, the present disclosure is not limited thereto.

Block 4070. Referring to block 4070 of FIG. 4E, the method 4000 includes displaying, within a graphical user interface on the display, a visualization of each respective boundary condition in a set of boundary conditions in the plurality of boundary conditions. The visualization includes a plurality of visual cues 910, which is configured to support the end-user when capturing the digital asset. The plurality of visual cues includes a first visual cue 910-1 and a second visual cue 910-2. Each respective visual cue in the plurality of visual cues provides a visual indication of a state of a corresponding boundary condition in the set of boundary conditions.

In some embodiments, each respective visual cue in the plurality of visual cues provides note associated with a capturing of the digital asset. In some embodiments, the note is associated with satisfying one or more conditions 624 for capturing of the digital asset. Accordingly, in some embodiments, in accordance with a determination that the satisfying and/or not satisfying one or more conditions 624 occurs, the application 500 displays a corresponding predetermined note on the user interface 501 of the display 408 of the imaging device 300, bringing the one or more conditions 624 to the attention of the user. As a non-limiting example, referring briefly to FIGS. 12A through 12D, in some embodiments, the one or more conditions includes a first boundary conditions 624-1 associated a first view of the first 3D object, such that when a current view of the ROI is not the first view (e.g., a front view, a first side view, a second side view, a rear view, a bottom view, a top view, a partial view, a magnified view, etc.), a first note associated with the first boundary condition 624-1 is displayed on the display of the imaging device 300, bringing the attention of the user to "Move Left," "Move Closer," and the like.

Blocks 4072-4074. Referring to blocks 4072-4047, in some embodiments, the first visual cue is exhibited in the graphical user interface as an annulus, a circle, a polygon, a line, or a combination thereof. In some embodiments, the visualization of the first visual cue changes (e.g., dynamically updates) over a period of time. In some embodiments, the visualization of the first visual cue is static. For instance, in some embodiments, the first visual cue includes one or more circular dots that indicate a distance to the 3D body. In some embodiments, the second visual cue is exhibited within the graphical user interface as a compass rose.

Figure 18:
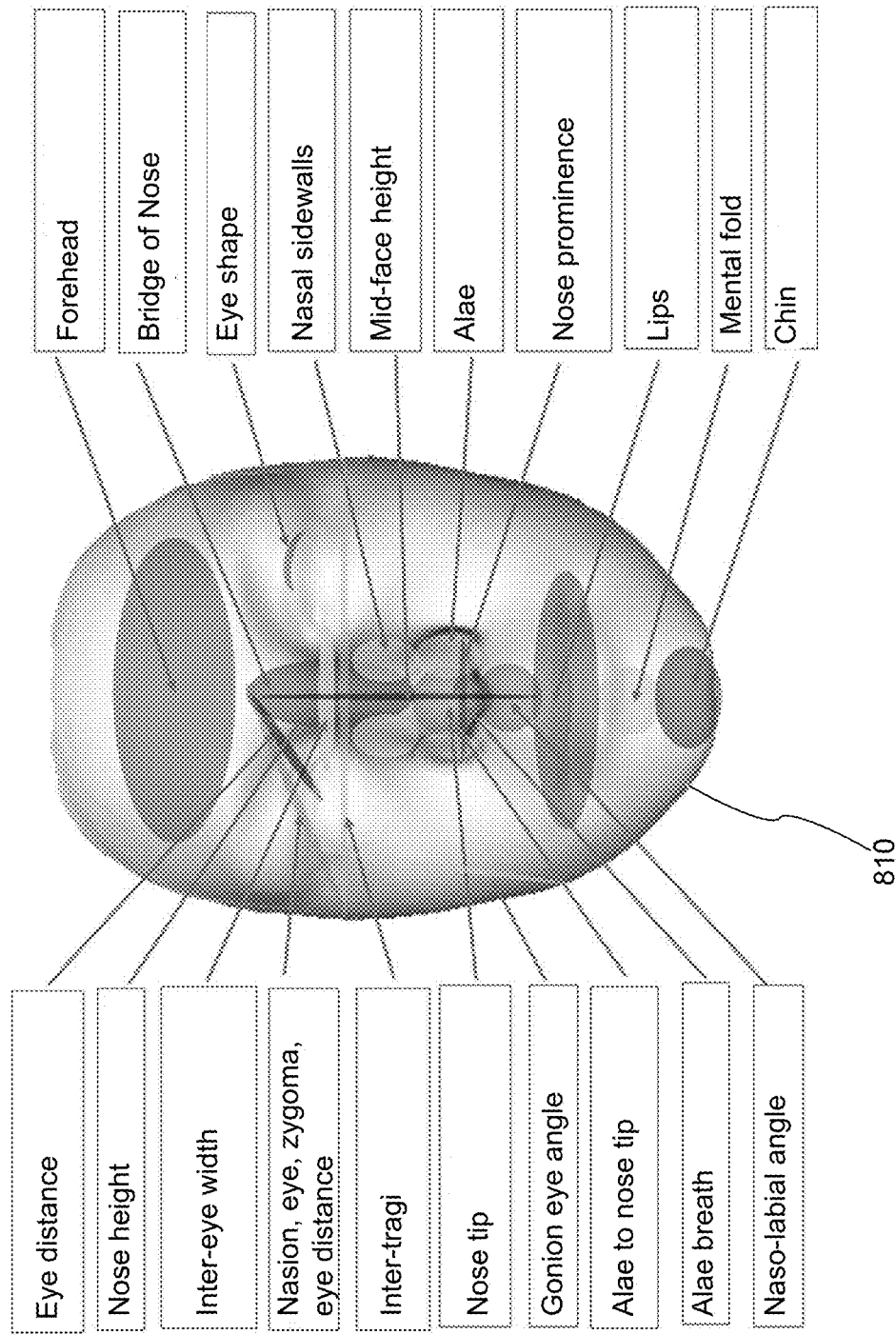
FIG. 18 illustrates a plurality of features of a 3D facial body, in accordance with an embodiment of the present disclosure.

Blocks 4076-4078. Referring to blocks 4076-4078, in some embodiments, the plurality of visual cues include a third visual cue associated with a feature of the first 3D body. In some embodiments, the feature of the first 3D body includes a facial feature, such as. As a non-limiting example, in some embodiments, the third visual cue includes one or more colored bars projected over the first 3D body. In some embodiments, the one or more colored bars include a first horizontal line utilized to indicate a center of a portion of a 3D body, connects one or more points by a line, extends the line to a direction, and the like. In some embodiments, the one or more colored bars include a vertical line based on the detected points on a nose and lips of the 3D body to project a line in the center of the face of the 3D body. For instance, referring briefly, to FIG. 18, a plurality of facial features are depicted, which include a plurality of measurements. In some embodiments, the boundary condition is based on the plurality of measurements, in which the plurality of measurements includes a distance between the computer-enabled imaging device and a portion of the region of interest. In some embodiments, the distance between the computer-enabled imaging device and the portion of the region of interest is a respective measurement of a first distance L1 of FIG. 8, a respective measurement of a second distance L2 of FIG. 8, a respective measurement of a third distance L3 of FIG. 8, a respective measurement of a fourth distance L4 of FIG. 8, or a combination thereof. However, the present disclosure is not limited thereto. In some embodiments, the plurality of measurements includes an angle of incidence of light on the region of interest. Accordingly, the computer-enabled imaging device is capable of determining a pose of the computer-enabled imaging device, a pose of the 3D body, and relative rotational and/or translational movement between the computer-enabled imaging device and the 3D body. In some embodiments, the distance between computer-enabled imaging device and the region of interest is used to determine a size of the region of interest, such as a surface area of the region of interest, a volume of the region of interest, and the like. In some embodiments, the distance is determined based on a plurality of estimated positions between the computer-enabled imaging device and the region of interest, such as a first center distance, and at least two proximate distances surrounding the first center distance. Additional details and information regarding the determination of the distance is found at Gaku Nakano, 2019, "A Simple Direct Solution to the Perspective-Three-Point Problem," BMVC, pg 29, which is hereby incorporated by reference in its entirety. Specifically, in some embodiments, the pose of the computer-enabled imaging device is determined based on one or more measurements obtained from the objective lens 750, the one or more accelerometer 417, the one or more gyroscopes, or a combination thereof. Additional details and information regarding the determination of the pose through an objective lens can be found at Skaloud et al., 1996, "Exterior Orientation by Direct Measurement of Camera Position and Attitude," International Archives of Photogrammetry and Remote Sensing, 31(3), print, which is hereby incorporated by reference in its entirety.

In some embodiments, the pose of the computer-enabled imaging device is determined based one or more characteristics associated with a respective region of interest. For instance, in some embodiments, one or more characteristics associated with the 3D body include an appearance of the 3D body (e.g., a shape of the 3D body, a color of the 3D body, a reflectance of the 3D body, etc.). In some embodiments, the one or more characteristics associated with the 3D body is derived from identifying information derived from a previous capturing of the digital asset, such as a workflow of a workflow storage. In some embodiments, the one or more characteristics associated with the 3D body is based on a reference database including a plurality of characteristics having an association with a predetermined region of interest. Additional details and information regarding determining pose based on characteristics of the 3D body can be found at Oe et al., 2005, "Estimating Camera Position and Posture by Using Feature Landmark Database," Scandinavian Conference on Image Analysis, pg. 171; Lee et al., 1998, "Fine Active Calibration of Camera Position/Orientation through Pattern Recognition," IEEE ISIE, print; Dettwiler et al., 1994, "Motion Tracking with an Active Camera," IEEE Transactions on Pattern Analysis and Machine Intelligence, 16(5), pg. 449, each of which is hereby incorporated by reference in its entirety.

Blocks 4080-4082. Referring to blocks 4080-4082, in some embodiments, the plurality of visual cues includes a fourth visual cue that is associated with a projected representation of light projected onto the first 3D body. In some embodiments, the projected representation of light includes a triangulated representation. The triangulated representation includes a plurality of vertices and a corresponding plurality of edges interconnecting the plurality of vertices. For instance, referring to FIGS. 9 through 12D, in some embodiments, the triangulated presentation a plurality of vertices and a corresponding plurality of edges interconnecting the plurality of vertices that is overlayed onto the visualization of the first 3D body in the form of a triangulated polyhedron mesh, which allows for a subject to visualize the contours and surfaces of the first 3D body. However, the present disclosure is not limited thereto.

Block 4084. Referring to block 4084 of FIG. 4F, the method 4000 includes updating, when displaying the graphical user interface, at least one of the first visual cue and the second visual cue when each boundary condition in the set of boundary conditions is satisfied. Accordingly, by updating the at least one of the first visual cue and the second visual cue when each boundary condition in the set of boundary conditions is satisfied, the subject is visually notified of the satisfied boundary condition, which aids in capturing the digital asset. In some embodiments, the updating the at least one of the first visual cue and the second visual cue when each boundary condition in the set of boundary conditions is satisfied is performed dynamically when capturing the digital asset.

Block 4086. Referring to block 4086, in some embodiments, the updating the at least one of the first visual cue and/or the second visual cue includes increasing a display size of the at least one of the first visual cue and/or the second visual cue, decreasing the display size of the at least one of the first visual cue and/or the second visual cue, changing a display color of the at least one of the first visual cue and/or the second visual cue, changing a display shape of the at least one of the first visual cue and/or the second visual cue, or a combination thereof. Accordingly, in some such embodiments, the updating includes biasing a feature of a respective visual cue such as a shading, a border, a color, a size, etc., independently or relative to the first visual cue. A non-limiting example includes dimming a third visual cue exhibited as a circle, changing a color of the circle (e.g., from green to blue), and the like when a boundary condition is satisfied.

Blocks 4088-4090. Referring to blocks 4088-4090, in some embodiments, the computer-enabled imaging device further includes a vibration mechanism housed by computer-enabled imaging device. Moreover, the updating the graphical user interface further includes causing the vibration mechanism to provide a plurality of vibrations at a frequency through a housing of the computer-enabled imaging device. In some embodiments, the plurality of vibrations includes a set of synchronous vibrations.

In some embodiments, the first frequency includes a light vibration with low frequency, such as when a face is detected in the ROI (e.g., detecting a face starts the haptics, if no face then the haptics do not trigger). In some embodiments, a second frequency includes the light vibration with increased frequency, such as when a roll or pitch of the imaging device 300 satisfies a boundary condition 624. In some embodiments, a third frequency includes the light vibration with even further increased frequency, such as when the roll and the pitch of the imaging device 300 satisfies the boundary condition 624. In some embodiments, a fourth frequency includes a continuous vibration when each boundary condition is satisfied. However, the present disclosure is not limited thereto.

Blocks 4092. Referring to block 4092, in some embodiments, the computer-enabled imaging device further includes an audio circuitry housed by the computer-enabled imaging device. Moreover, the updating the graphical user interface further includes causing the audio circuitry to provide one or more audible cues. In some embodiments, the one or more audible cues include intermittent and/or continuous beeps of sound to guide the user to meet the boundary conditions (e.g., increased frequency or pitch of beeps as the user moves towards satisfying the boundary condition). However, the present disclosure is not limited thereto.

Block 4094. Referring to block 4094, the method 4000 includes executing, in accordance with a determination that each boundary condition in the set of boundary conditions is satisfied, the workflow at the computer-enabled imaging device, thereby capturing the digital asset. Accordingly, in some such embodiments, the method 4000 provides executing the workflow at the computer-enabled imaging device, and, therefore, capturing of the digital asset 1350 without human interference. In some embodiments, the human input within the method 4000 includes receiving the request to capture the first digital asset and traversing the computer-enabled imaging device 300.

Blocks 4096-4100. Referring to blocks 4096-4100, In some embodiments, the digital asset includes one or more digital images, one or more two-dimensional (2D) maps, one or more 3D maps, one or more dense point clouds, one or more textured meshes, one or more cryptographic non-fungible token assets, or a combination thereof. In some embodiments, the one or more 2D maps includes a decomposable triangulated graph. In some embodiments, the digital asset includes one or more cryptographic non-fungible token assets. Moreover, the one or more cryptographic non-fungible token assets includes an inimitable cryptographic non-fungible token asset.

Blocks 4102-4118. Referring to blocks 4102 of FIG. 4G to block 4118 of FIG. 4H, in some embodiments, the workflow at the computer-enabled imaging device includes capturing a plurality of digital images of the ROI. Each respective digital image in the plurality of digital images is collectively defined by a plurality of characteristics. Moreover, the workflow at the computer-enabled imaging device includes determining a characteristic relationship. The characteristic relationship includes a comparison of a first instance of a first characteristic in the plurality of characteristics defining, at least in part, a first digital image in the plurality of digital images and a second instance of the first characteristic defining, at least in part, a second digital image in the plurality of digital images. The workflow at the computer-enabled imaging device further includes generating the digital asset based, at least in part, on the second digital image. The digital asset includes a degree of change of the first characteristic in accordance with the characteristic relationship.

In some embodiments, the first characteristic is associated with a position of a portion of the first 3D body. Furthermore, the degree of change includes a change in the position of the portion of the first 3D body. In some embodiments, the change in the position includes aligning the portion of the first 3D body to a direction. In some embodiments, the change in the position includes compensating for a tilt and/or a pan of the computer-enable imaging device. In some embodiments, the first characteristic is associated with a lighting of a portion of the first 3D body. Moreover, the degree of change includes a change in the lighting of the portion of the first 3D body. In some embodiments, the first characteristic is associated with a visibility of a portion of the first 3D body. Furthermore, the degree of change includes a change in the visibility of the portion of the first 3D body. In some embodiments, the change in the visibility is configured to reveal one or more surfaces or subsurface features of the first 3D body. As a non-limiting example, in some embodiments, the change in visibility configured to reveal one or more surfaces or subsurface features of the first 3D body. In some embodiments, the first characteristic is associated with a spectral range of a portion of the first 3D body. Moreover, the degree of change includes a change in the spectral range of the portion of the first 3D body. In some embodiments, the first characteristic is associated with a position of a portion of the first 3D body. Furthermore, the degree of change includes a change in the position of the portion of the first 3D body. In some embodiments, the first characteristic is associated with a temporal change of a portion of the first 3D body. Moreover, the degree of change includes a rate of the temporal change of the portion of the first 3D body. In some embodiments, the temporal changes includes one or more seasonal changes, a growth factor, etc.

Block 4120. Referring to block 4120, in some embodiments, the digital asset includes a digital video. The digital video includes the plurality of digital images arranged in a first temporal sequence, such as an order of capture or acquisition.

Block 4122. Referring to block 4122, in some embodiments, the digital asset includes a 2D computer-aided design (CAD) and/or a 3D CAD. For instance, in some embodiments, the 2D CAD and/or the 3D CAD is generated based on the plurality of digital images. For instance, in some embodiments, the method 4000 generates a 2D pixel or 3D voxel based on an identification of a feature within the ROI. As a non-limiting example, in some embodiments, the digital asset is generated by one or more point processing techniques, one or more triangulation techniques, one or more grid generation techniques, or a combination thereof.

Block 4124. Referring to block 4124, in some embodiments, the determining the characteristic relationship further includes projecting the portion of the first 3D body to a second 3D body different from the first 3D body. For instance, in some embodiments, the first 3D body is a first arm of a first human subject and the second 3D body is a second arm of a second arm of a second human subject, which allows for visual comparison using the projection. However, the present disclosure is not limited thereto.

Block 4126. Referring to block 4126, in some embodiments, a first resolution of the digital asset is greater than a second resolution of an image in the plurality of digital images. For instance, in some embodiments, the first resolution is about 80 line points per unit length (e.g., line points per millimeter) whereas the second resolution is about 20 line points per unit length. However, the present disclosure is not limited thereto. Accordingly, in some embodiments, the method 4000 provides for improving the resolution of the digital asset in comparison to a native resolution of an image in the plurality of digital images.

Block 4128. Referring to block 4128, in some embodiments, the plurality of digital images includes a first set of digital images corresponding to a first spectral range. The plurality of digital images further includes a second set of digital images corresponding to a second spectral range different from the first spectral range. For instance, in some embodiments, the first spectral range is within the visible light range of the electromagnetic spectrum and the second spectral range is within the infrared range of the electromagnetic spectrum. However, the present disclosure is not limited thereto.

Block 4130. Referring to block 4130, in some embodiments, the digital asset provides a layered representation of spectral data. The layered representation includes a first layer corresponding to the first spectral range and a second layer corresponding to the second spectral range. Accordingly, in some embodiments, the layered representation allows a user to visualize each respective layer of the layered representation without obscurity from the other layers, such as by only viewing a first layer of the layered representation and then only viewing a second layer of the layered representation. However, the present disclosure is not limited thereto. For instance, in some embodiments, the layered representation provides a visualization of the first layer overlayed on top of the second layer, which allows for visual comparison of the first and second layers. However, the present disclosure is not limited thereto.

Block 4132. Referring to block 4132, in some embodiments, the workflow at the computer-enabled imaging device includes capturing a plurality of digital images of the ROI. Each respective digital image in the plurality of digital images is collectively defined by a plurality of characteristics. Furthermore, the workflow at the computer-enabled imaging device includes determining a characteristic relationship. The characteristic relationship includes a comparison of a baseline instance of a first characteristic in the plurality of characteristics and a first instance of the first characteristic defining, at least in part, a first digital image in the plurality of digital images. The workflow at the computer-enabled imaging device further includes generating the digital asset based, at least in part, on the first digital image. The digital asset includes a degree of change of the first characteristic in accordance with the characteristic relationship. In some embodiments, the degree of change is in accordance with one or more Dicom standards. Moreover, in some embodiments, the target image is the digital asset.

Block 4134. Referring to block 4134 of FIG. 4I, in some embodiments, the baseline instance of the first characteristic is acquired from a remote device. In some embodiments, the remote device is associated with a publicly accessible server associated with the distributed blockchain ledger system 200 and/or the imaging device 300. Accordingly, in some such embodiments, the baseline instance of the first characteristic allows for controlling, at least in part, the capture of the digital asset from the remote demote.

Block 4136. Referring to block 4136, in some embodiments, the baseline instance of the first characteristic is determined, at least in part, based on a corresponding industrial application of the digital asset. For instance, in some embodiments, when capturing the digital asset of the first 3D body, the first characteristic is in accordance with a first set of parameters when based on a first (e.g., cosmetic) application of the digital asset and in accordance with a second set of parameters when based on a second (e.g., security) application of the digital asset. For instance, in some embodiments, the cosmetic application allows for evaluating an ornamental aspect of the first 3D body, whereas the security application allows for evaluating a biometric aspect of the first 3D body. However, the present disclosure is not limited thereto.

Block 4138. Referring to block 4138, in some embodiments, the corresponding industrial application of the digital asset is a pharmaceutical application, a cosmetic application, a surgical application, a security application, an entertainment application, an agricultural application, a fashion or textile application, a consumer application, or a combination thereof. Non-limiting examples include dermatology, cutaneous disease diagnosis, monitoring of disease process, monitoring of treatment effectiveness, lesion detection, lesion change detection, early skin cancer detection, infection detection and diagnosis, telehealth (e.g., patients being imaged or imaging themselves to provide spatially registered spectrally consistent data), wound healing, vascular lesion monitoring, nano treatments, clinical trials (e.g., subject on-site and off-site response monitoring), skin evaluations, skin type, ageing skin, cosmetics, treatment efficacies, acne and/or wrinkle treatment, crime scene forensics, medical examiner office uses, abuse victim images, biometrics, enhancement of facial features by using the LIDAR sensor for high density recognition using new levels of facial metrics and uniqueness, police stops for standardized face-trace, improved accuracies, social features, video game inclusion, adult entertainment industry, agriculture, plant characterization, research, monitoring, fashion, and the like.

Block 4140. Referring to block 4140, in some embodiments, the workflow at the computer-enabled imaging device includes applying, to a cryptographic function, the digital asset and identifying information associated with the ROI. From this, a cryptographic block associated with a cryptographic non-fungible token asset indicative of the first 3D body is generated. Moreover, the workflow at the computer-enabled imaging device includes transmitting, by a communication network, the cryptographic block to one or more cryptographic node devices. From this, the cryptographic block on a distributed blockchain ledger system is recorded.

Figure 14B:
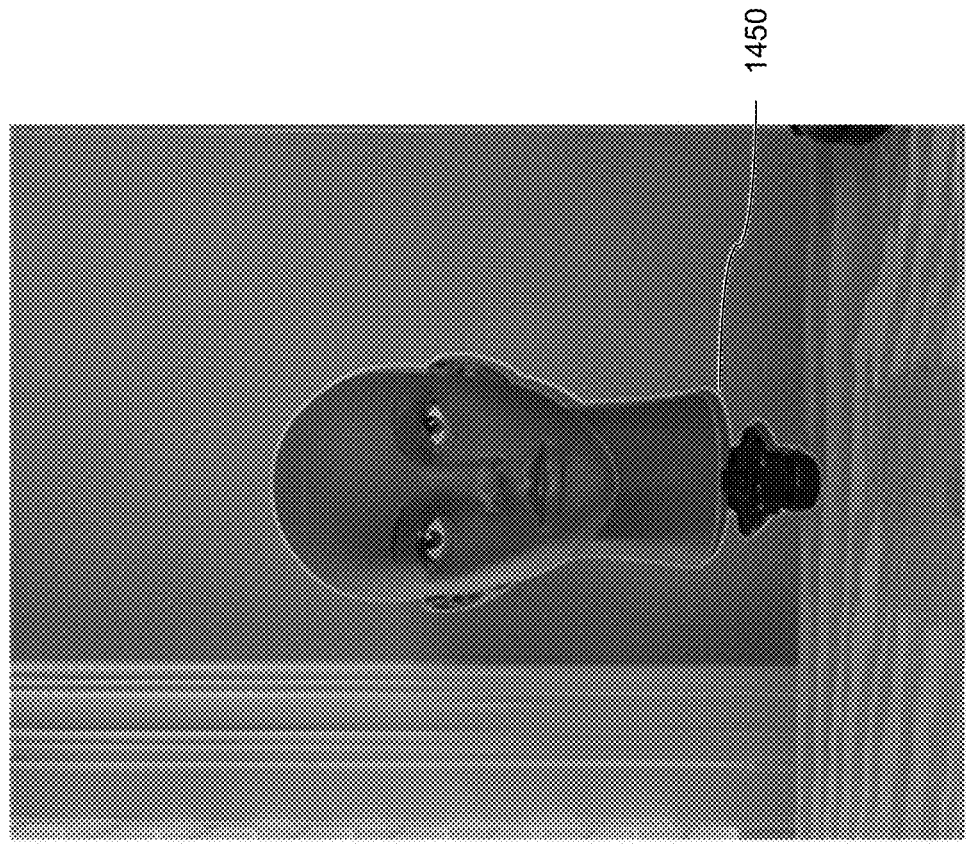
FIGS. 14A and 14B collectively illustrate a series of user interfaces for generating a digital asset that includes a degree of a change of a characteristic in accordance with a characteristic relationship, in accordance with an embodiment of the present disclosure.
Figure 14A:
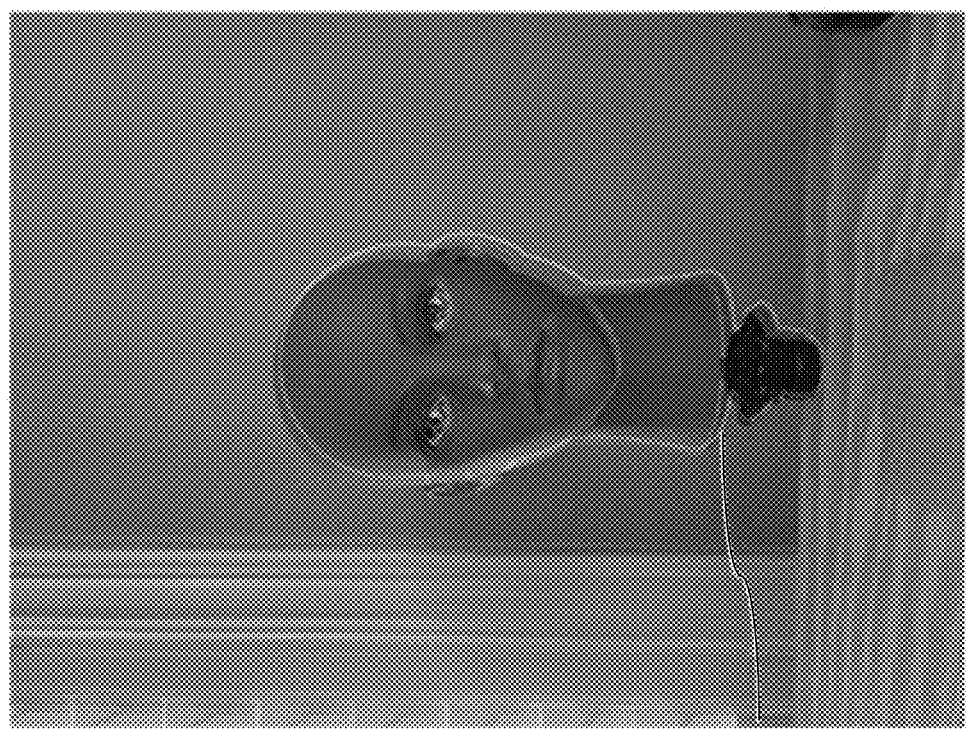

Block 4142. Referring to block 4142, in some embodiments, the workflow for capturing the digital asset includes one or more changes in positioning of the computer-enabled imaging device, one or more changes in positioning of the first 3D body, one or more changes in ambient lighting, or a combination thereof. For instance, referring briefly to FIGS. 14A and 14B, in some embodiments, a first projection 1450 in FIG. 14A illustrates an outline of a second digital image of the first 3D body in compared to a first digital image of the first 3D body, whereas FIG. 14B shows a second projection 1450 of the outline after correction by changing the positioning of the first 3D body within the first digital image, or by generating a third digital image that is a corrected instance of the first digital image. However, the present disclosure is not limited thereto.

Block 4144. Referring to block 4144, in some embodiments, the executing the workflow further includes, in accordance with a determination that a respective boundary condition in the plurality of boundary conditions is not satisfied, ceasing the workflow. In some embodiments, the ceasing of the workflow permanently and/or immediately ends performance of the method 4000. In some embodiments, the ceasing of the temporarily ceases the workflow, such as until approved and/or acknowledged by a user or until the respective boundary condition in the plurality of boundary conditions is satisfied. However, the present disclosure is not limited thereto.

Block 4146. Referring to block 4146, in some embodiments, the method further includes conditioning the executing the workflow in accordance with a determination that a switch mechanism of the computer-enabled imaging device is in a first state. In some embodiments, the first state is a compressed state, such as when the end-user applies a force to a physical or digital switch 290. However, the present disclosure is not limited thereto. In some embodiments, the first state is an engaged stated, in which the end-user is physically interacting with the computer-enabled imaging device.

Storage and/or Evaluation.

Now that methods 4000 for capturing a digital asset have been described in accordance with various embodiments of the present disclosures, details regarding some processes in accordance with FIGS. 5A through 5D will be described. Specifically, FIGS. 5A through 5D illustrate a flow chart of methods (e.g., method 5000) for storing a plurality of NFT assets on a distributed blockchain ledger system, in accordance with embodiments of the present disclosure. In the flow chart, the preferred parts of the methods are shown in solid line boxes whereas optional variants of the methods, or optional equipment used by the methods, are shown in dashed line boxes.

Various modules in the memory 292 of the distributed blockchain ledger system 200 and/or the imaging device 300 perform certain processes of the methods 4000 described in FIGS. 5A though 5D, unless expressly stated otherwise. Furthermore, it will be appreciated that the processes in FIGS. 5A though 5D can be encoded in a single module or any combination of modules.

Block 5002. Referring to block 5002 of FIG. 5A, a method 5000 for storing a plurality of cryptographic non-fungible token assets on a distributed blockchain ledger system 200 is provided by the present disclosure. The distributed blockchain ledger system 200 includes, or contains, a blockchain 250 that is a shared and immutable data structure represented by a sequence of records, or "blocks." The distributed blockchain ledger system 200 maintains an integrity of the block by using one or more specific cryptographic functions 210, such as first cryptographic hash function. In some embodiments, the one or more cryptographic functions includes a set of cryptographic functions. A non-limiting example of a set of cryptographic functions is a set of two, three, four, five, or six hash functions with hash values that include 128, 224, 256, 384, 512, or a combination thereof. However, the present disclosure is not limited thereto.

Block 5004. Referring to block 5004, the method includes applying, to a first cryptographic function, a first digital data set. The first digital data set includes a first digital asset and first identifying information associated with a first subject matter of the first digital asset, which generates a first cryptographic block associated with a first cryptographic non-fungible token (NFT) asset indicative of the first digital data set. In some embodiments, each cryptographic block includes a header and a body. The header includes a block number, hash value of a previous block to maintain integrity of the blockchain 250, a hash of the body of a current block to maintain integrity of identifying information (e.g., procurement request information), an electric address of an origin of a block (e.g., public key of block creator) or a combination thereof and the like. The body of the block includes one or more transactions, such as a request for accesses the NFT asset (e.g., method 6000 of FIG. 6). However, the present disclosure is not limited thereto.

In some embodiments, each NFT asset is a unique object that can neither be divided nor exchanged to create an identical NFT asset. For instance, in some embodiments, each NFT asset is identified by a unique identifier within a blockchain 250 (e.g., within an ERC-721 smart contract), in which the unique identifier is fixed and does not change for the life of the NFT asset. Accordingly, at least the unique identifier with an electric address (e.g., contract address, public key, etc.) associated with an owner of the NFT asset will provide a globally unique and full-qualified identifier for the NFT asset on the blockchain 250. In some embodiments, the generating of the first cryptographic block is said to "mint" the NFT asset. In contrast, a destruction of the NFT asset is said to "burn" the NFT asset.

In some embodiments, the applying the first digital data set to the first cryptographic function is in accordance with the seven-hundred and twenty-first proposal in the Ethereum proposal process (ERC-721), accessible at eips.ethereum.org/EIPS/eip-721, which is hereby incorporated by reference in its entirety.

In some embodiments, the applying the first digital data set to the first cryptographic function is in accordance with the one-thousand and fifty-fifth proposal in the Ethereum propose process (ERC-1155), accessible at eips.ethereum.org/EIPS/eip-1155, which is hereby incorporated by reference in its entirety.

Blocks 5006-5010. Referring to blocks 5006-5010, in some embodiments, the first identifying information includes a spatial identifier of one or more spatial coordinates associated with the first subject matter, a temporal identifier of a time associated with the first subject matter, a spectral identifier of one or more wavelengths of the electromagnetic spectrum, a biometric identifier of one or more biometric measurements associated with the first subject matter, a metadata identifier of one or more metadata of the first identifying information, or a combination thereof. In some embodiments, the one or more spatial coordinates associated with the first subject matter includes a longitude, a latitude, an elevation, or a combination thereof. In some embodiments, the one or more spatial coordinates associated with the first subject matter includes a physical address of the first subject matter. Accordingly, the first identifying information includes spacetime information, such as spatiotemporal textures) that is acquired when capturing the digital asset, which provides relevant statistical information for characterizing the digital asset.

Block 5012. Referring to block 5012, in some embodiments, the first identifying information includes a spatial distance between the first subject matter and a remote device associated with a corresponding capture of the first digital asset, a length of the first subject matter, a characteristic length of the first subject matter, a height of the first subject matter, a width of the first subject matter, a lighting characteristic of the first subject matter, an orientation of the remote device associated with the corresponding capture of the first digital asset, or a combination thereof. For instance, referring briefly to FIG. 18, a plurality of facial feature measures of the digital asset are provided including a size of a centroid of the first subject matter, an allometry of the first subject matter, a profile prominence of the first subject matter, and the like.

Block 5014. Referring to block 5014, in some embodiments, the first identifying information includes one or more of a name of the first subject matter, an age of the first subject matter, a date associated with the first subject matter, a gender of the first subject matter, or a combination thereof. In some embodiments, the first identifying information is provided, at least in part, by the first subject matter, such as by input 280 of node device 220 of FIG. 2. However, the present disclosure is not limited thereto. For instance, in some embodiments, the first identifying information includes one or more notes, one or more quantifiable values (e.g., laboratory values), genomic information of the first subject, and the like.

Blocks 5016-5018. Referring to blocks 5016-5018, in some embodiments, the first identifying information includes a workflow associated with a capture of the first digital asset. In some embodiments, the workflow includes one or more computer-implemented instructions for capturing the first digital asset at a first computer-enabled imaging device. From this, the boundary conditions 624 required to capture the digital asset the NFT is associated with the NFT asset and, therefore, becomes immutable through the NFT. As such, only new information and data can be added to the blockchain 250, which prevents other users from either modifying or removing the identifying information, which greatly improves the level of trust and authenticity of the identifying information and the first digital asset.

Blocks 5020-5022. Referring to blocks 5020-5022, in some embodiments, the first identifying information is provided, at least in part, by the first subject matter. For instance, in some such embodiments, the first subject matter is a human subject who provides the identifying information using inputs of the imaging device. A non-limiting example of identifying information provided by the first subject matter includes a name of the first subject matter, a title of the first digital asset, an age of the first subject matter, a weight of the first subject matter, and the like. In some embodiments, the first identifying information includes an owner of the first cryptographic non-fungible token asset.

Block 5024. Referring to block 5024, in some embodiments, the first digital asset includes one or more digital images, one or more 2D maps, one or more 3D maps, one or more dense point clouds, one or more textured meshes, or a combination thereof. Accordingly, the method 5000 allows for generating the NFT asset indicative of the first digital asset that includes a complex model of a 3D body capture at an imaging device (e.g., method 4000 of FIGS. 4A through 4I).

Block 5026. Referring to block 5026, the method 5000 further includes transmitting, by a communication network, the first cryptographic block to one or more cryptographic node devices associated with the distributed blockchain ledger system. From this, the first cryptographic block is recorded on the distributed blockchain ledger system by the one or more cryptographic node devices, such as upon a consensus authentication and/or verification by the one or more cryptographic node devices. However, the present disclosure is not limited thereto.

Block 5028. Referring to block 5028, in some embodiments, the method further includes, prior to the transmitting the first cryptographic block, validating the first cryptographic block against a set of consensus rules. From this, a determination whether the first cryptographic block satisfies each protocol rule in a set of protocol rules is provided.

Block 5030. Referring to block 5030 the method 5000 includes further applying, to a second cryptographic function, a second digital data set. The second digital data set includes a second digital asset and second identifying information associated with a second subject matter of the second digital asset. Accordingly, a second cryptographic block associated with a second cryptographic non-fungible token asset indicative of the second digital data set is generated.

Block 5032. Referring to block 5032, in some embodiments, the first digital asset and the second digital asset are in a plurality of cryptographic non-fungible token assets. In some embodiments, each cryptographic NFT asset in the plurality of cryptographic NFT assets is published and available for public inspection. Moreover, the plurality of cryptographic non-fungible token assets includes an inimitable cryptographic non-fungible token asset.

Blocks 5034-5038. Referring to blocks 5034-5038, in some embodiments, the method 5000 utilizes one or more cryptographic functions (e.g., first cryptographic function 210-1, second cryptographic function 210-2, . . . , cryptographic function V 210-V of FIG. 2, cryptographic functions 210 of cryptographic function library 428 of FIG. 3, etc.) that defines a protocol for accessing and/or authenticating information disseminated across the blockchain 250 of the distributed blockchain ledger system 200.

In some embodiments, each respective cryptographic function 210 is a cryptographic primitive, which is a secure function that defines all or a portion of the protocol for encrypting and/or decrypting a data set. For instance, in some embodiments, a respective cryptographic function includes a one-way hash function, a symmetric key, a public key, a private key, and the like. Additional details and information regarding cryptographic primitives as a component of a cryptographic function 210 can be found at Blum et al., 1993, "Cryptographic Primitives Based on Hard Learning Problems," Annual International Cryptology Conference, pg. 278; Applebaum et al., 2009, "Fast Cryptographic Primitives and Circular-Secure Encryption Based on Heard Learning Problems," Annual International Cryptology Conference, pg. 595; Shim et al., 2015, "A Survey of Public-Key Cryptographic Primitives in Wireless Sensor Networks," IEEE Communications Surveys & Tutorials, pg. 577; Preneel et al., 1998, "Cryptographic Primitives for Information Authentication—State of the Art," State of the Art in Applied Cryptographic, pg. 49, each of which is hereby incorporated by reference in its entirety.

However, one of skill in the art will appreciate that the present disclosure is not limited thereto. For instance, in some embodiments, a respective cryptographic function 210 is an advanced cryptographic protocol, such as a first protocol that includes multiple cryptographic primitives. As a non-limiting example, in some embodiments, the respective cryptographic function 210 is a zero knowledge (ZK) protocol, which is a satisfiable cryptographic function 210 without a requirement to reveal a property of the cryptographic function 210. By way of example, in some embodiments, the ZK protocol of the respective cryptographic function 210 is scalable, transparent ZK argument of knowledge (ZK-STARK) protocol. Additional details and information regarding the ZK cryptographic functions 210 can be found at Goldreich et al., 1986, "How to prove all NP statements in zero-knowledge and a methodology of cryptographic protocol design," Conference on the Theory and Application of Cryptographic Techniques, print; Goldreich et al., 1994, "Definitions and Properties of Zero-Knowledge Proof Systems," Ben-Sasson et al., 2018, "Scalable, Transparent, and Post-Quantum Secure Computational Integrity," IACR Cryptol. ePrint Arch, pg. 46, each of which is hereby incorporated by reference in its entirety.

As another non-limiting example, in some embodiments, the respective cryptographic function 210 is a homomorphic encryption protocol, which allows for the encryption of information and subsequent processing of the encrypted information (e.g., decryption) at the imaging device 300. Said otherwise, a homomorphic cryptographic function 210 allows for computational analysis (e.g., additional, multiplication, comparisons, etc.) to be performed at the imaging device 300, in which the computation al analysis is conducted on encrypted data without a requirement to decrypt the data at the imaging device 300. Additional details and information regarding a homomorphic cryptographic function 210 can be found at Henry, K., 2008, "The Theory and Applications of Homomorphic Cryptography," Master's Thesis, University of Waterloo, print; Arasu et al., 2013, "Orthogonal Security with Cipherbase," CIDR, print, which is hereby incorporated by reference in its entirety. In this way, the homomorphic cryptographic function 210 allows the systems and methods of the present disclosure to utilize the superior processing power of the collective plurality of imaging devices 300 in order to optimize utilization of a service, as opposed of having to conduct each optimization computation for each respective imaging device 300.

Additional details and information regarding use of suitable cryptographic functions 210 can be found at Schneier, *Applied Cryptography: Protocols, Algorithms, and Source Code in C*, Second Edition, 1996, John Wiley & Sons, Inc.; Ferguson and Schneier, *Practical Cryptography*, 2003, Wiley Publishing Inc., Indianapolis, Indiana; Hershey, *Cryptography Demystified*, 2003, The McGraw-Hill Companies, Inc; Held & Held, *Learn Encryption Techniques with BASIC and C++*, 1999, Wordware Publishing, Inc., Plan Texas; Singh, *The Code Book: The Science and Secrecy from Ancient Egypt to Quantum Cryptography*, 1999, Random House, Inc., New York; Mao, *Modern Cryptography: Theory and Practice*, HP Invent, Palo Alto, California; Menezes et al., *Handbook of Applied Cryptography*, 1996, CRC Press; Kaufman et al., Network Security Private Communication in a Public World, 1995, Prentice-Hall, Inc., Upper Saddle River, New Jersey; and Binstock and Rex, *Practical Algorithms for Programmers*, 1995, Chapter 3, Addison-Wesley, Reading, Massachusetts, each of which is hereby incorporated by reference in its entirety.

Block 5040. Referring to block 5040 of FIG. 5C, in some embodiments, the first subject matter includes a first 3D body at a first spacetime and the second subject matter includes the first 3D body at a second spacetime different from the first spacetime. By way of example, consider a first human subject using a first computer-enabled imaging device 300 to capture a first digital asset of a face of the first human subject on Apr. 1, 2000, and then using a second computer-enabled imaging device to capture a second digital asset of the face on Apr. 1, 2020. In some such embodiments, the first spatial coordinates of the second space time are substantially equal to the second spatial coordinates of the first space time. In this way, the first digital asset and the second digital asset are captured are substantially the same spatial coordinates, which greatly reduces environmental differences between each respective digital asset, such as lighting differences, background differences, and the like. However, the present disclosure is not limited thereto.

Block 5042. Referring to block 5042, in some embodiments, the first subject matter includes a first 3D body at a first spacetime and the second subject matter includes a second 3D body, different from the first 3D body, at a second spacetime different from the first spacetime. By way of example, consider the first human subject using the first computer-enabled imaging device 300 to capture the first digital asset of the face of the first human subject on Apr. 1, 2000, in California and a second human subject using the second computer-enabled imaging device to capture a second digital asset of the face of the second human subject on Apr. 1, 2000, in Germany. Accordingly, the method 5000 allows for consideration (e.g., storage, evaluating, etc.) of distinct 3D bodies and forming one or more associations of based on various identifying information of each 3D body, such as the commonality of faces for the first and second subject matters. However, the present disclosure is not limited thereto.

Block 5044. Referring to block 5044, the method 5000 includes transmitting, by the communication network, the second cryptographic block to the one or more cryptographic node devices. In some embodiments, the one or more cryptographic node devices records the second cryptographic block on the distributed blockchain ledger system, such as on a blockchain 250 upon a consensus or proof-of-work verification of the second cryptographic block. Accordingly, by recording the second cryptographic block on the blockchain 250 of the distributed blockchain ledger system 200, the method 5000 maintains a list (e.g., record of blocks) of the plurality of digital assets and the identifying information associated with each respective digital asset that is linked and protected using the one or more cryptographic functions. From this, the second digital asset and identifying information become immutable (e.g., once the second block is configured by a consensus protocol by one or more node devices).

Block 5046. Referring to block 5046, in some embodiments, the method further includes receiving, in electronic from, from the one or more node devices (e.g., node devices 220 of FIG. 2), a blockchain data set. Receiving the blockchain data set in electronic form is particularly useful for both scientific evaluations and industrial application evaluations since the blockchain data set includes on-chain data (e.g., data held by the blockchain 250, as opposed to a local memory 392 of a client device 300 of FIG. 3). The blockchain data set includes the first cryptographic block and the second cryptographic block. Accordingly, the plurality of cryptographic non-fungible token assets is stored on the distributed blockchain ledger system.

Block 5048. Referring to block 5048, in some embodiments, the receiving the blockchain data set is responsive to a procurement transaction request for the blockchain data set. For instance, in some embodiments, the request includes a transaction identifier of a procurement transaction that was executed by a client application of an imaging device. In some embodiments, the request includes shared data further including s an AMEX transaction identifier (Transaction ID that AMEX assigns to each transaction), an amount (an amount of the transaction), an authorization code (a code returned by the credit card processor when a transaction is approved), an AVS street match (result of an AVS check for street number and name), an AVS zip code match (result of the AVS check for zip code), a settlement batch number (e.g., a first value means the transaction has not been settled and any other value indicated the transaction has settled), a billing address (a street address submitted with a transaction), a card security code match, a client IP address (an IP address of the Web server to which the transaction was submitted), a credit card expiration date, a customer code, a description of a procured item, a discount amount (any discount applied to the transaction), a quantity, a shipping address, a shipping method, a shipping phone number, a tax amount, a tax rate, a tender type (e.g., type of credit card used for the transaction), a time stamp (a date and time that the transaction occurred), or a universal pricing code (a string describing the products for a line item in a transaction) or a combination thereof for the procurement transaction. However, the present disclosure is not limited thereto.

Block 5050. Referring to block 5050, in some embodiments, the method further includes evaluating, by one or more computational models, the blockchain data set. This evaluating the blockchain data set forms a third digital data set different from the first digital data set and the second digital data set. In some embodiments, since a raw blockchain data is a massive data set that requires significant computational resources to process, the evaluating the blockchain set includes evaluating one or more types of blockchain data sets including a first block transaction blockchain data set (e.g., block heaters including a block producer, a timestamp of block creation, a transaction root, etc.), a second transfer action blockchain data set (e.g., a receipt of an external transaction from the blockchain 250), a third contact information (e.g., owner and/or operator) blockchain data set, a fourth smart contract invocation blockchain dataset, a fifth identifying information data set, or a combination thereof.

Block 5052. Referring to block 5052, in some embodiments, the third digital data set includes a transdiagnostic factor derived, by the one or more computational models, from the first identifying information and the second identifying information. The transdiagnostic factor includes a mechanism that is present across both the first identifying information and the second identifying information which is associated with a condition, such as a risk factor of the condition and/or a maintaining factor of the condition. However, the present disclosure is not limited thereto. For instance, in some embodiments, the first identifying information and the second identifying information each include a respective clinical data that includes information about the subject matter that is obtained from a medical practitioner associated with the subject matter, such as a clinical assessment. Accordingly, in some embodiments, the transdiagnostic factor is derived by evaluating the respective clinical data against the plurality of images obtained when capturing the digital asset (e.g., method 4000 of FIGS. 4A through 4I).

Blocks 5054-5056. Referring to blocks 5054-5056, in some embodiments, the third digital data set includes a third digital asset associated with the first subject matter and the second subject matter. In some embodiments, the third digital asset includes a monolithic 3D body including the first subject matter and the second subject matter. As a non-limiting example, in some embodiments, the first subject matter is a first 3D sub-body of a first 3D body, the second subject matter is a second 3D sub-body of the first 3D body, and a third subject matter of the third digital asset is the monolithic first 3D body consisting of the 3D first sub-body and the second 3D sub-body. In some embodiments, the third digital asset includes one or more digital images, such that the third digital asset augments a plurality of digital images of the first digital asset and/or the second digital asset. For instance, in some embodiments, the one or more digital images includes a first digital image that is stitched from a second digital image of the first subject matter and a third digital image of the second subject matter. However, the present disclosure is not limited thereto. For instance, in some embodiments, the third digital asset includes one or more two-dimensional (2D) maps, one or more 3D maps, one or more dense point clouds, one or more textured meshes, or a combination thereof. In some such embodiments, the one or more two-dimensional (2D) maps, the one or more 3D maps, the one or more dense point clouds, the one or more textured meshes, or the combination thereof is based on an evaluation by the one or more computational models to determine an adequate feature space for one or more geospatial features of the first subject matter and the second subject matter, in which the first subject matter and the second subject matter are one or more two-dimensional (2D) maps, one or more 3D maps, one or more dense point clouds, one or more textured meshes, or the combination thereof. Accordingly, in some embodiments, the first subject matter and the second subject matter are geospatial digital twins, in which the third digital asset improves a uniform representation, a discrete representation, an irregularity, an ambiguity, a per-point attribute, a massiveness, or a combination thereof of the first and/or second digital asset. For instance, in some embodiments, the third digital asset is formed by localizing one or more features of the first and second subject matters along their associated pixel masks. However, the present disclosure is not limited thereto. As yet another non-limiting example, in some embodiments, if 3D point clouds (e.g., a first digital asset of a first 3D point cloud and a second digital asset of a second 3D point cloud) are captured or generated at different points in time having overlapped geospatial regions (e.g., substantially the same 3D body), these first and second digital assets are inherently related. Accordingly, by the third digital asset forms a 3D point cloud series taken at different points in time for a common geospatial region. Said otherwise, the third digital asset represents a 4D point cloud.

Referring briefly to FIG. 17, in some embodiments, the method 5000 evaluates a plurality of digital data sets, such as a first digital data set and a second digital data set obtained from a blockchain data set. This evaluation is performed by the one or more computational models, which product a new asset, such as the third digital data set. For instance, in some embodiments, the plurality of digital data sets includes each digital data set associated with a particular feature or characteristic of the identifying information of a corresponding digital asset. As a non-limiting example, in some embodiments, the particular feature or characteristic is a particular 3D body type (e.g., hands, fingers, benign tumors, etc.), a particular geographic condition (e.g., located within a particular geographical region, such as a state, a country, a longitude, a latitude, etc.), or the like. Accordingly, the third digital set is a resultant data set provided by the one or more computational models indicative of a respective feature within the plurality of digital data sets. However, the present disclosure is not limited thereto. In some embodiments, the plurality of digital data sets include the first digital data set that is captured by an end-user at a computer-enabled imaging device (e.g., method 4000 of FIGS. 4A through 4I), such that the first digital data set includes a first digital asset associated with a first 3D body of the end-user (e.g., the face of the end-user at a first point in spacetime). In some embodiments, this first digital data set includes a second digital asset associated with the first 3D body of the end-user (e.g., the face of the end-user at a second point in spacetime).

As such, the first digital data set includes one or more time-variant 3D digital assets. The method 5000 evaluates the plurality of digital data sets by utilizing the raw data that is the underlying digital assets (e.g., as recorded onto blockchain 250 of distributed ledger system 200 of FIG. 1) and identifying information. In some embodiments, the second digital data set includes a training data set, such as a data set including each digital asset with similar identifying information properties. For instance, consider the training data set that includes a plurality of feature vector definitions (e.g., as provided by an end-user) that enable a respective computational model to predicted label feature types, in which the predicted labels form a third digital data set when applied to one or more input digital data sets (e.g., the first digital data set). As a non-limiting example, consider a first digital data set that includes each digital asset in a plurality of digital assets having identifying information that is indicative of a first population distribution (e.g., a first geographic population of 3D bodies that include hand subject matter in California) and a second digital data set that includes each digital asset in the plurality of digital assets having identifying information that is indicative of a second population distribution (e.g., a second geographic population of 3D bodies that includes hand subject matter in Florida), which collectively form a plurality of time-variant 3D digital assets. This first and second digital data sets together with a training data set that includes the plurality of digital assets are applied to the one or more computational models, such as a convolutional neural network. This convolutional neural network computational network then describes these inputted digital data sets using a plurality of feature vector (e.g., planarity, linearity, scatter, surface variance, vertical depth, point color, entropy, variance, etc.), which allows the convolutional neural network computational model to extract a set of features (e.g., extracted features) based on a high-dimensionality vector space from the first and second digital data sets. From this extracting, the convolutional neural network computational model products a new digital data set, such as a third digital data set having reduced dimensionality in comparison to the first and/or second digital data sets.

Blocks 5058-5068. Referring to block 5058 of FIG. 5C to block 5068 of FIG. 5D, in some embodiments, the one or more computational models for forming the third digital asset includes one or more supervised models, one or more unsupervised models, one or more semi-supervised models, or a combination thereof. As a non-limiting example, consider the one or more unsupervised models provide descriptive evaluations to gain knowledge from a data set, predictive evaluations to determine predictions about a future event, prescriptive evaluations to determine courses of actions, or a combination thereof, which is used when forming the third digital asset. As another non-limiting example, consider that, when the digital asset includes the point cloud, the digital asset, either individually or collectively with the plurality of digital assets, provides a significant amount of data for use in defining a data structure semantic with a training data set for use with the one or more computational models configured to determine the required semantics. As yet another non-limiting example, consider that, when the digital asset includes the point cloud, an inherent fuzziness and noise of the point cloud is compensated by the one or more computational models. In some embodiments, the one or more computational models for forming the third digital asset includes one or more supervised models, one or more unsupervised models, one or more semi-supervised models, or a combination thereof. In some embodiments, the one or more supervised models includes a decision tree model, a rule based model, a support vector machine model, a neural network model, a probabilistic model, or a combination thereof. In some embodiments, the neural network includes a convolutional neural network or a generative adversarial neural network. In some embodiments, the support vector machine model includes a Lagrangian parametric model. In some embodiments, the probabilistic model includes a Naïve Bayes model, Bayesian model, max entropy model, or Poisson distribution model. In some embodiments, the decision tree model includes one or more pre-pruning instructions, one or more post-pruning instructions, one or more gain instructions, or a combination thereof. Accordingly, in some such embodiments, the method 5000 allows for forming the third digital asset by combining one or more 3D bodies and/or digital assets into a new 3D body for the third digital asset. For instance, in some embodiments, a respective computational model is utilized for classification of a respective point of a point cloud digital asset, such as in accordance with a predetermined point category (e.g., eye feature, nose feature, hair feature, vegetation feature, building feature, etc.). In some embodiments, the respective computational model is utilized for segmentation of the point cloud, such as by identifying a plurality of edges, a plurality of faces or surfaces (e.g., planar facets), a plurality of vertices, or a combination thereof. As a non-limiting example, consider using the neural network computational model to segment local geometric structures of the point cloud by constructing a local neighborhood graph and applying convolutional operations on the plurality of edges that interconnect each neighboring pairs of points in the point cloud. In some embodiments, the respective computational model is utilized to recognize shapes using a combined 2D-3D approach. This combined 2D-3D approach generates a plurality of 2D renderings (e.g., 2D CAD models) from the 3D point cloud that is then evaluated by an image analysis computational model. As a non-limiting example, consider using a convolutional neural network to combine information from multiple views of the 3D body into a one shape, which provides better recognition performance. However, the present disclosure is not limited thereto.

Block 5070. Referring to block 5070, in some embodiments, the method further includes further applying, to a third cryptographic function, the third digital data set. The third digital data set includes third identifying information associated with a third subject matter of the third digital asset. This applying the third digital data set generates a third cryptographic block associated with a third cryptographic non-fungible token asset indicative of the third digital data set. The method further includes transmitting, by the communication network, the third cryptographic block to the one or more cryptographic node devices. This transmitting the third cryptographic block records the third cryptographic block on the distributed blockchain ledger system.

Accordingly, the method 5000 allows for evaluating a plurality of digital assets (e.g., the first digital asset 1350-1 and the second digital asset 1350-2) in order to generate a third digital asset 1350-3 that provides unique identifying information in comparison to the first digital asset and the second digital asset. Moreover, the method 5000 facilitates storing the plurality of digital assets (e.g., in the form of the plurality of NFT assets indicative of the plurality of digital assets) and allowing feature specific analysis (e.g., includes at least one of functional imaging digital data, other imaging digital data, physiological digital data (e.g., one or more measurements from a respective sensor in the one or more sensors of the computer-enabled imaging device of a conductive response of the 3D body, a temperature, etc.), clinical digital data, genetic digital data (e.g., data elements associated with genetic influences on gene expression, such as allelic variants or single nucleotide polymorphism to identifying imaging endophenotypes associated with clinical features), and the like) selected by an end-user of client device. Furthermore, the method 5000 allows for the storage and/or evaluating of the plurality of digital assets such that an end-user can utilize the method with speed and flexibility to distribute, track, organize, and manage each respective digital asset.

In some embodiments, the first digital asset and/or the second digital asset is a digital asset captured by a method 4000 of FIGS. 4A through 4I. In some embodiments, the first subject matter is a first 3D body of the method 4000 of FIGS. 4A through 4I. In some embodiments, the first cryptographic non-fungible token asset is a cryptographic asset of the method 4000 of FIGS. 4A through 4I. In some embodiments, a respective cryptographic node device in the one or more cryptographic node devices is a remote device and/or an imaging device of the method 4000 of FIGS. 4A through 4I. In some embodiments, a model is a model of the method 4000 of FIGS. 4A through 4I.

In some embodiments, the first digital asset and/or the second digital asset is a digital asset of a method 6000 of FIG. 6. In some embodiments, the first subject matter is a subject of the 6000 of FIG. 6. In some embodiments, the first cryptographic non-fungible token asset is a cryptographic non-fungible token asset of the method 5000 of 6000 of FIG. 6. In some embodiments, a respective cryptographic node device in the one or more cryptographic node devices is a cryptographic node device of the method 6000 of FIG. 6. In some embodiments, a model is a model of the method 6000 of FIG. 6.

Cryptographic Assets.

Now that methods 5000 for storing a plurality of NFT assets on a distributed blockchain ledger system have been described in accordance with various embodiments of the present disclosures, details regarding some processes in accordance with FIG. 6 will be described. Specifically, FIG. 6 illustrates a flow chart of methods (e.g., method 6000) for allowing access to a NFT on a distributed blockchain ledger system, in accordance with embodiments of the present disclosure. In the flow chart, the preferred parts of the methods are shown in solid line boxes whereas optional variants of the methods, or optional equipment used by the methods, are shown in dashed line boxes.

Various modules in the memory 292 of the distributed blockchain ledger system 200 and/or the imaging device 300 perform certain processes of the methods 4000 described in FIG. 6, unless expressly stated otherwise. Furthermore, it will be appreciated that the processes in FIG. 6 can be encoded in a single module or any combination of modules.

Block 6002. Referring to block 6002 of FIG. 6, a method 6000 allows access to a cryptographic non-fungible token (NFT) asset on a distributed blockchain ledger system 200. In some embodiments, the access to the cryptographic NFT asset is configured to modify ownership of the cryptographic NFT asset.

In some embodiments, access to the NFT asset is provided through a transaction message transmitted through a communication network (e.g., communication network 106 of FIG. 1) from an imaging device 300 to a node device 220. The transaction message includes a transaction identifier and a digital signature. In some embodiments, the transaction identifier includes a blockchain token value, an electronic address of a recipient, and, in some embodiments, an ownership history of the NFT asset (e.g., a record of previous blockchain token ownership used by the blockchain 250 to verify proper chain of title of the NFT asset). In some embodiments, the electronic address is based on one or more cryptographic functions, such as a public-key cryptography function. The public-key cryptography function requires two separate keys, one of which is secret (e.g., a private key) and one of that is public (e.g., a public key). The public key is used to encrypt plaintext (e.g., for creating an address for receiving a blockchain token) and for verifying a digital signature. The private key is used to decrypt cipher text, to create a digital signature, and to secure blockchain tokens. Public keys are freely shared among node devices 220 in the distributed blockchain ledger system, for example by broadcasting one or more key-exchange messages. In some embodiments, the transaction message is digitally signed by the private key of the request to authenticate the identity of the requestor to the node devices.

Blocks 6004-6006. Referring to blocks 6004-6006, the method 6000 includes receiving, by a communication network, from a remote device, a request to obtain the cryptographic non-fungible token asset. For instance, in some embodiments, the request is a procurement transaction request for the cryptographic non-fungible token asset. However, the present disclosure is not limited thereto.

In some embodiments, the request is a request to access a portion of a digital asset the NFT is indicative of. For instance, in some embodiments, an owner of the NFT and/or a subject wanting to request access to the NFT (e.g., purchase, license, research, etc.) communicates a request to breed their NFT asset with another digital asset or NFT asset to create digital or NFT asset offspring. In some embodiments, the owner or the subject initiates a smart contract with the other to complete the request. Each smart contract enables a first party and a second party that are participants in the decentralized blockchain ledger system 200 to conduct fair exchanges for the NFT asset without a trusted third party. In some embodiments, the owner and/or the subject fund the smart contract with currency or blockchain tokens (e.g., to pay for the transfer "gas" fee, a licensing fee, etc.). In some embodiments, once both parties agree to the smart contract, the owner and/or the subject initiates transfer of access to the subject of a sub-body of the digital asset that is the NFT asset offspring. However, the present disclosure is not limited thereto.

Block 6008. Referring to block 6008, the method 6000 includes determining whether the request satisfies one or more restriction conditions associated with accessing the cryptographic non-fungible token asset. In some embodiments, the one or more restriction conditions include a first restriction defined by a creator of the digital asset. In some embodiments, the one or more restriction conditions include a second restriction defined by an owner of the digital asset. In some embodiments, the one or more restriction conditions include a third restriction defined by a creator of the NFT asset. In some embodiments, the one or more restriction conditions include a fourth restriction defined by an owner of the NFT asset. In some embodiments, the one or more restriction conditions include a fifth restriction defined by an administrator or consensus of the blockchain 250. However, the present disclosure is not limited thereto.

In some embodiments, the one or more restriction conditions includes initiating a market exchange of one or more cryptographic assets (e.g., blockchain tokens in a virtual wallet) for purchasing the NFT asset at a purchase price (e.g., 10 satoshi). In some embodiments, the restriction condition determines, via a two-phase commit, whether the virtual wallet has a sufficient quantity of blockchain tokens to access the NFT assets at the purchase price.

Block 6010. Referring to block 6010, the method 6000 includes applying, in accordance with a determination that each restriction condition in the one or more restriction conditions is satisfied, to a cryptographic function, a digital data set. The digital data set includes identifying information associated with cryptographic non-fungible token asset. This applying the digital data set generates a third cryptographic block associated with the cryptographic non-fungible token asset. In some embodiments, the identifying information includes space, time, spectra, metainformation, or a combination thereof acquired when capturing the digital asset and/or generating the NFT, which allows for preservation of information, Block 6012. Referring to block 6012, in some embodiments, the identifying information includes a monetary value of the cryptographic non-fungible token asset, spatial information associated with the cryptographic non-fungible token asset, temporal information associated with the cryptographic non-fungible token asset, spectral information associated with the cryptographic non-fungible token asset, or a combination thereof.

In some embodiments, the identifying information includes a blockchain address that is represented by or derived from a public key corresponding to a private key using on one or more cryptographic functions 210. The public key is used and/or derived to obtain the blockchain address, in which said address includes a specific balance of blockchain tokens held therein.

Block 6014. Referring to block 6014, in some embodiments, the one or more restriction conditions includes one or more transfer restrictions, one or more reading restrictions, one or more writing restrictions, one or more copying restrictions, one or more recovery restrictions, or a combination thereof. In some embodiments, the one or more transfer restrictions place a threshold condition on changing ownership of the cryptographic non-fungible token asset and/or communicating a private key and/or a public key associated with the cryptographic non-fungible token asset. However, the present disclosure is not limited thereto.

Block 6016. Referring to block 6016, the method 6000 includes transmitting, by the communication network, the cryptographic block to one or more cryptographic node devices. This transmitting the cryptographic block records the cryptographic block on the distributed blockchain ledger system and allows access to the cryptographic non-fungible token asset at the remote device.

Accordingly, by allowing access to the NFT asset, the method 6000 provides tradeable, transactable, and/or donatable cryptographic assets indicative of digital assets, such as a digital captured from a real-world 3D body. In some embodiments, the method 6000 allows for providing access to some or all of the digital asset using the NFT asset, such as a partial body part map NFT asset indicative of a full body map digital asset. Moreover, in some embodiments, the method 600 provides access by changing ownership of the NFT that is preserved, tracked, or multiplied with authorization of the procurement transaction.

In some embodiments, the method 4000 of FIGS. 4A through 4I, the method 5000 of FIGS. 5A through 5D, the method 6000 of FIG. 6, or a combination thereof is performed with one or more models of a plurality of models of the mobile imaging device (e.g., workflow generator 630 of FIG. 2). For instance, in some embodiments, a first model is configured to acquire a corresponding value for each boundary condition in the first plurality of boundary conditions, a second model is configured to fire the one or more light sources 710, and a third model is configured to determine if a corresponding value for each condition in the second plurality of conditions is satisfied. By using the plurality of classifiers, the systems and methods of the present disclosure provide for a more robust firing of the one or more light sources 710, while ensuring the safety of a subject nearby. In some embodiments, each respective model produces a result in the plurality of model results that identifies a respective node of the plurality of nodes that best matches with a subset of data elements with a corresponding determination in a plurality of determinations in accordance with a corresponding model in the plurality of models. Said otherwise, in some embodiments, the model is implemented as an artificial intelligence engine.

In some embodiments, a model is supervised machine learning. Nonlimiting examples of supervised learning algorithms include, but are not limited to, logistic regression, neural networks, support vector machines, Naive Bayes algorithms, nearest neighbor algorithms, random forest algorithms, decision tree algorithms, boosted trees algorithms, multinomial logistic regression algorithms, linear models, linear regression, GradientBoosting, mixture models, hidden Markov models, Gaussian NB algorithms, linear discriminant analysis, or any combinations thereof. In some embodiments, a model is a multinomial classifier algorithm. In some embodiments, a model is a 2-stage stochastic gradient descent (SGD) model. In some embodiments, a model is a deep neural network (e.g., a deep-and-wide sample-level classifier).

Neural networks. In some embodiments, the model is a neural network (e.g., a convolutional neural network and/or a residual neural network). Neural network algorithms, also known as artificial neural networks (ANNs), include convolutional and/or residual neural network algorithms (deep learning algorithms). Neural networks can be machine learning algorithms that may be trained to map an input data set to an output data set, where the neural network includes an interconnected group of nodes organized into multiple layers of nodes. For example, the neural network architecture may include at least an input layer, one or more hidden layers, and an output layer. The neural network may include any total number of layers, and any number of hidden layers, where the hidden layers function as trainable feature extractors that allow mapping of a set of input data to an output value or set of output values. As used herein, a deep learning algorithm (DNN) can be a neural network comprising a plurality of hidden layers, e.g., two or more hidden layers. Each layer of the neural network can include a number of nodes (or "neurons"). A node can receive input that comes either directly from the input data or the output of nodes in previous layers, and perform a specific operation, e.g., a summation operation. In some embodiments, a connection from an input to a node is associated with a parameter (e.g., a weight and/or weighting factor). In some embodiments, the node may sum up the products of all pairs of inputs, $x_i$, and their associated parameters. In some embodiments, the weighted sum is offset with a bias, b. In some embodiments, the output of a node or neuron may be gated using a threshold or activation function, f, which may be a linear or non-linear function. The activation function may be, for example, a rectified linear unit (ReLU) activation function, a Leaky ReLU activation function, or other function such as a saturating hyperbolic tangent, identity, binary step, logistic, arcTan, softsign, parametric rectified linear unit, exponential linear unit, softPlus, bent identity, softExponential, Sinusoid, Sine, Gaussian, or sigmoid function, or any combination thereof.

The weighting factors, bias values, and threshold values, or other computational parameters of the neural network, may be "taught" or "learned" in a training phase using one or more sets of training data. For example, the parameters may be trained using the input data from a training data set and a gradient descent or backward propagation method so that the output value(s) that the ANN computes are consistent with the examples included in the training data set. The parameters may be obtained from a back propagation neural network training process.

Any of a variety of neural networks may be suitable for use in performing the methods disclosed herein. Examples can include, but are not limited to, feedforward neural networks, radial basis function networks, recurrent neural networks, residual neural networks, convolutional neural networks, residual convolutional neural networks, and the like, or any combination thereof. In some embodiments, the machine learning makes use of a pre-trained and/or transfer-learned ANN or deep learning architecture. Convolutional and/or residual neural networks can be used for analyzing an image of a subject in accordance with the present disclosure.

For instance, a deep neural network model includes an input layer, a plurality of individually parameterized (e.g., weighted) convolutional layers, and an output scorer. The parameters (e.g., weights) of each of the convolutional layers as well as the input layer contribute to the plurality of parameters (e.g., weights) associated with the deep neural network model. In some embodiments, at least 100 parameters, at least 1000 parameters, at least 2000 parameters or at least 5000 parameters are associated with the deep neural network model. As such, deep neural network models require a computer to be used because they cannot be mentally solved. In other words, given an input to the model, the model output needs to be determined using a computer rather than mentally in such embodiments. See, for example, Krizhevsky et al., 2012, "Imagenet classification with deep convolutional neural networks," in *Advances in Neural Information Processing Systems* 2, Pereira, Burges, Bottou, Weinberger, eds., pp. 1097-1105, Curran Associates, Inc.; Zeiler, 2012 "ADADELTA: an adaptive learning rate method," CoRR, vol. abs/1212.5701; and Rumelhart et al., 1988, "Neurocomputing: Foundations of research," ch. Learning Representations by Back-propagating Errors, pp. 696-699, Cambridge, MA, USA: MIT Press, each of which is hereby incorporated by reference in its entirety for all purposes.

Neural network algorithms, including convolutional neural network algorithms, suitable for use as models are disclosed in, for example, Vincent et al., 2010, "Stacked denoising autoencoders: Learning useful representations in a deep network with a local denoising criterion," J Mach Learn Res 11, pp. 3371-3408; Larochelle et al., 2009, "Exploring strategies for training deep neural networks," J Mach Learn Res 10, pp. 1-40; and Hassoun, 1995, Fundamentals of Artificial Neural Networks, Massachusetts Institute of Technology, each of which is hereby incorporated by reference. Additional example neural networks suitable for use as models are disclosed in Duda et al., 2001, *Pattern Classification,* Second Edition, John Wiley & Sons, Inc., New York; and Hastie et al., 2001, *The Elements of Statistical Learning,* Springer-Verlag, New York, each of which is hereby incorporated by reference in its entirety for all purposes. Additional example neural networks suitable for use as models are also described in Draghici, 2003, *Data*

*Analysis Tools for DNA Microarrays*, Chapman & Hall/CRC; and Mount, 2001, *Bioinformatics: sequence and genome analysis*, Cold Spring Harbor Laboratory Press, Cold Spring Harbor, New York, each of which is hereby incorporated by reference in its entirety for all purposes.

Support vector machines. In some embodiments, the model is a support vector machine (SVM). SVM algorithms suitable for use as models are described in, for example, Cristianini and Shawe-Taylor, 2000, "An Introduction to Support Vector Machines," Cambridge University Press, Cambridge; Boser et al., 1992, "A training algorithm for optimal margin classifiers," in Proceedings of the 5th Annual ACM Workshop on Computational Learning Theory, ACM Press, Pittsburgh, Pa., pp. 142-152; Vapnik, 1998, Statistical Learning Theory, Wiley, New York; Mount, 2001, Bioinformatics: sequence and genome analysis, Cold Spring Harbor Laboratory Press, Cold Spring Harbor, N.Y.; Duda, Pattern Classification, Second Edition, 2001, John Wiley & Sons, Inc., pp. 259, 262-265; and Hastie, 2001, The Elements of Statistical Learning, Springer, New York; and Furey et al., 2000, Bioinformatics 16, 906-914, each of which is hereby incorporated by reference in its entirety for all purposes. When used for classification, SVMs separate a given set of binary labeled data with a hyper-plane that is maximally distant from the labeled data. For cases in which no linear separation is possible, SVMs can work in combination with the technique of 'kernels', which automatically realizes a non-linear mapping to a feature space. The hyper-plane found by the SVM in feature space can correspond to a non-linear decision boundary in the input space. In some embodiments, the plurality of parameters (e.g., weights) associated with the SVM define the hyper-plane. In some embodiments, the hyper-plane is defined by at least 10, at least 20, at least 50, or at least 100 parameters and the SVM model requires a computer to calculate because it cannot be mentally solved.

Naïve Bayes algorithms. In some embodiments, the model is a Naive Bayes algorithm. Naïve Bayes classifiers suitable for use as models are disclosed, for example, in Ng et al., 2002, "On discriminative vs. generative classifiers: A comparison of logistic regression and naive Bayes," Advances in Neural Information Processing Systems, 14, which is hereby incorporated by reference in its entirety for all purposes. A Naive Bayes classifier is any classifier in a family of "probabilistic classifiers" based on applying Bayes' theorem with strong (naïve) independence assumptions between the features. In some embodiments, they are coupled with Kernel density estimation. See, for example, Hastie et al., 2001, *The elements of statistical learning: data mining, inference, and prediction*, eds. Tibshirani and Friedman, Springer, N.Y., which is hereby incorporated by reference in its entirety for all purposes.

Nearest neighbor algorithms. In some embodiments, a model is a nearest neighbor algorithm. Nearest neighbor models can be memory-based and include no model to be fit. For nearest neighbors, given a query point $x_0$ (a first image), the k training points $x_{(r)}$, r, ..., k (here the training images) closest in distance to $x_0$ are identified and then the point $x_0$ is classified using the k nearest neighbors. In some embodiments, the distance to these neighbors is a function of the values of a discriminating set. In some embodiments, Euclidean distance in feature space is used to determine distance as $d_{(i)} = \|x_{(i)} - x_{(o)}\|$. In some embodiments, when the nearest neighbor algorithm is used, the value data used to compute the linear discriminant is standardized to have mean zero and variance 1. The nearest neighbor rule can be refined to address issues of unequal class priors, differential misclassification costs, and feature selection. Many of these refinements involve some form of weighted voting for the neighbors. For more information on nearest neighbor analysis, see Duda, *Pattern Classification*, Second Edition, 2001, John Wiley & Sons, Inc; and Hastie, 2001, The Elements of Statistical Learning, Springer, New York, each of which is hereby incorporated by reference in its entirety for all purposes.

A k-nearest neighbor model is a non-parametric machine learning method in which the input consists of the k closest training examples in feature space. The output is a class membership. An object is classified by a plurality vote of its neighbors, with the object being assigned to the class most common among its k nearest neighbors (k is a positive integer, typically small). If k=1, then the object is simply assigned to the class of that single nearest neighbor. See, Duda et al., 2001, *Pattern Classification*, Second Edition, John Wiley & Sons, which is hereby incorporated by reference in its entirety for all purposes. In some embodiments, the number of distance calculations needed to solve the k-nearest neighbor model is such that a computer is used to solve the model for a given input because it cannot be mentally performed.

Random forest, decision tree, and boosted tree algorithms. In some embodiments, the model is a decision tree. Decision trees suitable for use as models are described generally by Duda, 2001, Pattern Classification, John Wiley & Sons, Inc., New York, pp. 395-396, which is hereby incorporated by reference. Tree-based methods partition the feature space into a set of rectangles, and then fit a model (like a constant) in each one. In some embodiments, the decision tree is random forest regression. One specific algorithm that can be used is a classification and regression tree (CART). Other specific decision tree algorithms include, but are not limited to, ID3, C4.5, MART, and Random Forests. CART, ID3, and C4.5 are described in Duda, 2001, Pattern Classification, John Wiley & Sons, Inc., New York, pp. 396-408 and pp. 411-412, which is hereby incorporated by reference in its entirety for all purposes. CART, MART, and C4.5 are described in Hastie et al., 2001, The Elements of Statistical Learning, Springer-Verlag, New York, Chapter 9, which is hereby incorporated by reference in its entirety for all purposes. Random Forests are described in Breiman, 1999, "Random Forests—Random Features," Technical Report 567, Statistics Department, U.C. Berkeley, September 1999, which is hereby incorporated by reference in its entirety for all purposes. In some embodiments, the decision tree model includes at least 10, at least 20, at least 50, or at least 100 parameters (e.g., weights and/or decisions) and requires a computer to calculate because it cannot be mentally solved.

Regression. In some embodiments, the model uses a regression algorithm. A regression algorithm can be any type of regression. For example, in some embodiments, the regression algorithm is logistic regression. In some embodiments, the regression algorithm is logistic regression with lasso, L2 or elastic net regularization. In some embodiments, those extracted features that have a corresponding regression coefficient that fails to satisfy a threshold value are pruned (removed from) consideration. In some embodiments, a generalization of the logistic regression model that handles multicategory responses is used as the model. Logistic regression algorithms are disclosed in Agresti, An Introduction to Categorical Data Analysis, 1996, Chapter 5, pp. 103-144, John Wiley & Son, New York, which is hereby incorporated by reference in its entirety for all purposes. In some embodiments, the model makes use of a regression model disclosed in Hastie et al., 2001, *The Elements of*

*Statistical Learning*, Springer-Verlag, New York. In some embodiments, the logistic regression model includes at least 10, at least 20, at least 50, at least 100, or at least 1000 parameters (e.g., weights) and requires a computer to calculate because it cannot be mentally solved.

Linear discriminant analysis algorithms. Linear discriminant analysis (LDA), normal discriminant analysis (NDA), or discriminant function analysis can be a generalization of Fisher's linear discriminant, a method used in statistics, pattern recognition, and machine learning to find a linear combination of features that characterizes or separates two or more classes of objects or events. The resulting combination can be used as the model (e.g., a linear classifier) in some embodiments of the present disclosure.

Mixture model and Hidden Markov model. In some embodiments, the model is a mixture model, such as that described in McLachlan et al., Bioinformatics 18(3):413-422, 2002. In some embodiments, in particular, those embodiments including a temporal component, the model is a hidden Markov model such as described by Schliep et al., 2003, Bioinformatics 19(1):i255-i263.

Clustering. In some embodiments, the model is an unsupervised clustering model. In some embodiments, the model is a supervised clustering model. Clustering algorithms suitable for use as models are described, for example, at pages 211-256 of Duda and Hart, Pattern Classification and Scene Analysis, 1973, John Wiley & Sons, Inc., New York, (hereinafter "Duda 1973") which is hereby incorporated by reference in its entirety for all purposes. The clustering problem can be described as one of finding natural groupings in a dataset. To identify natural groupings, two issues can be addressed. First, a way to measure similarity (or dissimilarity) between two samples can be determined. This metric (e.g., similarity measure) can be used to ensure that the samples in one cluster are more like one another than they are to samples in other clusters. Second, a mechanism for partitioning the data into clusters using the similarity measure can be determined. One way to begin a clustering investigation can be to define a distance function and to compute the matrix of distances between all pairs of samples in a training dataset. If distance is a good measure of similarity, then the distance between reference entities in the same cluster can be significantly less than the distance between the reference entities in different clusters. However, clustering may not use a distance metric. For example, a nonmetric similarity function s(x, x') can be used to compare two vectors x and x'. s(x, x') can be a symmetric function whose value is large when x and x' are somehow "similar." Once a method for measuring "similarity" or "dissimilarity" between points in a dataset has been selected, clustering can use a criterion function that measures the clustering quality of any partition of the data. Partitions of the data set that extremize the criterion function can be used to cluster the data. Particular exemplary clustering techniques that can be used in the present disclosure can include, but are not limited to, hierarchical clustering (agglomerative clustering using a nearest-neighbor algorithm, farthest-neighbor algorithm, the average linkage algorithm, the centroid algorithm, or the sum-of-squares algorithm), k-means clustering, fuzzy k-means clustering algorithm, and Jarvis-Patrick clustering. In some embodiments, the clustering includes unsupervised clustering (e.g., with no preconceived number of clusters and/or no predetermination of cluster assignments).

Ensembles of models and boosting. In some embodiments, an ensemble (two or more) of models is used. In some embodiments, a boosting technique such as AdaBoost is used in conjunction with many other types of learning algorithms to improve the performance of the model. In this approach, the output of any of the models disclosed herein, or their equivalents, is combined into a weighted sum that represents the final output of the boosted model. In some embodiments, the plurality of outputs from the models is combined using any measure of central tendency known in the art, including but not limited to a mean, median, mode, a weighted mean, weighted median, weighted mode, etc. In some embodiments, the plurality of outputs is combined using a voting method. In some embodiments, a respective model in the ensemble of models is weighted or unweighted.

The term "classification" can refer to any number(s) or other characters(s) that are associated with a particular property of a sample. For example, a "+" symbol (or the word "positive") can signify that a sample is classified as having a desired outcome or characteristic, whereas a "−" symbol (or the word "negative") can signify that a sample is classified as having an undesired outcome or characteristic. In another example, the term "classification" refers to a respective outcome or characteristic (e.g., high risk, medium risk, low risk). In some embodiments, the classification is binary (e.g., positive or negative) or has more levels of classification (e.g., a scale from 1 to 10 or 0 to 1). In some embodiments, the terms "cutoff" and "threshold" refer to predetermined numbers used in an operation. In one example, a cutoff value refers to a value above which results are excluded. In some embodiments, a threshold value is a value above or below which a particular classification applies. Either of these terms can be used in either of these contexts.

In some embodiments, the training of a respective model includes providing one or more optimized data sets, labeling these features as they occur (e.g., in user profile records), and training the MLA to predict or classify based on new inputs, such as based on data captured when firing the one or more light sources 710. In some embodiments, an MLA or a NN is trained from a training data set (e.g., a first training data set including a set of workflows from workflow storage 626 of FIG. 2) that includes one or more features identified from a data set.

Accordingly, in some embodiments, a first model is a neural network classification model, a second model is a Naïve Bayes classification model, and the like. Furthermore, in some embodiments, the model includes decision tree algorithm, a neural network algorithm, a support vector machine (SVM) algorithm, and the like. Moreover, in some embodiments, the classifier used in the methods (e.g., method 4000 of FIGS. 4A through 4I, method 5000 of FIGS. 5A through 5I, method 6000 of FIG. 6, etc.) described herein is a logistic regression algorithm, a neural network algorithm, a convolutional neural network algorithm, a support vector machine (SVM) algorithm, a Naive Bayes algorithm, a nearest neighbor algorithm, a boosted trees algorithm, a random forest algorithm, a decision tree algorithm, a clustering algorithm, or a combination thereof.

One of skill in the art will readily appreciate other models that are applicable to the systems and methods of the present disclosure. In some embodiments, the systems and methods of the present disclosure utilize more than one model to provide an evaluation (e.g., arrive at an evaluation given one or more inputs) with an increased accuracy. For instance, in some embodiments, each respective model arrives at a corresponding determination when provided a respective data set. Accordingly, each respective model can independently arrive and a result and then the result of each respective model is collectively verified through a comparison or amalgamation of the models. From this, a cumulative result is provided by the models. However, the present disclosure is not limited thereto.

In some embodiments, a respective computational model is tasked with performing a corresponding activity (e.g., step within method 4000 of FIGS. 4A through 4I, step within method 5000 of FIGS. 5A through 5D, step of method 6000 of FIG. 6, etc.). In some embodiments, each respective computational model of the present disclosure makes use of 10 or more parameters, 100 or more parameters, 1000 or more parameters, 10,000 or more parameters, or 100,000 or more parameters. In some embodiments, each respective computational model of the present disclosure cannot be mentally performed.

In some embodiments, the plurality of models includes six or more models. In some embodiments, each model in the plurality of models is independently selected from the group consisting of: Naïve Bayes, decision tree, logistic regression, support vector machine, random forest, and artificial neural network. In some embodiments, a model in the plurality of models is a support vector machine, a clustering algorithm, a neural network, a decision tree, a logistic regression, a linear regression module, or a k-nearest neighbor model.

Additionally, the methods and devices of the present disclosure allow for remote monitoring of ancillary data streams provided from one or more objective lenses 750 of the computer-enabled imaging device 300 and the one or more sensors of the computer-enabled imaging device 300 (e.g., one or more gyroscopes, one or more accelerometer 417, GPS, light gate sensor, etc.) to monitor movements of the computer-enabled imaging device 300 and view the user of the computer-enabled imaging device 300 when firing the one or more light sources 710.

In some embodiments, the first digital asset and/or the second digital asset is a digital asset captured by a method 4000 of FIGS. 4A through 4I. In some embodiments, the first subject matter is a first 3D body of the method 4000 of FIGS. 4A through 4I. In some embodiments, the first cryptographic non-fungible token asset is a cryptographic asset of the method 4000 of FIGS. 4A through 4I. In some embodiments, a respective cryptographic node device in the one or more cryptographic node devices is a remote device and/or an imaging device of the method 4000 of FIGS. 4A through 4I. In some embodiments, a model is a model of the method 4000 of FIGS. 4A through 4I.

In some embodiments, the first digital asset and/or the second digital asset is a digital asset of a method 5000 of FIGS. 5A through 5D. In some embodiments, the first subject matter is a subject of the method 5000 of FIGS. 5A through 5D. In some embodiments, the first cryptographic non-fungible token asset is a cryptographic non-fungible token asset of the method 5000 of FIGS. 5A through 5D. In some embodiments, a respective cryptographic node device in the one or more cryptographic node devices is a cryptographic node device of the method 5000 of FIGS. 5A through 5D. In some embodiments, a model is a model of the method 5000 of FIGS. 5A through 5D.

For convenience in explanation and accurate definition in the appended claims, the terms "upper," "lower," "up," "down," "upwards," "downwards," "inner," "outer," "inside," "outside," "inwardly," "outwardly," "interior," "exterior," "front," "rear," "back," "forwards," and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for capturing a digital asset:
    at a computer-enabled imaging device comprising one or more processors, one or more sensors, a display, and a controller, wherein at least one program is non-transiently stored in the controller, or a memory accessible by the controller, and executable by the controller, the at least one program causing the controller to perform a method comprising:
    (A) acquiring, in electronic form, using at least the one or more sensors, an initial state of an environment, wherein the initial state of the environment comprises a state of each sensor in the one or more sensors, a region of interest (ROI) comprising a first three-dimensional (3D) body, and a state of one or more light sources, and wherein the digital asset is associated with the first 3D body;
    (B) determining, based at least in part on the initial state of the environment, a plurality of boundary conditions associated with a workflow for capturing the digital asset;
    (C) displaying, within a graphical user interface on the display, a visualization of each respective boundary condition in a set of boundary conditions in the plurality of boundary conditions, wherein the visualization comprises a plurality of visual cues, the plurality of visual cues including a first visual cue and a second visual cue, and wherein each respective visual cue in the plurality of visual cues provides a visual indication of a state of a corresponding boundary condition in the set of boundary conditions;
    (D) updating, when displaying (C) the graphical user interface, at least one of the first visual cue and the second visual cue when each boundary condition in the set of boundary conditions is satisfied; and
    (E) executing, in accordance with a determination that each boundary condition in the set of boundary conditions is satisfied, the workflow at the computer-enabled imaging device, thereby capturing the digital asset.

2. The method of claim 1, wherein the one or more sensors comprises a gyroscope, an accelerometer, or both.

3. The method of claim 1, wherein the one or more sensors comprises an objective lens and a two-dimensional pixelated detector in communication with the objective lens.

4. The method of claim 1, wherein the one or more sensors comprises a light detection and ranging (LIDAR) sensor.

5. The method of claim 1, wherein the initial state of the environment comprises one or more spatial dimensions characteristics of the environment.

6. The method of claim 5, and wherein the one or more spatial dimensions characteristics comprises a spatial distance between the first 3D body and a sensor in the one or more sensors, a length of the first 3D body, a characteristic length of the first 3D body, a height of the first 3D body, a width of the first 3D body, a lighting characteristic, an orientation of the computer-enabled imaging device, or a combination thereof.

7. The method of claim 1, wherein the initial state of the environment comprises a first characteristic of an ambient lighting.

8. The method of claim 1, wherein the one or more light sources comprises a light emitting diode (LED).

9. The method of claim 8, wherein the LED is an additive white LED.

10. The method of claim 9, wherein the LED is an additive wavelength range specific LED.

11. The method of claim 1, wherein the one or more light sources comprises a polarized light source.

12. The method of claim 11, wherein the polarized light source is an additive polarized light source.

13. The method of claim 1, wherein the first 3D body is a portion of a first human subject.

14. The method of claim 13, wherein the first human subject is an operator of the computer-enabled imaging device.

15. The method of claim 13, wherein a second human subject different from the first human subject is an operator of the computer-enabled imaging device.

16. The method of claim 1, wherein the first 3D body comprise a plurality of sub-bodies, and wherein the digital asset is a digital representation of at least one sub-body in the plurality of sub-bodies.

17. The method of claim 1, wherein the plurality of boundary conditions comprises a position tolerance of the computer-enabled imaging device.

18. The method of claim 17, wherein the computer-enabled is a mobile imaging device, and wherein the position tolerance of the computer-enabled imaging device comprises one or more translational position tolerances of the mobile imaging device, one or more rotational position tolerances of the mobile imaging device, or both.

19. The method of claim 18, wherein the one or more translational position tolerances comprises a height tolerance from the ROI.

20. The method of claim 18, wherein the one or more rotational position tolerances comprises a yaw tolerance, a pitch tolerance, a roll tolerance, or a combination thereof.

21. The method of claim 1, wherein a first boundary condition in the plurality of boundary conditions is based on a historical workflow associated with the first 3D body.

22. The method of claim 1, wherein the computer-enabled imaging device comprises a power supply powering the computer-enabled imaging device and the one or more light sources.

23. The method of claim 22, wherein the computer-enabled imaging device is controlled through an interface on a second computer-enabled device.

24. The method of claim 1, wherein the initial state is associated with a point in spacetime.

25. The method of claim 1, wherein the one or more light sources comprises a laser light source.

26. The method of claim 25, wherein the laser light source is a pulsed laser.

27. The method of claim 1, wherein a respective light source in the one or more light sources is configured to emit light that is substantially limited to a spectral range.

28. The method of claim 27, wherein the spectral range is in between 250 nanometers (nm) and 1500 nm.

29. The method of claim 27, wherein the spectral range is in between 280 nm to 400 nm.

30. The method of claim 1, wherein the digital asset comprises one or more digital images, one or more two-dimensional (2D) maps, one or more 3D maps, one or more dense point clouds, one or more textured meshes, one or more cryptographic non-fungible token assets, or a combination thereof.

31. The method of claim 30, wherein the one or more 2D maps comprises a decomposable triangulated graph.

32. The method of claim 1, wherein the workflow at the computer-enabled imaging device comprises:
(E.i) capturing a plurality of digital images of the ROI, wherein each respective digital image in the plurality of digital images is collectively defined by a plurality of characteristics;
(E.ii) determining a characteristic relationship comprising a comparison of a first instance of a first characteristic in the plurality of characteristics defining, at least in part, a first digital image in the plurality of digital images and a second instance of the first characteristic defining, at least in part, a second digital image in the plurality of digital images; and
(E.iii) generating the digital asset based, at least in part, on the second digital image, wherein the digital asset comprises a degree of change of the first characteristic in accordance with the characteristic relationship.

33. The method of claim 32, wherein:
the first characteristic is associated with a position of a portion of the first 3D body, and
the degree of change comprises a change in the position of the portion of the first 3D body.

34. The method of claim 33, wherein the change in the position comprises aligning the portion of the first 3D body to a direction.

35. The method of claim 33, wherein the change in the position comprises compensating for a tilt and/or a pan of the computer-enable imaging device.

36. The method of claim 32, wherein:
the first characteristic is associated with a lighting of a portion of the first 3D body, and
the degree of change comprises a change in the lighting of the portion of the first 3D body.

37. The method of claim 32, wherein:
the first characteristic is associated with a visibility of a portion of the first 3D body, and
the degree of change comprises a change in the visibility of the portion of the first 3D body.

38. The method of claim 32, wherein:
the first characteristic is associated with a spectral range of a portion of the first 3D body, and
the degree of change comprises a change in the spectral range of the portion of the first 3D body.

39. The method of claim 32, wherein:
the first characteristic is associated with a temporal change of a portion of the first 3D body, and
the degree of change comprises a rate of the temporal change of the portion of the first 3D body.

40. The method of claim 32, wherein the digital asset comprises a digital video comprising the plurality of digital images arranged in a first temporal sequence.

41. The method of claim 32, wherein the digital asset comprises a 2D computer-aided design (CAD) and/or a 3D CAD based on the plurality of digital images.

42. The method of claim 32, wherein the determining (E.ii) the characteristic relationship further comprises projecting the portion of the first 3D body to a second 3D body different from the first 3D body.

43. The method of claim 32, wherein the plurality of digital images comprises a first set of digital images corresponding to a first spectral range and a second set of digital images corresponding to a second spectral range different from the first spectral range.

44. The method of claim 43, wherein the digital asset provides a layered representation of spectral data, wherein the layered representation comprises a first layer corresponding to the first spectral range and a second layer corresponding to the second spectral range.

45. The method of claim 1, wherein the workflow at the computer-enabled imaging device comprises:
(E.iv) capturing a plurality of digital images of the ROI, wherein each respective digital image in the plurality of digital images is collectively defined by a plurality of characteristics;
(E.v) determining a characteristic relationship comprising a comparison of a baseline instance of a first characteristic in the plurality of characteristics and a first instance of the first characteristic defining, at least in part, a first digital image in the plurality of digital images; and
(E.vi) generating the digital asset based, at least in part, on the first digital image, wherein the digital asset comprises a degree of change of the first characteristic in accordance with the characteristic relationship.

46. The method of claim 45, wherein the baseline instance of the first characteristic is acquired from a remote device.

47. The method of claim 45, wherein the baseline instance of the first characteristic is determined, at least in part, based on a corresponding industrial application of the digital asset.

48. The method of claim 47, wherein corresponding industrial application of the digital asset is a pharmaceutical application, a cosmetic application, a surgical application, a medical application, a security application, an entertainment application, an agricultural application, or a combination thereof.

49. The method of claim 1, wherein the workflow at the computer-enabled imaging device comprises:
(E.vii) applying, to a cryptographic function, the digital asset and identifying information associated with the ROI, thereby generating a cryptographic block associated with a cryptographic non-fungible token asset indicative of the first 3D body; and
(E.viii) transmitting, by a communication network, the cryptographic block to one or more cryptographic node devices, thereby recording the cryptographic block on a distributed blockchain ledger system.

50. The method of claim 1, wherein the digital asset comprises one or more cryptographic non-fungible token assets, and wherein the one or more cryptographic non-fungible token assets comprises an inimitable cryptographic non-fungible token asset.

51. The method of claim 1, wherein the workflow for capturing the digital asset comprises one or more changes in positioning of the computer-enabled imaging device, one or more changes in positioning of the first 3D body, one or more changes in ambient lighting, or a combination thereof.

52. The method of claim 1, wherein the updating (D) the at least one of the first visual cue and the second visual cue comprises increasing a display size of the at least one of the first visual cue and the second visual cue, decreasing the display size of the at least one of the first visual cue and the second visual cue, changing a display color of the at least one of the first visual cue and the second visual cue, changing a display shape of the at least one of the first visual cue and the second visual cue, or a combination thereof.

53. The method of claim 1, wherein the first visual cue is exhibited in the graphical user interface as an annulus, a circle, a polygon, a line, or a combination thereof.

54. The method of claim 1, wherein the second visual cue is exhibited within the graphical user interface as a compass rose.

55. The method of claim 1, wherein the plurality of visual cues comprises a third visual cue associated with a feature of the first 3D body.

56. The method of claim 55, wherein the feature of the first 3D body comprises a facial feature.

57. The method of claim 1, wherein the plurality of visual cues comprises a fourth visual cue associated with a projected representation of light projected onto the first 3D body.

58. The method of claim 57, wherein the projected representation of light comprises a triangulated representation comprising a plurality of vertices and a corresponding plurality of edges interconnecting the plurality of vertices.

59. The method of claim 1, wherein the computer-enabled imaging device further comprises a vibration mechanism housed by computer-enabled imaging device, and wherein the updating (D) the graphical user interface further comprises causing the vibration mechanism to provide a plurality of vibrations at a frequency through a housing of the computer-enabled imaging device.

60. The method of claim 59, wherein the plurality of vibrations comprises a set of synchronous vibrations.

61. The method of claim 1, wherein:
the ROI comprises a second 3D body different from the first 3D body, and
the determining (B) the plurality of boundary conditions is based on one or more characteristics of the second 3D body.

62. The method of claim 1, wherein the executing (E) the workflow further comprises, in accordance with a determination that a respective boundary condition in the plurality of boundary conditions is not satisfied, ceasing the workflow.

63. The method of claim 1, further comprising conditioning the executing (E) the workflow in accordance with a determination that a switch mechanism of the computer-enabled imaging device is in a first state.

64. The method of claim 1, wherein the computer-enabled imaging device further comprises an audio circuitry housed by the computer-enabled imaging device, and wherein the updating (D) the graphical user interface further comprises causing the audio circuitry to provide one or more audible cues.

65. A computer system for capturing a digital asset, the computer system comprising one or more processors, one or more processors, one or more sensors, a display, and a controller, wherein at least one program is non-transiently stored in the controller and executable by the controller, the at least one program causing the controller to perform method of.

66. A non-transitory computer readable storage medium storing one or more programs, the one or more programs comprising instructions, which when executed by a computer system, cause the computer system to perform method of.

* * * * *